United States Patent
Schroer

(10) Patent No.: US 10,450,136 B2
(45) Date of Patent: Oct. 22, 2019

(54) OPERATING VEHICLE, METHOD FOR MOVING AN OPERATING VEHICLE AT A STORAGE RACK ARRANGEMENT, AND STORAGE RACK ARRANGEMENT

(71) Applicant: FRAUNHOFER-GESELLSCHAFT ZUR FÖRDERUNG DER ANGEWANDTEN FORSCHUNG E.V., München (DE)

(72) Inventor: Winfried Schroer, Castrop-Rauxel (DE)

(73) Assignee: Fraunhofer-Gesellschaft Zur Foerderung der Angewandten Forschung e.V., Munich (DE)

( * ) Notice: Subject to any disclaimer, the term of this patent is extended or adjusted under 35 U.S.C. 154(b) by 163 days.

(21) Appl. No.: 14/783,656

(22) PCT Filed: Apr. 14, 2014

(86) PCT No.: PCT/EP2014/000998
§ 371 (c)(1),
(2) Date: Oct. 9, 2015

(87) PCT Pub. No.: WO2014/166640
PCT Pub. Date: Oct. 16, 2014

(65) Prior Publication Data
US 2017/0101263 A1    Apr. 13, 2017

(30) Foreign Application Priority Data
Apr. 12, 2013 (DE) .......................... 10 2013 006 391

(51) Int. Cl.
*B65G 1/04* (2006.01)
*B60L 11/18* (2006.01)

(52) U.S. Cl.
CPC ........ *B65G 1/0407* (2013.01); *B60L 11/1822* (2013.01); *B65G 1/0421* (2013.01); *B65G 1/0492* (2013.01); *Y02T 90/124* (2013.01)

(58) Field of Classification Search
CPC .................................................... B65G 1/0407
(Continued)

(56) References Cited

U.S. PATENT DOCUMENTS 3,283,924 A    11/1966  Chasar
5,116,182 A *   5/1992  Lin .......................... E04H 6/186
                                                    414/254
(Continued)

FOREIGN PATENT DOCUMENTS

DE    957200      1/1957
DE    2231057     1/1974
(Continued)

OTHER PUBLICATIONS

International Search Report for Application No. PCT/EP2014/000998 dated Nov. 21, 2014.
(Continued)

*Primary Examiner* — Saul Rodriguez
*Assistant Examiner* — Willie Berry, Jr.
(74) *Attorney, Agent, or Firm* — The Juhasz Law Firm

(57) ABSTRACT

Disclosed is an operating vehicle for transporting a storage container along a storage rack, comprising a vehicle frame having two longitudinal sides located opposite from one another, transverse sides extending transversely thereto, a receiving space for receiving the storage container, and a passage each located at at least one of the longitudinal sides, through which a storage container can be inserted into the receiving space in a receiving space insertion direction, and from which the storage container can be removed in a receiving space removal direction. The vehicle may com-
(Continued)

prise: Two pairs of drive crawlers extending along the longitudinal sides for supporting the operating vehicle on support devices mounted on the storage rack, of which one pair each of the drive crawlers is arranged in an articulated manner on each longitudinal side of the operating vehicle.

12 Claims, 53 Drawing Sheets

(58) Field of Classification Search
USPC ............................... 414/282, 279, 284, 807
See application file for complete search history.

(56) References Cited

U.S. PATENT DOCUMENTS

| | | | | |
|---|---|---|---|---|
| 8,721,250 | B2* | 5/2014 | Razumov | B65G 1/0492 108/144.11 |
| 2006/0072988 | A1* | 4/2006 | Hariki | B25J 5/02 414/282 |

FOREIGN PATENT DOCUMENTS

| | | |
|---|---|---|
| DE | 2243107 | 3/1974 |
| DE | 202007003447 | 5/2007 |
| DE | 102010015054 | 11/2011 |
| EP | 0933314 | 8/1999 |
| EP | 1607295 | 12/2005 |
| EP | 2463162 | 6/2012 |
| GB | 777989 | 7/1957 |
| JP | S62-205819 | 9/1987 |
| JP | 2005-314077 | 11/2005 |
| JP | 2013-049515 | 3/2013 |
| WO | 2011/128384 | 10/2011 |

OTHER PUBLICATIONS

Written Opinion of the International Searching Authority for Application No. PCT/EP2014/000998 dated Oct. 13, 2015.

* cited by examiner

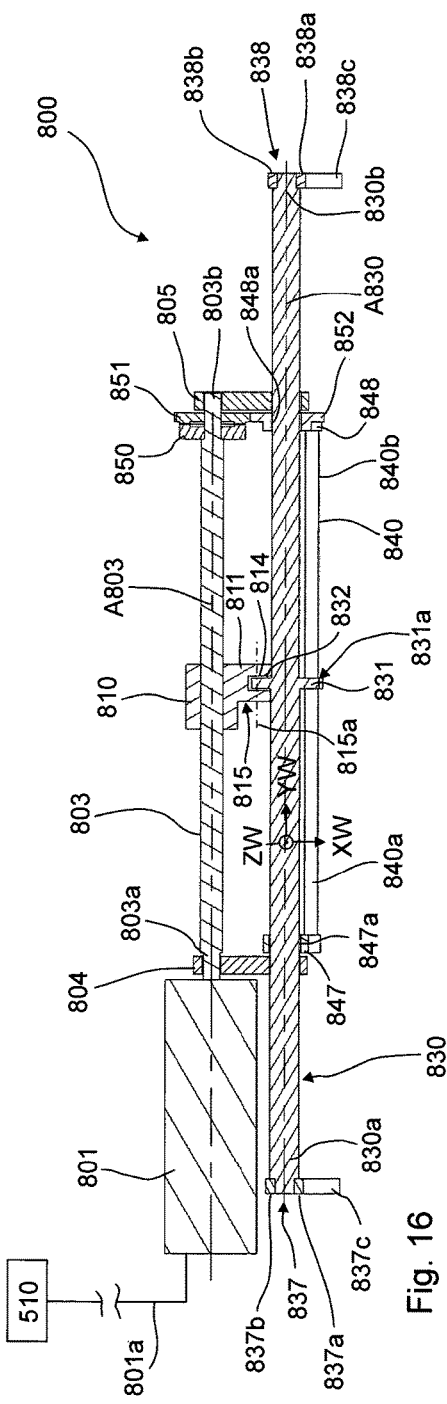
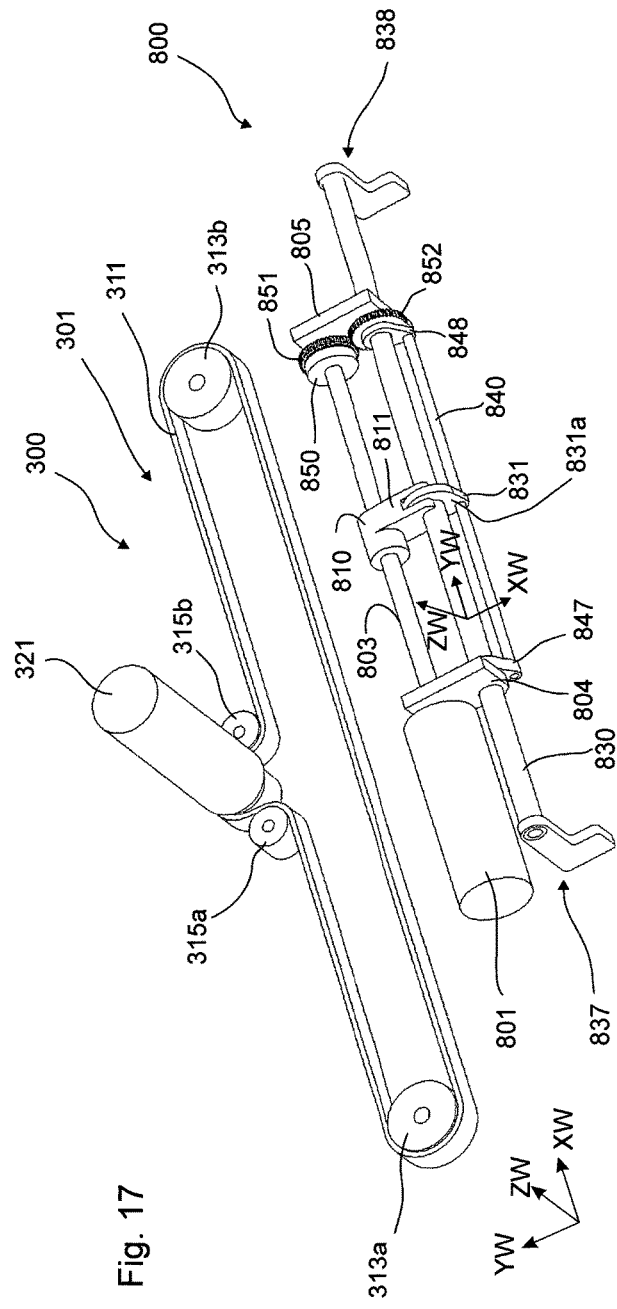
Fig. 16
Fig. 17

OPERATING VEHICLE, METHOD FOR MOVING AN OPERATING VEHICLE AT A STORAGE RACK ARRANGEMENT, AND STORAGE RACK ARRANGEMENT

FIELD

This patent application claims the filing date of the German Patent Application DE 10 2013 006 391.4, which was filed on 12 Apr. 2013. The disclosure of this patent application is included in the present patent application here by means of the reference herewith made.

BACKGROUND

The invention relates to an operating vehicle, a method for moving at operating vehicle at a storage rack arrangement, a storage rack and a storage rack arrangement.

Operating vehicles are known from the general prior art which can be used for transporting a storage container on a storage rack.

Operating vehicles are known from DE 10 2010 015 054 A1 and DE 22 31 057 A1. DE 22 43 107 A and DE 20 2007 003 447 U1 describe operating units.

It is the object of the present invention to provide an operating vehicle for transporting a storage container along a storage rack by which means storage containers can be deposited along a storage rack or removed therefrom in an economical manner.

SUMMARY

These objects are solved by the features of the independent claims. Further embodiments of the invention are described in the subclaims related back to these.

According to the invention, an operating vehicle for transporting a storage container along a storage rack is provided, comprising a vehicle frame which forms two longitudinal sides located opposite one another, transverse sides extending transversely thereto, a receiving space for receiving the storage container and a passage each located at at least one of the longitudinal sides, through which a storage container can be inserted into the receiving space in a receiving space insertion direction and from which the storage container can be removed in a receiving space removal direction. The operating vehicle further comprises: two pairs of drive crawlers extending along the longitudinal sides for supporting the operating vehicle on support devices mounted on the storage rack, of which one pair each of the drive crawlers is disposed in an articulated manner on each longitudinal side of the operating vehicle, wherein the drive crawlers of each pair of drive crawlers are each articulated by means of a rotational device having a rotational axis and viewed along the longitudinal sides, the rotational axes are located laterally of the receiving space.

According to one embodiment of the operating vehicle, it is provided that the rotational axes of the drive crawlers are disposed above the passage.

According to one embodiment of the operating vehicle, it is further provided that the operating vehicle has a conveying device with at least one actuator coupled to a drive motor, which is located in the receiving space in such a manner that this abuts against a storage container located in the receiving space or can be brought into abutment and that, when this is driven by the drive motor, moves the storage container located in the receiving space out from the receiving space in the receiving space insertion or removal direction.

According to one embodiment of the operating vehicle, it is provided that the conveying device comprises two conveying devices of which one each is located on each side of the receiving space and which are configured in such a manner that a storage container can be inserted into the receiving space and removed from this receiving space by these conveying devices on these sides located opposite one another through the passages.

According to one embodiment of the operating vehicle, it is provided that the operating vehicle comprises a gripping device for positive gripping of a storage container, wherein the gripping device has a positioning device by means of which the storage container can be displaced relative to the receiving space.

In general, the operating vehicle can change from travel in the rack to travel on the ground and conversely without further aids. This is possible with the drive crawlers according to the invention even when the operating vehicle has or does not have a ground operating chassis disposed on the vehicle frame.

According to a further aspect of the invention, a method is provided for moving an operating vehicle in a storage rack operating state at a storage rack arrangement in the direction of a longitudinal direction of the operating vehicle, wherein the operating vehicle has at least two longitudinal sides extending along the longitudinal direction and located opposite one another and drive crawlers located on each longitudinal side one behind the other in the longitudinal direction, wherein the method comprises the steps:

alignment of drive crawlers of the operating vehicle in the longitudinal direction of the operating vehicle, wherein each of the drive crawlers rests on a support part of a storage rack arrangement and wherein the drive crawlers of the operating vehicle on each longitudinal side rest on support parts of different storage racks of the storage rack arrangement, driving respectively one drive belt of each of the drive crawlers and thereby advancing the operating vehicle in the longitudinal direction of the same on the support parts between the storage racks.

According to one embodiment of the method according to the invention, the method comprises the following steps:

starting from a horizontal operating position of the drive crawlers, in which these extend in the longitudinal direction of the operating vehicle and the operating vehicle can be moved on the support parts along a horizontal path, simultaneous pivoting of the drive crawlers in the same direction about their respective rotational axis in the direction of a diagonal path of the respective storage rack, driving the respectively one drive belt of each of the drive crawlers and thereby moving the operating vehicle on a diagonal path.

In the method according to the invention, it can be provided that the simultaneous pivoting of the drive crawlers in the same direction takes place during the movement of the operating vehicle on the support parts.

According to a further aspect, a method is provided according to the invention wherein the operating vehicle changes between the following operating states:

a rack operating state in which the advancement of the operating vehicle in the longitudinal direction of the same takes place on the support parts between the storage racks, wherein the drive crawlers are located on support parts and a crawler ground operating state in which the operating vehicle travels on the drive crawlers on a ground on which the storage racks stand after the drive crawlers have been rotated into a ground travelling position by raising the vehicle frame from the ground, wherein in the transition from the rack operating state to the crawler ground operating state or from the crawler ground operating state to the rack operating state, the operating vehicle is located in a third transition operating state in which drive crawlers articulated to a first transverse side of the operating vehicle are located on support parts of the storage racks and at the same time drive crawlers articulated to a second transverse side of the operating vehicle rest on the ground and thereby position the vehicle frame relative to the ground.

According to the invention, it can be provided that this method is carried out after executing a storage rack operating state or before executing a storage rack operating state.

According to a further aspect, a method is provided according to the invention wherein in a first step driving the operating vehicle on the ground in a chassis ground operating state on a ground operating chassis disposed on the vehicle frame travels in a direction running transversely to the longitudinal direction of the storage racks whilst the drive crawlers are located in a rotational position in which these do not touch the ground, then in a second step driving the operating vehicle along the longitudinal direction of the storage racks and between the storage racks in a crawler ground operating state in which the operating vehicle on the drive crawlers travels on a ground on which the storage racks stand after the drive crawlers have been rotated into a ground driving position by raising the vehicle frame from the ground.

According to the invention, it can be provided that this method is carried out after executing a storage rack operating state or before executing a storage rack operating state. It can also be provided according to the invention that this method is carried out after or before executing the method in which a change is accomplished between the rack operating state and the crawler ground operating state.

According to a further aspect of the invention, a storage rack is provided having a multiplicity of rack frames arranged one behind the other in a longitudinal direction of the storage rack for a storage rack arrangement, wherein the rack frame comprises:

a front vertical rod extending vertically in its longitudinal direction, wherein the vertical rod has two lateral surfaces or outer surfaces and located opposite one another, which each face a vertical rod of a respectively adjacent rack frame in the longitudinal direction of the storage rack and wherein the vertical rod has outer surfaces oriented contrary to the depth direction of the storage rack;

a rear, vertically extending vertical rod, which runs parallel to the front vertical rod of the same rack frame;

a multiplicity of support parts disposed on a front surface of the front vertical rod, wherein the support parts are arranged at identical distances from one another in the longitudinal direction of the respective front vertical rod or the height direction of the storage rack;

a shelf device, which extends flat horizontally and runs in the depth direction (YR) of the storage rack, wherein in particular it can be provided that the shelf device connects at least the front vertical rod and the rear vertical rod of the same rack frame.

According to one embodiment of the storage rack according to the invention, it is provided that the shelf device is formed from two angle profiles disposed laterally to a storage container region.

According to a further embodiment of the storage rack according to the invention, it is provided that a support part is formed cylindrically and projects with its axis of symmetry from the respective front vertical rod.

According to a further aspect of the invention, a storage rack arrangement is provided comprising two storage racks which are each designed according to the invention, wherein the storage racks are arranged in such a manner that the support parts of the storage racks are directed onto one another and a travel region for an operating device is obtained between the support parts of the two storage racks.

According to a further aspect of the invention, a vehicle is provided which can be moved along a vehicle longitudinal direction of the same, the vehicle comprising:

a vehicle frame having a recess on a vehicle side pointing in the longitudinal direction which forms a battery receiving region for receiving a battery for the electrical supply of electrical components of the vehicle, a guide device with a battery guide path which runs transversely to the vehicle longitudinal direction so that a battery inserted into the battery guide path is movable transversely to the vehicle longitudinal direction, a holding device fastened to the vehicle frame for holding the battery on the vehicle frame, a contacting device which comprises two connection devices arranged one behind the other when viewed along the battery guide path and at least one contact holding device for holding the connection devices, wherein the connection devices are designed in such a manner that these can each be brought in contact with a contacting section of a battery inserted into the battery guide path wherein the connection devices each have a line which electrically connects the connection devices to a power supply device of the vehicle.

According to one embodiment of the vehicle, it is provided that the holding device fastened to the vehicle frame is designed for holding the battery on the vehicle frame in such a manner that the battery is movable along the battery guide path and is held by the holding device transversely to this.

According to a further aspect of the invention, a battery exchange station is provided for docking a vehicle with a battery and for exchanging the battery located in the vehicle with a battery located in the battery docking station, wherein the battery exchange station comprises:

an exchange guide device which comprises two guide path sections with respectively one guide path and a connecting device, which fastens the two guide path sections to one another, wherein the guide path sections run in their respective extension to one another and are aligned with respect to one another and wherein a docking region is formed between the guide path sections and a first and a second electrical charge connection device each having a charge contacting component for contacting a contacting section of a battery located in one of the guide path sections, a docking section located between the two guide path sections and configured as a recess at an end section of a vehicle with a vehicle side, on which a battery to be inserted in the battery docking station is disposed.

One embodiment of the battery docking station can have an exchange positioning device for moving a battery located in the exchange guide device along the two guide path sections.

According to a further aspect of the invention, a storage rack arrangement having two storage racks is provided, which extend along with respect to one another and respectively along a longitudinal direction and a depth direction, and a vehicle docking station according to an embodiment described herein, which is fastened to the storage racks in such a manner that the guide paths extend transversely to the longitudinal direction of the storage racks, wherein the docking section configured as a recess is located between the storage racks.

The expression "along" herein in connection with the directional information mentioned herein which relate to the course of a contour line or a surface or which can relate to a direction of a mechanical component such as an axis or shaft, can in particular mean that the tangent to the respective contour line or to the respective surface in the course thereof according to the directional information or the longitudinal extension and, for example, central axis of the mechanical component deviates locally with a maximum angle of 45 degrees and preferably a maximum of 30 degrees from a reference direction or reference axis to which the respective directional information is related.

The expression "transverse" herein in connection with the directional information mentioned herein which relate to the course of a contour line or a surface or which can relate to a direction of a mechanical component such as an axis or shaft, can in particular mean that the tangent to the respective contour line or to the respective surface in the course thereof according to the directional information or the longitudinal extension and, for example, central axis of the mechanical component deviates locally with a minimum angle of 45 degrees and preferably a minimum of 30 degrees from a reference direction or reference axis to which the respective directional information is related.

BRIEF DESCRIPTION OF THE DRAWINGS

Embodiments of the invention are described hereinafter with reference to the appended figures, which show:

FIG. 16 shows a sectional view of the embodiment of the second container positioning device designed as a gripping device according to FIG. 13, FIG. 17 shows a perspective view of the embodiment of the second container positioning device designed as a gripping device according to FIG. 13.

DETAILED DESCRIPTION

Figure 1:
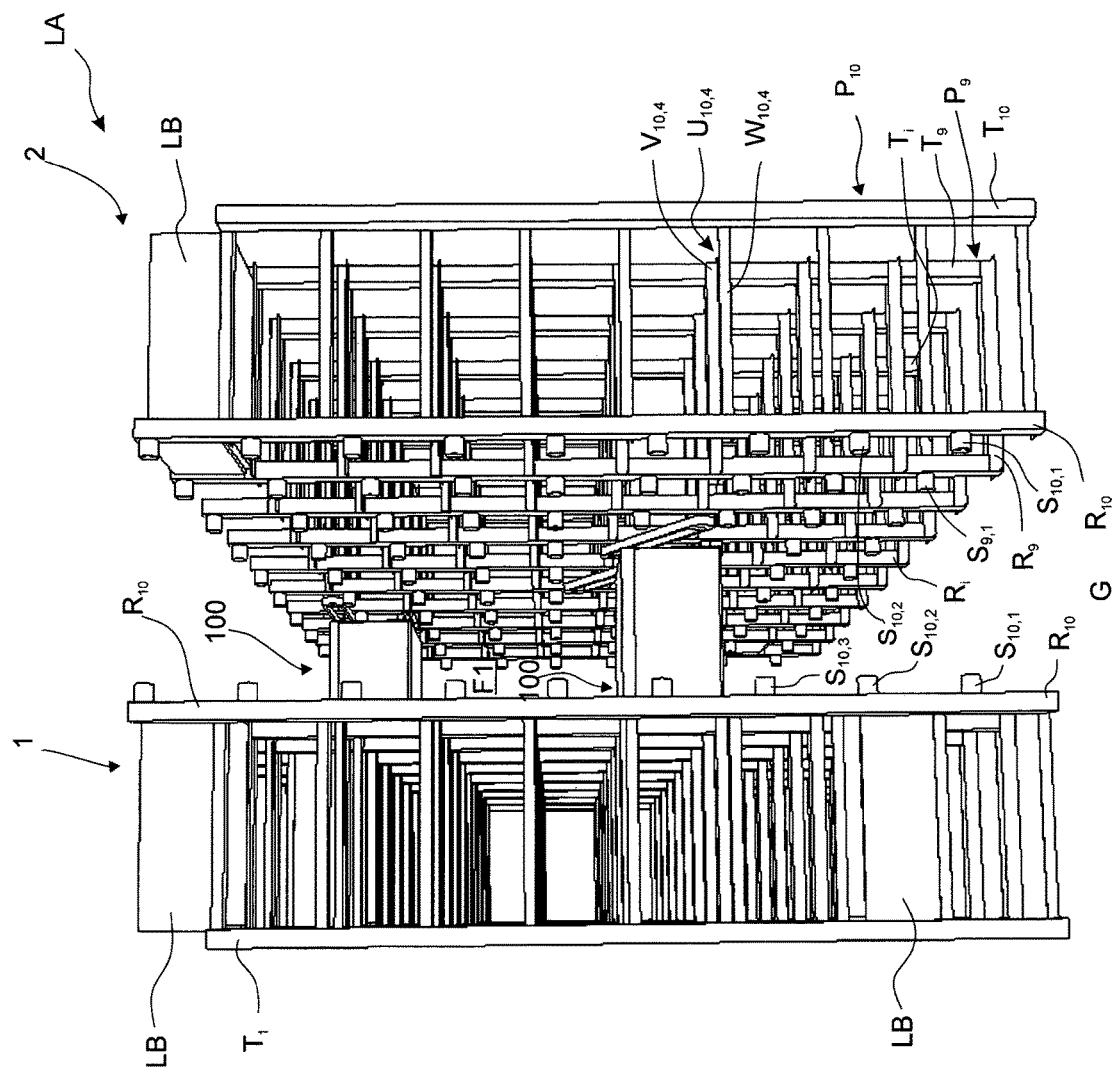
FIG. 1 shows a perspective view of an arrangement of two storage racks of which each is configured according to an embodiment according to the invention and which are arranged relative to one another in such a manner that a travel region for an operating vehicle provided according to the invention is available between said storage racks.

FIG. 1 shows a storage rack arrangement of two storage racks 1, 2 standing on a ground G, of which each is configured according to one embodiment according to the invention. Each storage rack 1, 2 of such a storage rack arrangement LA is designed in each case to receive a storage container LB and for storing a storage container LB and for removing storage containers LB.

The invention also relates to an operating vehicle 100 or a storage truck, which can move independently, i.e. automatically, between storage racks 1, 2 of an arrangement of storage racks 1, 2.

Figure 2:
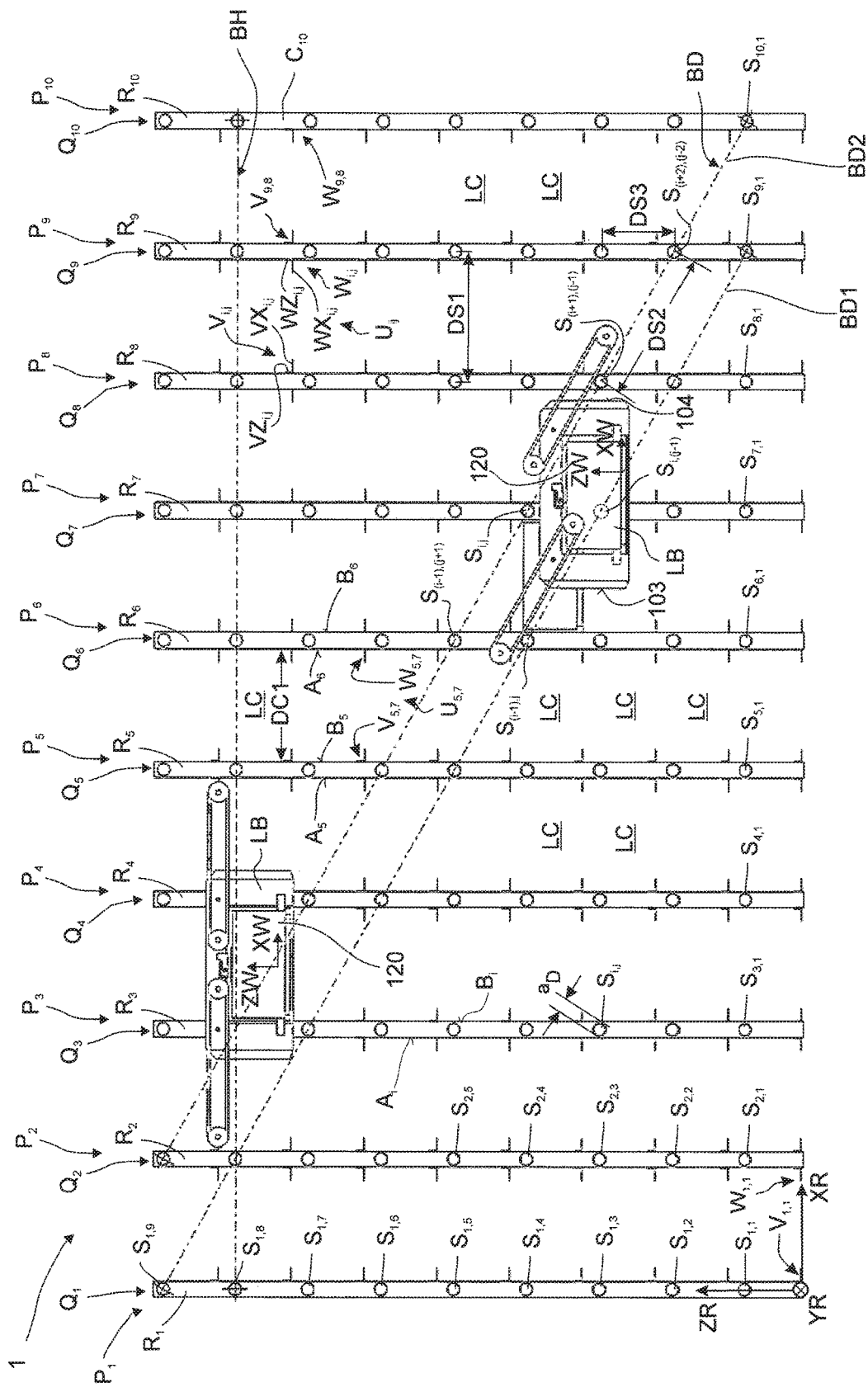
FIG. 2 shows a side view of the embodiment shown in FIG. 1 of a storage rack of the arrangement of two storage racks according to the invention.

The description of a storage rack 1 provided according to the invention is made with reference to a coordinate system KS1 plotted in FIG. 2, which is defined by: a coordinate axis XR for a longitudinal direction of the storage rack 1, a coordinate axis YR for a depth direction of the storage rack 1 and a coordinate axis ZR for a height direction of the storage rack 1.

The storage rack 1 in the embodiment in particular according to FIGS. 1 to 4 comprises a plurality of rack frames $P_i$ which are arranged adjacent to one another in a longitudinal direction XR of the storage rack 1. Reference numbers having the index "i" herein designate general parts which belong to an i-th rack frame, wherein "i" is an integer value corresponding to the position of the respective rack frame along the longitudinal direction XR of the storage rack 1. The rack frame on which the coordinate system KS1 is plotted is specifically designated with the reference number "$Q_1$" as the first rack frame along the longitudinal direction XR of the storage rack 1. This is followed in the longitudinal direction XR of the storage rack 1 specifically by the rack frames "$Q_1$" to "$Q_{10}$".

Each rack frame $Q_i$ comprises:
a front vertical rod $R_i$ extending vertically in its longitudinal direction, wherein the vertical rod $R_i$ has two mutually opposite lateral surfaces or outer surfaces $A_i$ and $B_i$, each facing a vertical rod $R_i$ of a respectively adjacent rack frame in the longitudinal direction XR of the storage rack 1 and wherein the vertical rod $R_i$ has outer surfaces $A_i$ oriented contrary to the depth direction of the storage rack 1;
a rear vertically extending vertical rod $T_i$, which runs parallel to the front vertical rod $R_i$ of the same rack frame $Q_i$;
a multiplicity of support parts $S_{i,j}$ disposed on a front surface $C_{i,j}$ of the front vertical rod $S_i$, wherein the support parts $S_{i,j}$ are disposed in the longitudinal direction of the respective front vertical rod $S_i$ or the height direction ZR of the storage rack 1 at identical distances from one another;
a shelf device $U_{i,j}$, which extends flat horizontally and runs in the depth direction YR of the storage rack 1, wherein it can be provided in particular that the shelf device $U_{i,j}$ connects at least the front vertical rod $R_i$ and the rear vertical rod $T_i$ of the same rack frame $Q_i$.

In the embodiment shown, the distance $dx_i$ (e.g. the distance $dx_5$) between a pair of first vertical rods $R_i$, $T_i$ (e.g. the vertical rods $R_5$, $T_5$) and a second pair of vertical rods $R_{i+1}$, $T_{i+1}$ (e.g. the vertical rods $R_6$, $T_6$) adjacent to the respectively first pair of vertical rods $R_i$, $T_i$ in the longitudinal direction XR of the storage rack 1 is constant in each case. Alternatively however, such distances between respective pairs of vertical rods $R_i$, $T_i$ and $R_{i+1}$, $T_{i+1}$, located at a storage rack 1 one behind the other in the longitudinal direction XR of the storage rack 1, can be different. Respectively two vertical rods $R_i$ and $R_{i+1}$ adjacent to one another in the longitudinal direction XR of the storage rack 1 each have the same distance dx1 from one another. In this case, the distance $dx_1$ is in particular the shortest distance between the two longitudinal axes of the respectively adjacent vertical rods $R_i$ and $R_{i+1}$ in the longitudinal direction XR of the storage rack 1.

Figure 4:
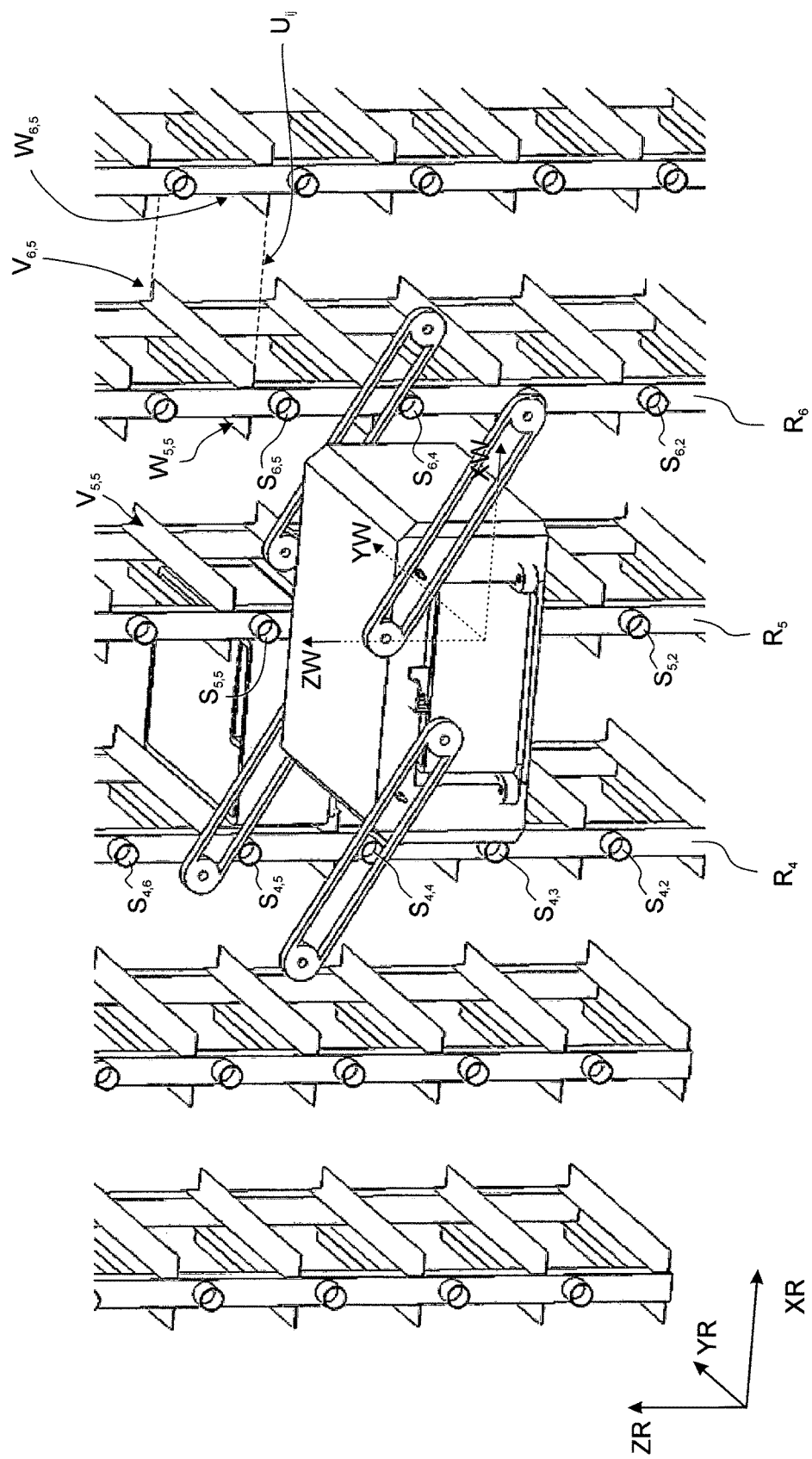
FIG. 4 shows a perspective view of a storage rack with one embodiment of an operating vehicle, wherein the operating vehicle is located in a diagonal path travel mode in a storage rack arrangement of two storage racks, wherein only one storage rack is shown.

The shelf device $U_{i,j}$ can be implemented as a plate connecting adjacent rack frames $Q_i$ and $Q_{i+1}$ and is shown as such depicted in outline as an example in FIG. 4.

In the figures the shelf device $U_{i,j}$ is specifically shown as an embodiment with respectively one pair of two angle profile supports, an angle profile support $V_{i,j}$ and an angle profile support $W_{i,j}$ where the angle profile support $V_{i,j}$ and an angle profile support $W_{i,j}$ are mounted on two adjacent rack frames, a rack frame $Q_i$ and a rack frame $Q_{i+1}$. Provided between respectively two shelf devices $U_{i,j}$ arranged one behind the other, i.e. one above the other, when viewed in the height direction ZR is a storage container region LC which can receive a storage container LB or into which a storage container LB can be moved. In this case, in order to form a shelf device $U_{i,j}$, a first angle profile support $V_{i,j}$ is attached to a second lateral surface $B_i$ of the respectively first rack frame $Q_i$ and a second angle profile support $V_{(i+1),j}$ is attached to a first lateral surface $B_{i+1}$ of the respectively second rack frame $Q_{i+1}$ (FIG. 2). In this case, the angle profile support $V_{i,j}$ is composed of a plate-shaped retaining leg $VX_{i,j}$ for holding a storage container LB and a plate-shaped fastening leg $VY_{i,j}$ arranged at an angle on the respective retaining leg $VX_{i,j}$ when viewed in the cross-sectional profile of the support $V_{i,j}$. The fastening leg $VY_{i,j}$ is attached to respectively the second lateral surface $B_i$, $D_i$ of a respectively first front and rear vertical rod $R_i$ or $T_i$ and the fastening leg $VY_{(i+1),(j)}$ is attached to respectively the first lateral surface $B_{i+1}$, $D_{i+1}$ of a respectively second front and rear vertical rod $R_{i+1}$ or $T_{i+1}$. In this case, the retaining leg $VX_{i,j}$ and the retaining leg $VX_{(i+1),(j)}$ of the two angle profile supports $W_{i,j}$ or $V_{(i+1),j}$ attached to mutually adjacent rack frames Qi and Qi+1 extend from their respective fastening legs $VY_{i,j}$ or $VY_{(i+1),(j)}$ towards one another to form respectively one shelf device $U_{i,j}$.

The support parts $S_{i,j}$ can in particular have a cylindrical shape and can be arranged on the respective front vertical rod $R_i$ in such a manner that the axis of symmetry of the respective support part $S_{i,j}$ projects perpendicularly, i.e. in the YR direction, from the respective front vertical rod Ri. The support parts $S_{i,j}$ can in particular be designed as sleeves, as shown in FIG. 2.

Alternatively the support parts $S_{i,j}$ can be designed to be ribbed or toothed, wherein the ribbing or toothed structure is configured in such a manner that this ribbing or toothed structure is obtained in a cross-section which is formed in a viewing direction along the longitudinal axis of the respective support part $S_{i,j}$.

The respective vertical rod $R_i$ with support part $S_{i,j}$ disposed thereon is subsequently also called rod apparatus $P_i$.

The rear vertical rod Ti also has two mutually opposite outer surfaces $D_i$ and $E_i$.

According to a further aspect of the invention, a storage truck travels between two storage racks of the arrangement of storage racks whereby the storage truck is supported on a plurality of support parts of a first storage rack and on a plurality of support parts of the respectively other storage rack. In this case, the two storage racks between which the storage truck moves are erected in such a manner that the respectively front vertical rods face one another with their support part and with their front surface.

For the further description, the same reference numbers are used for two mutually facing storage racks 1, 2, where the designations of the same components are indicated on the basis of the same viewing direction and specifically on the diagram in FIG. 1 in the YR viewing direction (FIG. 1).

The operating vehicle 100 according to the invention is provided as a shuttle for transporting objects and in particular a storage container LB along a storage rack 1, 2, which is movable between two storage racks with support parts $S_{i,j}$ on mutually facing sides of the storage racks. The storage racks can each be configured in particular according to one embodiment of the storage rack disclosed herein. It can also be provided that by means of a conveying device, a storage container LB is introduced into a receiving space 120 of the operating vehicle 100 in a receiving space introducing direction and can be removed therefrom in a receiving space removal direction. Such a conveying device can be attached to the operating vehicle 100 or to a storage rack.

Figure 5:
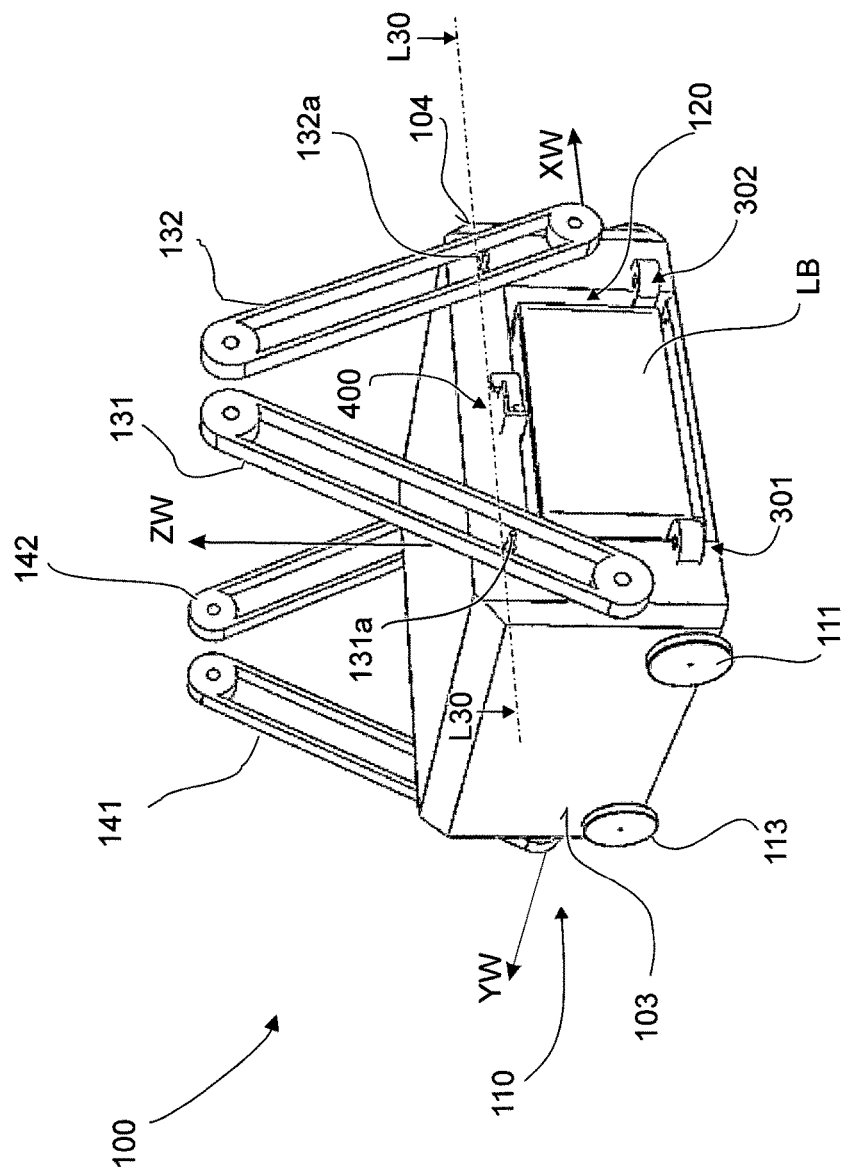
FIG. 5 shows a perspective view of one embodiment of a vehicle or operating vehicle in an embodiment with running wheels articulated to transverse sides of the operating vehicle, the axles whereof are directed in the longitudinal direction of the vehicle, wherein the operating vehicle has a receiving space for receiving the storage container, four drive crawlers, a conveying device and a gripping device, wherein the drive crawlers are located in a first position.
Figure 6:
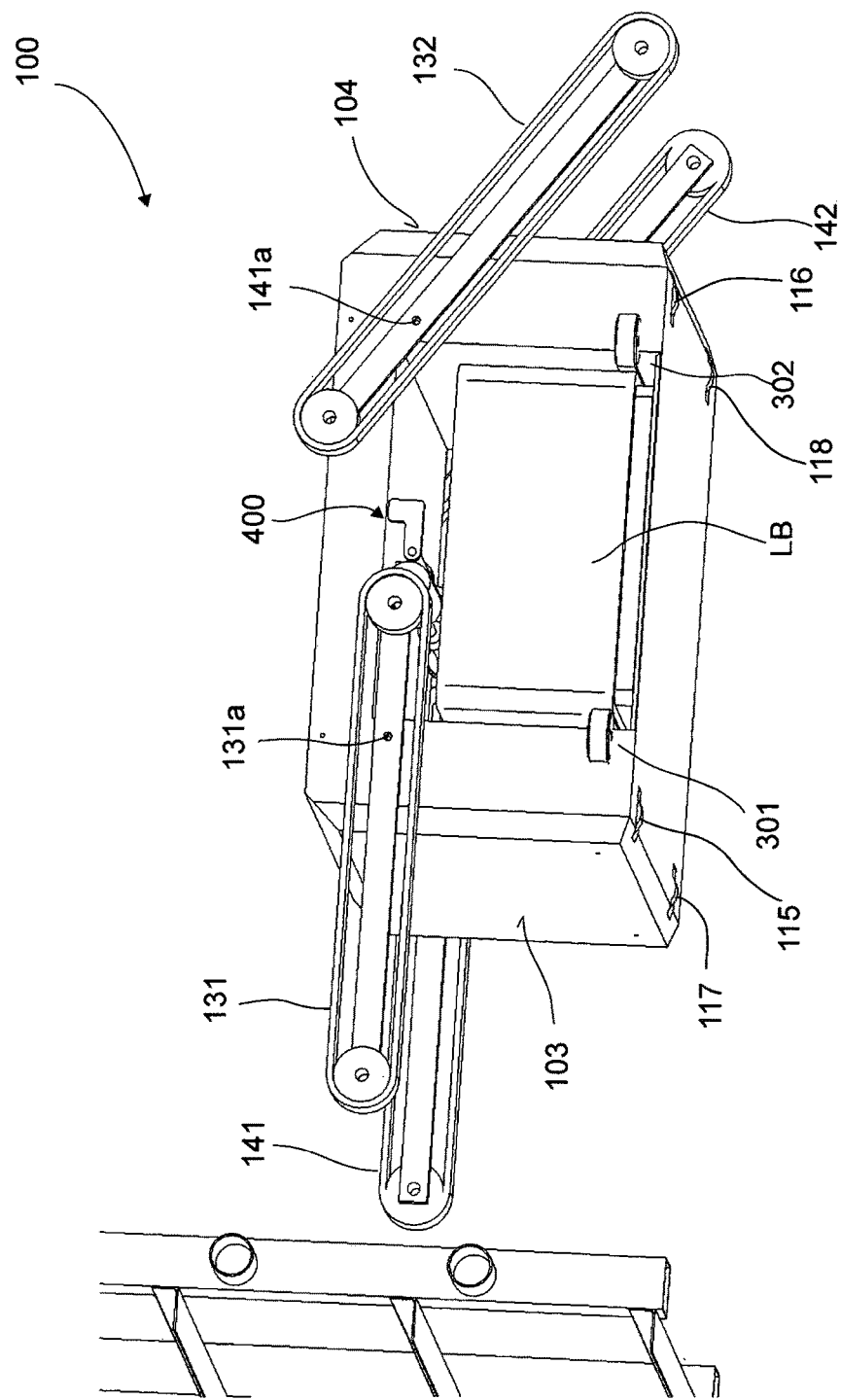
FIG. 6 shows a perspective view of a further embodiment of an operating vehicle according to FIG. 5 which, compared with the embodiment shown in FIG. 5, has running wheels articulated to the bottom side of the operating vehicle, the axles whereof are directed in the longitudinal direction of the vehicle, wherein the drive crawlers are located in another position compared to the diagram of FIG. 5.

For the further description of embodiments of the operating vehicle 100 according to the invention, a coordinate system assigned to the operating vehicle as a fixed body is plotted in FIGS. 5 and 6, which designates a longitudinal direction XW, a transverse direction YW and a height direction or vertical axis ZW. The longitudinal direction XW and the transverse direction YW are each defined in particular in such a manner that these run in a storage surface 120a of a base plate of the receiving space, where the storage surface 120a is provided for storage of a storage container LB. Located opposite the storage surface 120a and facing this, the operating vehicle 100 has a top surface 125 of a cover plate.

Alternatively or additionally, the longitudinal direction XW of the operating vehicle 100 can be defined in such a manner that the rotational axes of the rotational devices with which the drive crawlers 131, 132, 141, 142 are articulated to the operating vehicle 100 or the vehicle frame 110, run perpendicular to the longitudinal direction XW of the operating vehicle 100 at least when viewed in the height direction or contrary to the vertical axis ZW. Since the longitudinal extension of the drive crawlers 131, 132, 141, 142 extends along the storage racks 1, 2, a movement of the operating vehicle 100 on the support parts $S_{i,j}$ can be made along the storage racks 1, 2. In this case, the rotational axes need not extend perpendicular to the vertical axis ZW; in general the rotational axes extend along the vertical axis ZW.

The operating vehicle 100 generally comprises a vehicle frame 110 which can be a housing or a framework. In the embodiment of the operating vehicle 100 shown in the figures, the vehicle frame 110 is formed as a closed housing with a circumferential wall. The vehicle frame 110 forms two longitudinal sides 101, 102 located opposite one another, transverse sides 103, 104 running transversely thereto, the receiving space 120 for receiving a storage container LB and at least one passage 121, 122 located on respectively one of the longitudinal side walls. The circumferential wall of a closed housing is composed of longitudinal side outer surfaces 101a or 102a each forming the longitudinal sides 101, 102 and longitudinal side outer surfaces 103a or 104a each forming the transverse sides 103, 104. The passages 121, 122 are designed in such a manner that a storage container LB can be inserted into the receiving space 120 in a receiving space introducing direction and can be removed from this in a receiving space removal direction. When the vehicle frame 110 is formed from a framework, the longitudinal sides 101, 102 and the transverse sides 103, 104 are each formed from the outer outside surfaces of a respective arrangement of rods and/or plates of the framework when viewed from the receiving space 120 outwards. In this case, the outer outside surfaces of the respective arrangement of rods and/or plates of the framework form outer surfaces 101a, 102a of the longitudinal sides 101 or 102.

According to one embodiment of the invention, the operating vehicle 100 furthermore has two pairs 130, 140 of drive crawlers 131, 132, 141, 142 of which one pair each is arranged on each longitudinal side 101, 102 of the operating vehicle 100. In this case, of each pair 130, 140 respectively one drive crawler 131, 141 is located on one transverse side 103 and respectively one drive crawler 132, 142 is located on a second transverse side 104. The drive crawlers 131, 132, 141, 142 of each pair of drive crawlers 131, 132 or 141, 142 are each articulated by means of respectively one rotational device having a rotational axis 131a or 132a or 133a or 134a. The rotational axes can in particular be located on the longitudinal sides 101, 102 or, when viewed in the longitudinal direction XW, laterally of the receiving space 120. At the same time, the rotational axes 131a and 132a are arranged in an articulated manner on the first longitudinal side 101 and adjacent to the first transverse side 103 or to the second transverse side 104 and the rotational axes 141a and 142a are arranged in an articulated manner on the first longitudinal side 101 and adjacent to the first transverse side 103 or to the second transverse side 104. The rotational axes 131a, 132a, 141a, 142a can in particular be located in a side wall formed by the longitudinal sides 101, 102 and in particular laterally of the receiving space 120 when viewed in the longitudinal direction YW.

The term "drive crawler" will be understood by one of ordinary skill in the art to indicate a caterpillar track propulsion system, such as is shown, for example, in FIG. 5, as reference characters 131, 132, 141, and 142. As shown, and as known in the art, such a caterpillar track propulsion system (also known in the art as a "continuous track" propulsion system), generally includes at least two rollers, which drive a continuous drive belt or band, which propels a vehicle.

In all the embodiments of the operating vehicle 100 according to the invention, it can be provided that the rotational axes of the drive crawlers 131, 132, 141, 142 are located above the passage 121, 122. As a result, in particular it is possible to receive a storage container LB standing on the ground when the operating vehicle 100 is standing on the ground. Also it is possible to transfer the storage container LB into a storage container region LC of a rack if the height of the passage 121, 122 of the operating vehicle 100 can be adjusted by changing the rotational position of the drive crawlers 131, 132, 141, 142 on the rack. Also by adjusting the rotational position of the drive crawlers 131, 132, 141, 142 in rack mode, it is possible that the passage 121, 122 is adjusted relative to the storage container region LC.

Alternatively to this, the rotational axes of the drive crawlers 131, 132, 141, 142 can be arranged below the passage 121, 122. In this case, by adjustment of the rotational position of the drive crawlers 131, 132, 141, 142 in rack mode, it is possible that the through opening 121, 122 is adjusted relative to the storage container region LC.

Consequently, a method for moving the operating vehicle 100 is provided according to the invention, wherein the operating vehicle 100 changes between the following operating states:

a rack operating state in which the advancement of the operating vehicle 100 in the longitudinal direction XW of the same takes place on the support parts $S_{i,j}$ between the storage racks 1, 2, wherein the drive crawlers 131, 132, 141, 142 are located on support parts $S_{i,j}$ and a crawler ground operating state in which the operating vehicle 100 travels on the drive crawlers 131, 132, 141, 142 on a ground G on which the storage racks 1, 2 are standing after the drive crawlers 131, 132, 141, 142 have been rotated into a ground travel position whilst raising the vehicle frame 110 from the ground, wherein in the transition from the rack operating state to the crawler ground operating state or from the crawler ground operating state to the rack operating state, the operating vehicle 100 is located in a third transition operating state in which drive crawlers 131, 141 articulated to a first transverse side 103 of the operating vehicle 100 are located on support parts $S_{i,j}$ of the storage racks 1, 2 and at the same time drive crawlers 132, 142 articulated to a second transverse side 104 of the operating vehicle 100 rest on the ground and thereby position the vehicle frame 110 relative to the ground G.

Furthermore, a method for moving an operating vehicle 100 is provided according to the invention, wherein in a first step driving the operating vehicle 100 on the ground G in a chassis ground operating state on a ground operating chassis disposed on the vehicle frame 110 travels in a direction running transversely to the longitudinal direction XR of the storage racks 1, 2 whilst the drive crawlers 131, 132, 141, 142 are located in a rotational position in which these do not touch the ground G, then in a second step driving the operating vehicle 100 along a longitudinal direction XR of the storage racks 1, 2 and between the storage racks 1, 2 in a crawler ground operating state in which the operating vehicle 100 on the drive crawlers 131, 132, 141, 142 travels on a ground G on which the storage racks 1, 2 stand, after the drive crawlers 131, 132, 141, 142 have been rotated into a ground driving position by raising the vehicle frame 110 from the ground G.

According to one embodiment of the operating vehicle 100, it is provided that the rotational axes 131a and 141a which are configured on different longitudinal sides 101, 102, run coaxially to one another, i.e. lie on the same straight line and that also the rotational axes 132a and 142a, which are configured on different longitudinal sides 101, 102, run coaxially to one another, i.e. lie on the same straight line. This course of the rotational axes can be provided in all embodiments of the operating vehicle 100. In this embodiment, the vehicle-referenced coordinate system is defined in such a manner that the transverse direction YW runs parallel to the rotational axes 131a or 132a or 141a or 142a and the longitudinal direction XW runs vertically to the rotational axes 131a or 132a or 141a or 142a, where the origin of the coordinate system lies on the base 120a of the receiving space 120 of the operating vehicle 100.

Respectively one drive motor (not shown) is coupled to each rotational device of the drive crawlers 131, 132, 141, 142 having the rotational axis 131a or 132a or 133a or 134a, by means of which respectively each of the drive crawlers 131, 132, 141, 142 can be rotated as a result of a trigger command of a control device 510 which is functionally connected to each of the drive motors via a control line. In this way, the drive motors of each drive crawler 131, 132, 141, 142 can be triggered by the control device 510 independently of one another and as a result, a predetermined movement direction as well as speed of each of the deflecting rollers of the same and therefore of the respective drive belt can be adjusted at each drive crawler 131, 132, 141, 142. In this way, a rotational position of each of the drive crawlers 131, 132, 141, 142 predetermined by the control device can furthermore be set by the control device 510 in order, for example, to set the horizontal path travel mode or the diagonal path travel mode or execute these in each case.

In general, the respective embodiment of the vehicle can have a power supply device which is electrically connected to electrically operated components of the respective embodiment of the vehicle in order to supply these with energy. The power supply device can itself comprise a battery or be electrically connected to a battery of the vehicle.

Since the drive crawlers 131, 132, 141, 142 protrude from the longitudinal side outer surface 103a or 104a on which these are each disposed, it is possible that the drive crawlers 131, 132, 141, 142 can rest on the respective support part $S_{i,j}$ whilst the outer surface 103a or 104a facing the respective support part $S_{i,j}$ can be moved past this when the operating vehicle 100 is driven and is moved continuously between two storage racks 1, 2.

Each drive crawler 131, 132, 141, 142 can in particular be configured as a belt drive with a drive belt 150. In this case, each drive crawler 131, 132, 141, 142 has a drive belt 150 which is spanned between a first and a second deflecting roller 151, 152. Each drive crawler 131, 132, 141, 142 furthermore has, as shown for the example of the drive crawler 141 in FIG. 8:

a central pivot bearing 153 for receiving a rotational axis 131a, 132a, 141a, 142a with which the respective drive crawler 131, 132, 141, 142 is articulated to the vehicle frame 110 (FIG. 7), a support device 154 according to a first alternative for the configuration of the drive crawler (left drive crawler in FIG. 8) having a first support arm 155a which extends between the central pivot bearing 153 and a first outer pivot bearing 151a on which the first deflecting roller 151 is mounted and a second support arm 155b which extends between the central pivot bearing 153 and a second outer pivot bearing 152a on which the second deflecting roller 512 is mounted.

Figure 8:
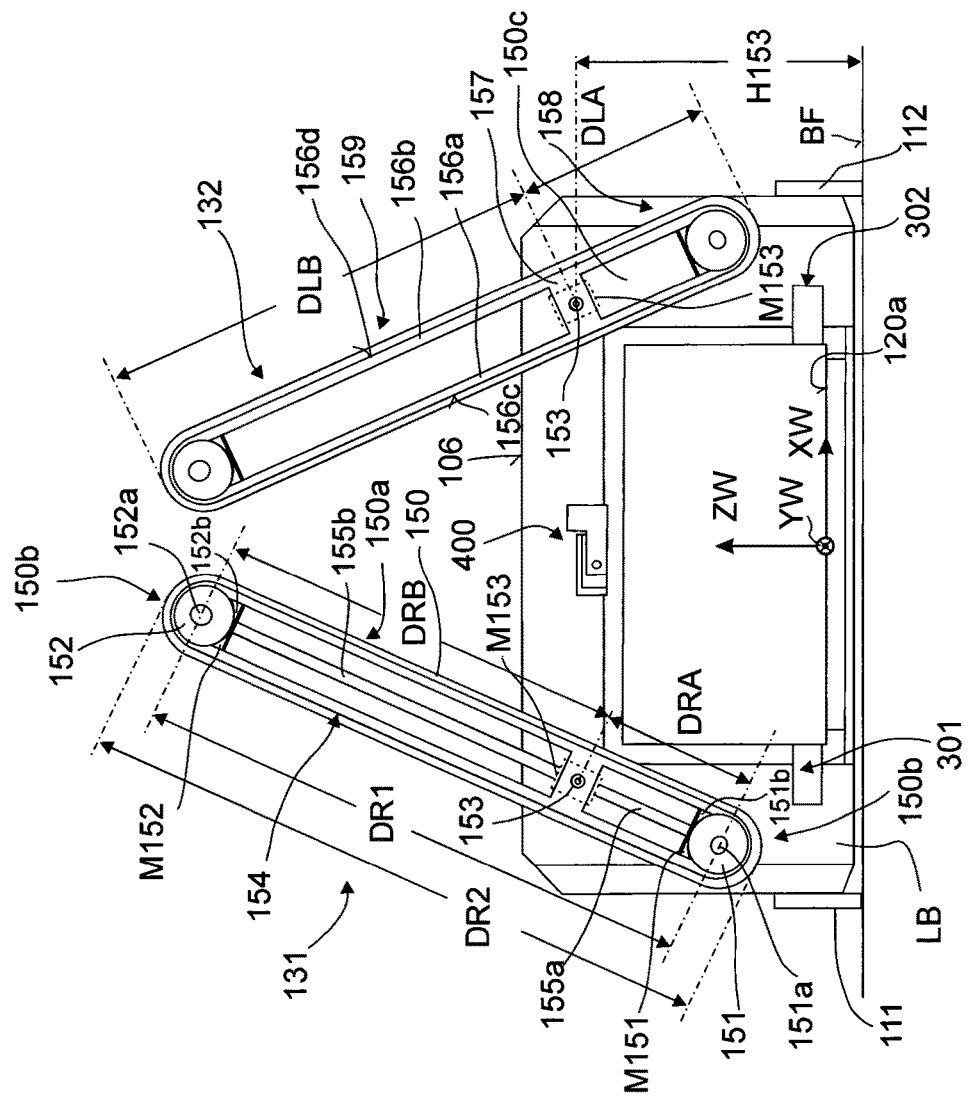
FIG. 8 shows a side view of the embodiment of an operating vehicle shown in FIG. 5 in a ground operating position through running wheels articulated to transverse sides of the operating vehicle.
Figure 9:
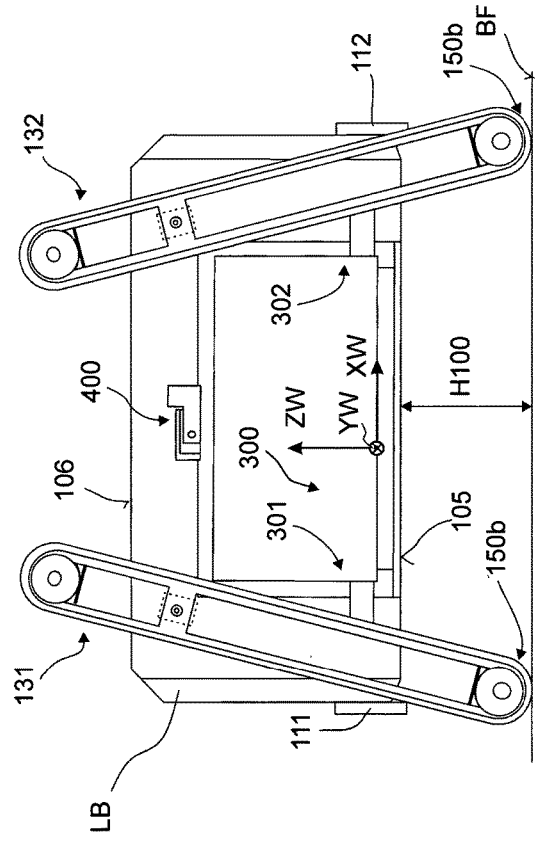
FIG. 9 shows a side view of the embodiment of an operating vehicle shown in FIG. 5 in a further ground operating position in which the operating vehicle can be moved by the four drive crawlers along its longitudinal direction.

Consequently the drive belt 150 has a curved section 150b in a region in which the drive belt 150 abuts against a respective deflecting roller 151, 152 and a straight section 150a which extends between two curved sections 150b (FIG. 8).

The outer pivot bearings 151a, 152a are integrated with the deflecting rollers 151, 152 respectively on end sections or plate sections 151b or 152b.

At least one of the deflecting rollers 151, 152 of each of the drive crawlers 131, 132, 141, 142 is each coupled to a drive motor M151, M152 with which the drive belt 150 can be brought into a circulating movement. Each of the drive motors M151, M152 of the drive crawlers 131, 132, 141, 142 is connected functionally to a control device 510 (FIG. 3) via a control line (not shown) so that the drive belt 150 of each of the drive crawlers 131, 132, 141, 142 can be rotated as a result of trigger commands of the control device 510. In this way, a rotational speed of each of the deflecting rollers 151, 152 predetermined by the control device can be set by the control device 510.

Each drive crawler 131, 132, 141, 142 or some of the drive crawlers can, according to a second alternative for the configuration of the drive crawlers (right drive crawler in FIG. 8) have two support arms 156a, 156b which run transversely to the thickness direction of the respective drive crawler 131, 132, 141, 142 at a distance therefrom and lie with their ends and outer sides 156c or 156d adjacent to the circumferential surfaces of the deflecting rollers 151 or 152 so that the drive belt 150 abuts against the outer sides 156c or 156d of the support arms 156a, 156b and is supported between the deflecting rollers 151 or 152. At the same time, it can be provided that the support arms 156a, 156b are fastened by means of a connecting piece 157 in which the pivot bearing 153 is located. The support arms 156a, 156b fix the position of the drive belt 150 over the length DR1 so that an operating vehicle 100 lying on support parts $S_{i,j}$ can be positioned precisely in front of a storage container region LC. A tendency of the operating vehicle 100 to oscillate is also thereby reduced.

Alternatively or additionally to the support arms 156a, 156b, the end sections of the drive crawlers 131, 132, 141, 142 can be fastened to support rods 155a, 155b which are fastened to the connecting piece 157. FIG. 8 shows as an example two embodiments of the fastening of the end sections on the connecting piece 157 on the drive crawler 131 and compared to this, on the drive crawler 132. Preferably the drive crawlers 131, 132, 141, 142 on one operating vehicle 100 are designed to be the same type or identical.

The distance between the rotational axes of the two respectively outer pivot bearings 151a, 152a for the deflecting rollers is defined as length DR1. The length DR1 is thus obtained as the sum of a first arm length 155a and a second arm length 156a, where the first arm length 155a is the length of the first support arm 155 as distance between the central pivot bearing 153 and the outer pivot bearing 151a and the second arm length 156a is the length of the second support arm 156 as distance between the central pivot bearing 153 and the outer pivot bearing 152a. Each drive crawler 131, 132, 141, 142 overall has a length DR2 (FIG. 8) which is equal to the distance between the two outermost points located on the connecting line between the rotational axes of the outer pivot bearings 151a, 152a. This results in the length sections DLA, DLB which together give the length DR2 where DLA is defined as length between the rotational axis of the central pivot bearing 153 and the rotational axis of the outer pivot bearing 151a and DLB is defined as the length between the rotational axis of the central pivot bearing 153 and the rotational axis of the outer pivot bearing 152a.

According to one embodiment of the invention, the diagonal distance DS2 between support parts, i.e. between a support part $S_{i,j}$ and a support part $S_{(i+1),(j-1)}$ is greater than the larger length of the lengths sections DLA or DLB plus the largest diameter dS of all the support parts $S_{i,j}$.

According to one embodiment of the operating vehicle 100, the rotational axis of the central pivot bearing 153 is located on the connecting line between the outer pivot bearings 151a, 151b.

When using the operating vehicle 100 between two storage racks 1 or 2 in which the operating vehicle 100 with its drive crawlers 131, 132, 141, 142 is moved on the respective support part $S_{i,j}$, it is provided that the drive crawler length DR1 is at least the distance DS2 (FIG. 2) between two support part $S_{i,j}$, which are consecutive in the XR direction and adjacently disposed in the ZR direction. In the general notation, this means according to the diagram in FIG. 2 that—with reference to a support part $S_{i,j}$—the connecting line e.g. between the effective and in particular geometrical central points of the support part $S_{(i+1),j}$ and support part $S_{(i+1),(j-1)}$ must be smaller in magnitude that the drive crawler length DR1 of the drive crawlers 131, 132, 141, 142, otherwise in the travel position of the operating vehicle 100 shown in FIG. 30, there would be a movement section in which one of the crawlers lies precisely between two adjacent and height-offset support part and cannot be held by one support part Si,j. The drive crawlers 131, 132, 141, 142 are therefore each provided with a drive crawler length DR1 in which the operating vehicle 100 in particular in the travel position shown in FIG. 2 is supported per longitudinal side on each transverse side 103, 104 on at least one pin. According to one embodiment of the operating vehicle 100, the drive crawler lengths DR1 of the drive crawlers 131, 132, 141, 142 are at least 1.5 times the width 120 of the receiving space 120, i.e. the width provided for a storage container LB in the receiving space 120.

With the drive crawlers 131, 132, 141, 142 it is possible that the operating vehicle 100 travels a horizontal path BH or a diagonal path BD in a travel region F1 between two storage racks 1, 2 facing one another with their support parts $S_{i,j}$. A horizontal path BH and a diagonal path BD is shown by dot-dashed lines in FIG. 2. Each dot-dashed line is obtained as a connecting line between those support parts $S_{i,j}$ on which the operating vehicle 100 is supported when travelling a horizontal path BH or a diagonal path BD.

In general for the movement of the operating vehicle 100 the following is accomplished:

alignment of drive crawlers 131, 132, 141, 142 of the operating vehicle 100 in the longitudinal direction XW of the operating vehicle 100, wherein each of the drive crawlers 131, 132, 141, 142 rests on at least one support part $S_{i,j}$ of a storage rack arrangement LA and wherein the drive crawlers 131, 132, 141, 142 of the operating vehicle 100 on each longitudinal side 101, 102 rest on support parts $S_{i,j}$ of different storage racks 1, 2 of the storage rack arrangement LA and, driving respectively one drive belt 150 of each of the drive crawlers 131, 132, 141, 142 and thereby advancing the operating vehicle 100 in the longitudinal direction XW of the same on the support parts $S_{i,j}$ between the storage racks 1, 2, e.g. on a horizontal path BH or a diagonal path BD.

Figure 7:
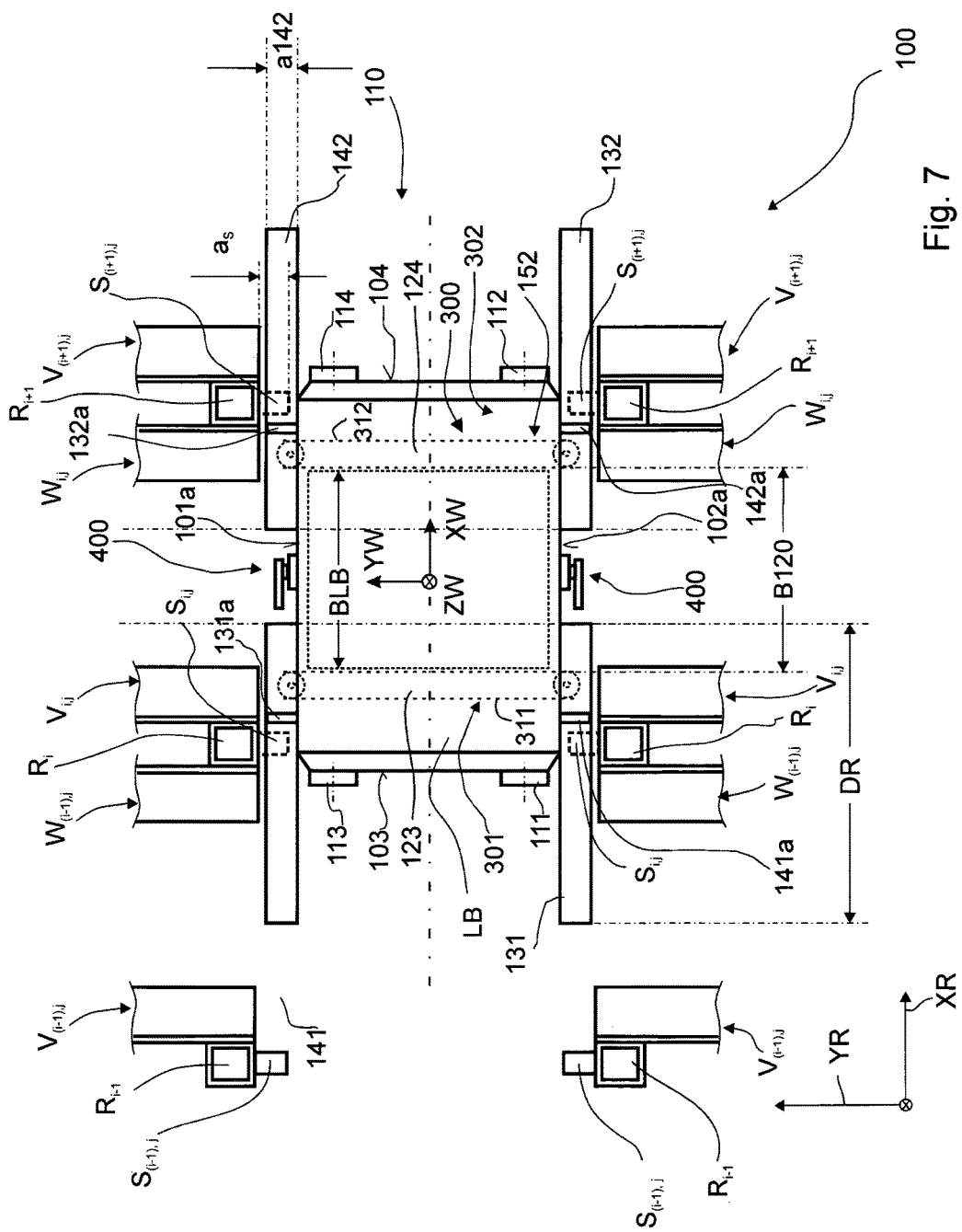
FIG. 7 shows a plan view of the embodiment of an operating vehicle shown in FIG. 5.

According to one embodiment of the invention, the support parts project from the surface in the YR direction from the front surface $C_{i,j}$ of the front vertical rod Si with a distance $a_s$ which is smaller than the distance a142 at which the drive crawlers 131, 132, 141, 142 are located away from the longitudinal side surface 101a or 102a (FIG. 7).

Figure 3:
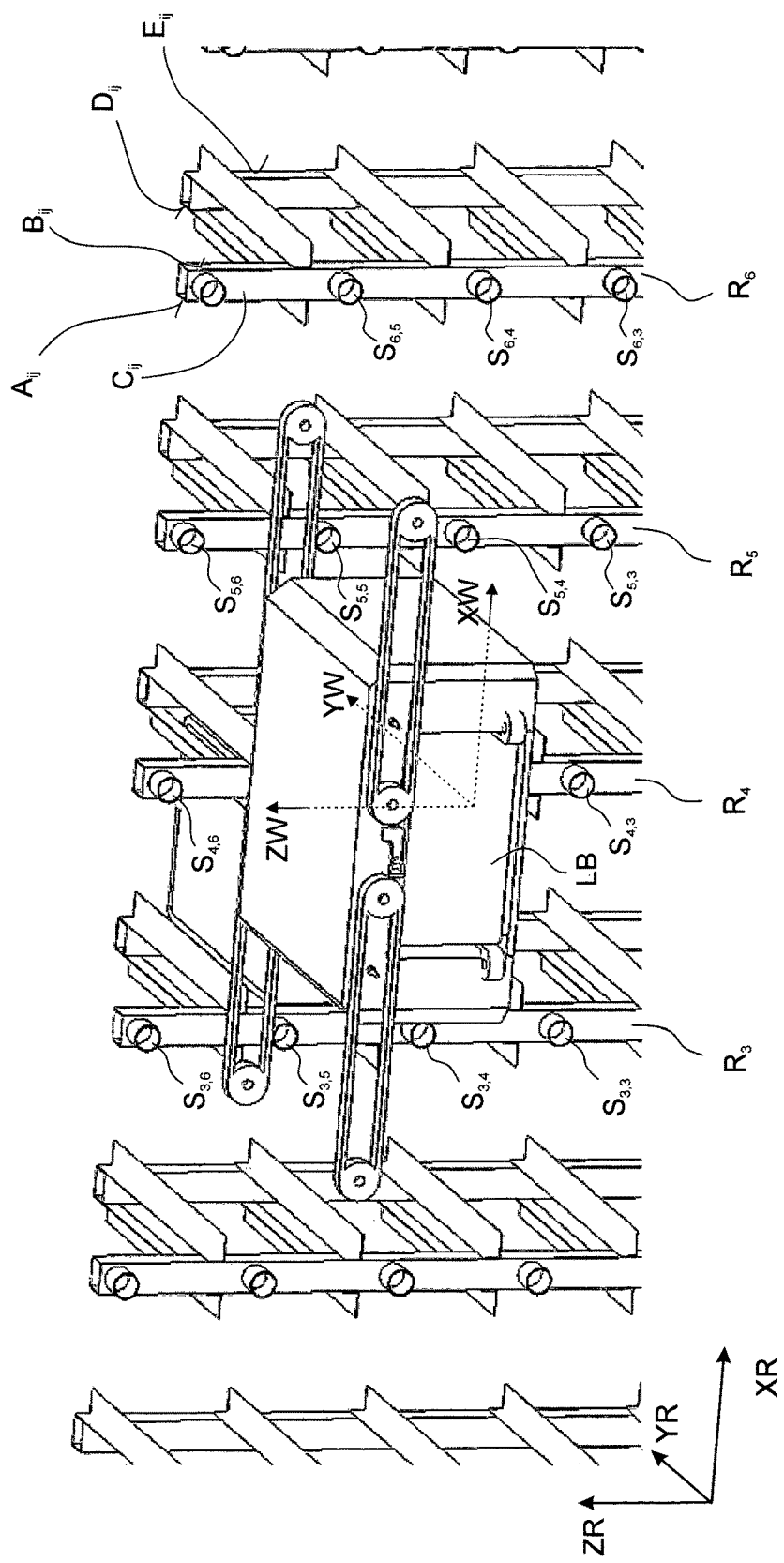
FIG. 3 shows a perspective view of a section of the storage rack according to FIG. 2 with an embodiment of an operating vehicle, wherein the operating vehicle is located in a horizontal path travel mode in a storage rack arrangement of two storage racks, wherein only one storage rack is shown.

FIGS. 3 and 4 show in two steps how the operating vehicle 100 goes over from a horizontal mode (FIG. 3) in which the operating vehicle travels along a horizontal path BH into a diagonal mode (FIG. 4) in which the operating vehicle 100 travels along a diagonal path BD.

A change of the horizontal mode (FIG. 3) into the diagonal mode (FIG. 4) starts from a horizontal path position of the drive crawlers 131, 132, 141, 142 in which these extend in the longitudinal direction XW of the operating vehicle 100 and in which each drive crawler 131, 132, 141, 142 rests on at least one support part $S_{i,j}$. The expression "extending of the drive crawlers 131, 132, 141, 142 in the longitudinal direction XW" means herein that the connecting line of the respective centres of the pivot bearings 151a, 152a of one drive crawler 131, 132, 141, 142 runs in the longitudinal direction XW of the operating vehicle 100. As a result of the simultaneous pivoting of the drive crawlers 131, 132, 141, 142 in the same direction about their respective rotational axis 131a or 132a or 141a or 142a the drive crawlers 131, 132, 141, 142 are rotated into the direction of a diagonal path BD of the respective storage rack 1, 2 that is defined by the positions of the support parts of the adjacent and in each case facing storage racks 1, 2, i.e. for example according to the diagram in FIG. 2 by the connecting line of the respective geometric centres of the support part Si,j and the support part S(i+1),(j−1). By driving the respectively one drive belt 150 of each of the drive crawlers 131, 132, 141, 142, the operating vehicle 100 moves on a diagonal path BD in a diagonal path travel mode. The simultaneous pivoting of the drive crawlers 131, 132, 141, 142 in the same direction can be accomplished during the movement of the operating vehicle 100 on the support parts $S_{i,j}$ or when the operating vehicle 100 is standing on the support parts $S_{i,j}$.

Similarly, it can conversely be provided that—starting from an angled or diagonal path position of the drive crawlers 131, 132, 141, 142—a simultaneous pivoting of the drive crawlers 131, 132, 141, 142 in the same direction about their respective rotational axis 131a or 132a or 141a or 142a is accomplished in the direction of the horizontal path BH of the respective storage rack 1, 2 in order to transfer the operating vehicle 100 into the horizontal path travel mode (FIG. 3).

The operating vehicle 100 can also have a ground operating chassis which can be arranged on the vehicle frame 110. With the ground operating chassis the operating vehicle 100 can travel on the ground G in a chassis ground operating state whilst the drive crawlers 131, 132, 141, 142 are located in a rotational position in which these do not touch the ground G. This chassis ground operating state is shown, for example in FIG. 5. According to a further embodiment of the operating vehicle 100, this has a steering device by which means the running wheels on the vehicle frame 110 are rotatable about an axis which runs transversely to the rotational axis of the wheels. In this way, the running wheels are arranged on the vehicle frame so that they can be steered with respect to the vehicle frame 110 so that the operating vehicle can also travel on curved track sections in a controlled manner.

In particular, the ground operating chassis for the chassis ground operation state can be implemented by running wheels 111, 112, 113, 114 (FIG. 5), the rotational axes of which run along the XW axis or in particular parallel to the XW axis of the operating vehicle 100. In an embodiment in which these running wheels 111, 112, 113, 114 are arranged steerably on the vehicle frame 110, an alignment of the rotational axes of the running wheels 111, 112, 113, 114 is possible in this way. With these running wheels 111, 112, 113, 114, the operating vehicle 100 can in particular travel in a direction which runs transversely to the longitudinal direction XR of the storage racks 1, 2, in particular when the operating vehicle 100 is to go over from this chassis ground operating state into a rack operating state or conversely. Also a transition between such a chassis ground operating state and a crawler ground operating state and conversely is possible in which the operating vehicle 100 travels on the drive crawlers 131, 132, 141, 142 on the ground G on which the storage racks 1, 2 are standing, after the drive crawlers 131, 132, 141, 142 have been rotated into a ground travel position by raising the vehicle frame 110 from the ground G. In the embodiments of the operating vehicle 100 shown, the running wheels 111, 112 are articulated to the outer side or transverse side 103 and the running wheels 113, 114 are articulated to the outer side or transverse side 104. Each of the running wheels 111, 112, 113, 114 of the operating vehicle 100 is arranged in such a manner that the travel of the operating vehicle 100 on the ground lies transversely to the alignment of drive crawlers 131, 132, 141, 142 of the operating vehicle 100. In particular, the running wheels 111, 112, 113, 114 are arranged in such a manner that the rotational axis of the running wheels 111, 112, 113, 114 lies perpendicular to the alignment of the drive crawlers 131, 132, 141, 142 of the operating vehicle 100 or the longitudinal direction XW of the operating vehicle 100 (FIG. 7). In the embodiment with running wheels 111, 112, 113, 114, the vehicle has a drive motor and a coupling device by means of which the drive motor is coupled to at least two of the running wheels 111, 112, 113, 114 in order to advance the operating vehicle 100 on a ground surface BF.

Alternatively or additionally, the ground operating chassis can be implemented with running wheels 115, 116, 117, 118 (FIG. 6), the rotational axes of which run along the YW axis or in particular parallel to the YW axis of the operating vehicle 100. In one embodiment in which these running wheels 115, 116, 117, 118 are arranged steerably on the vehicle frame 110, alignment of the rotational axes of the running wheels 115, 116, 117, 118 is possible in this way. With these running wheels 115, 116, 117, 118, the operating vehicle 100 can in particular travel in a direction running in the longitudinal direction XR of the storage racks 1,2 when the operating vehicle 100 is to go over from this chassis ground operating state into a rack operating state or conversely. Also a transition between such a chassis ground operating state and a crawler ground operating state and conversely is possible in which the operating vehicle 100 travels on the drive crawlers 131, 132, 141, 142 on a ground G on which the storage racks 1, 2 are standing after the drive crawlers 131, 132, 141, 142 have been rotated into a ground travel position by raising the vehicle frame 110 from the ground G.

FIG. 8 shows the position of the drive crawlers 131, 132, 141, 142 in the ground travel mode of the operating vehicle 100, i.e. when this is travelling on the running wheels 111, 112, 113, 114 on a ground surface BF. In this case, the operating vehicle 100 is designed in such a manner that the drive crawlers 131, 132, 141, 142 each have a longer section 159 starting from the pivot joint 153 having the length DLB and a shorter section 158 starting from the pivot joint 153 having the length DLA. The sections 158, 159 are each defined in the longitudinal direction of the respective drive crawler from the pivot joint 153 up to the respective outermost end of the respective drive crawler, wherein the longitudinal direction is the connecting line between the pivot joints 151a, 152a. In the embodiment of an operating vehicle 100 with running wheels 111, 112, 113, 114, the shorter section 158 has a length DLA which is shorter than the height H153 between the ground surface BF and the pivot point 153, where it can be provided in particular that the length DLA is at least a factor of 0.9 shorter than the height H153. The length DLB of the longer section 159 can be a factor of 1.5 longer than the length DLA of the shorter section 158 of the drive crawlers 131, 132, 141, 142. For the travel mode on the ground surface BF the drive crawlers 131, 132, 141, 142 are brought into a rotational position in which the shorter section 158 of the drive crawlers 131, 132, 141, 142 lies at the bottom in relation to the height direction ZW (FIG. 8).

Figure 10:
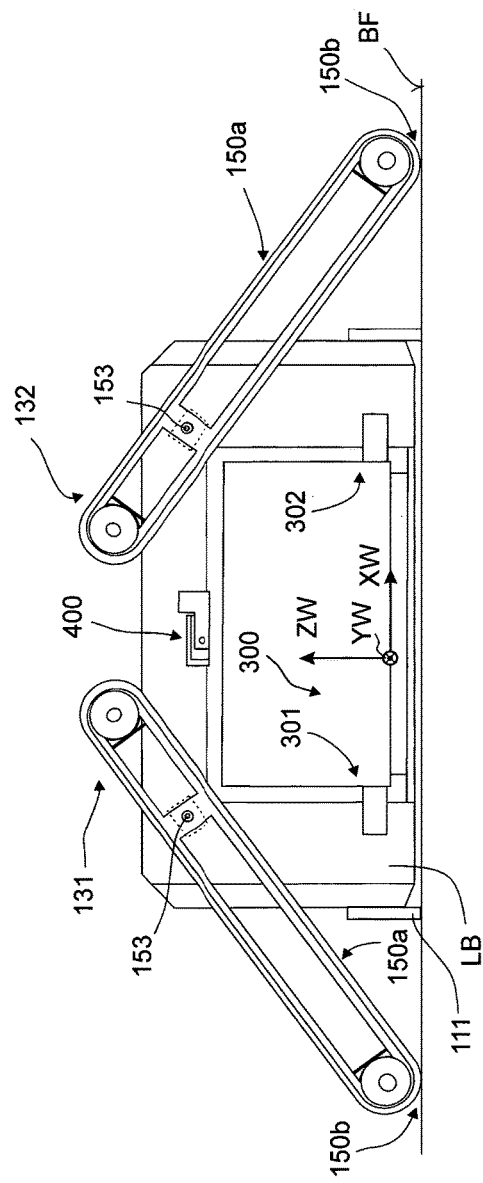
FIG. 10 shows a side view of the embodiment of an operating vehicle shown in FIG. 5 in an intermediate position for a transition between the ground operating position according to FIG. 8 and the ground operating position according to FIG. 9.

At the same time, in a further embodiment of the operating vehicle 100 it can be provided that the length DLB of the longer section 159 has a length for which in a certain rotational position range of the drive crawlers 131, 132, 141, 142, an underside 105 of the operating vehicle 100 has a distance H100 from the ground surface BF at which the running wheels 111, 112, 113, 114 are raised from the ground surface (FIG. 10). In particular, in this embodiment of the operating vehicle 100, the length DLB of the longer section 159 of a drive crawler 131, 132, 141, 142 can be at least a factor of 1.05 larger than the distance H153 between the pivot point 153 of the respective drive crawler 131, 132, 141, 142 and the lowest point of the running wheels which lie on that transverse side 103, 104 on which the relevant drive crawlers 131, 132, 141, 142 are arranged. This embodiment of the operating vehicle 100 allows another ground travel mode: with a corresponding drive of the drive crawlers 131, 132, 141, 142, the operating vehicle 100 can travel on the curved sections 150b of the drive crawlers 131, 132, 141, 142, where the operating vehicle 100 in this case travels in a direction running transversely, and in particular perpendicular, to the direction of travel in which the operating vehicle 100 can travel with the running wheels 111, 112, 113, 114.

Figure 40:
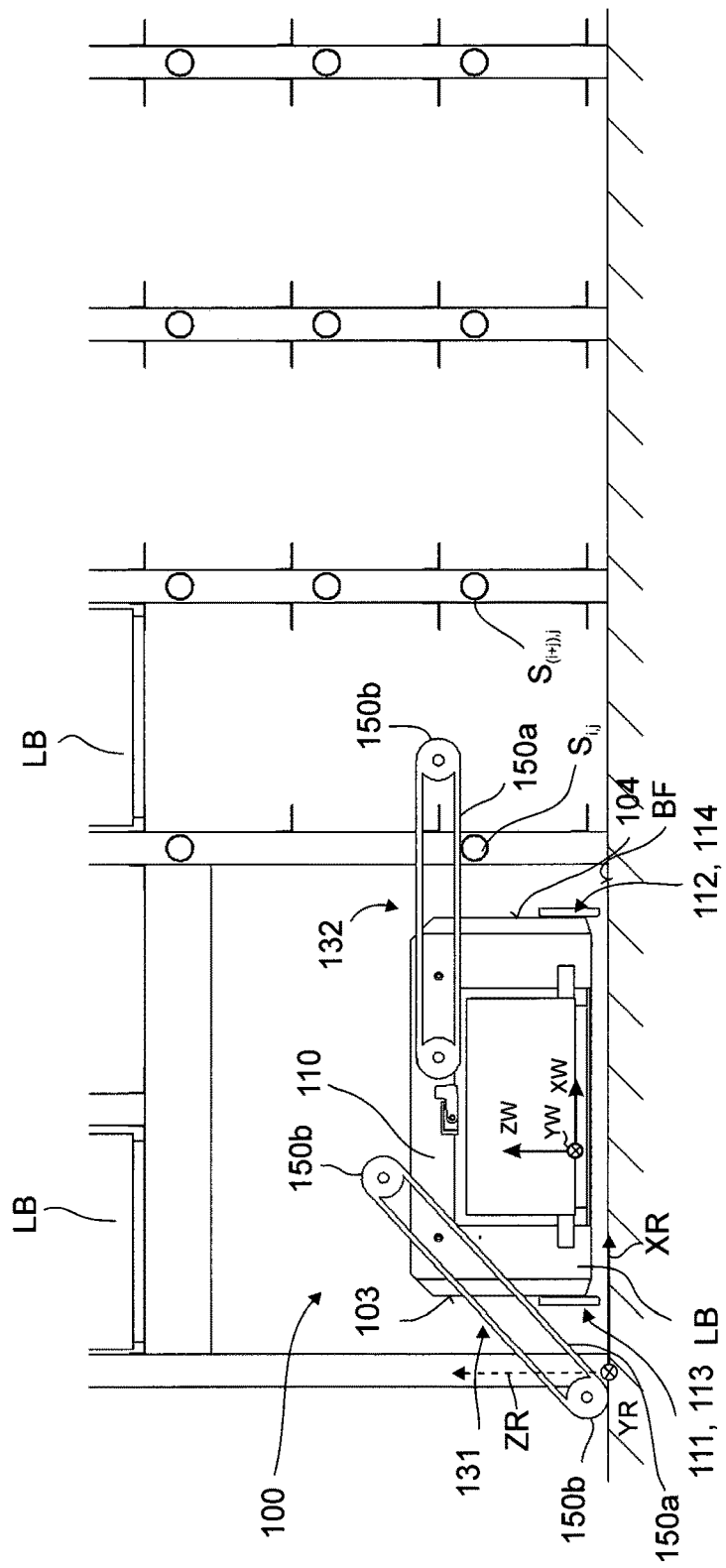
Figure 41:
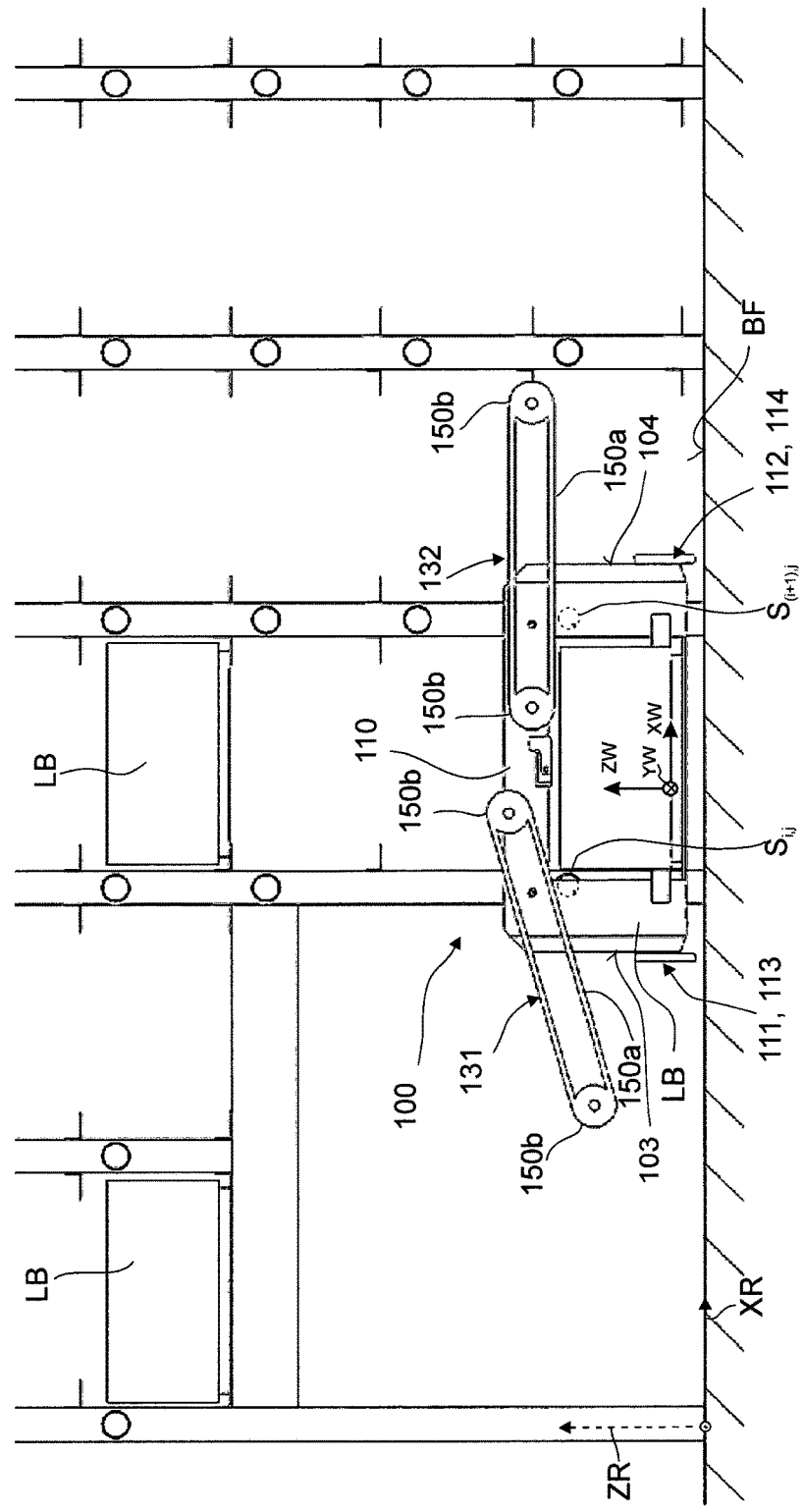

In this embodiment of the operating vehicle 100, it is possible that the operating vehicle 100 can be brought independently and by corresponding rotation of the drive crawlers 131, 132, 141, 142 from the ground travel mode according to the diagram in FIG. 5 or FIG. 8 into a rack travel mode (FIGS. 1 to 3): with the respectively longer sections 159 of drive crawlers arranged on a first of the transverse sides 103, 104, in the example of FIG. 5 those on the transverse side 104 (in the example, the drive crawlers 132 and 142), the respectively first transverse side is raised on a first support part $S_{i,j}$ so that the running wheels arranged on the respectively first transverse side (in the example, the transverse side 104) are raised from the ground surface BF (FIG. 40). Those drive crawlers (in the example, the drive crawlers 131 and 141) which are located on the second transverse side opposite to the respectively first transverse side (in the example the transverse side 103) with the curved section 150b of the drive belt 150 have contact with the ground surface BF and are in a rotational position in which the running wheels (in the example the running wheels 111, 113) located on the respectively second transverse surface (in the example, the transverse side 103) are raised with approximately the same distance from the ground surface BF as the running wheels on the first transverse side. This is the state shown in FIG. 40. In this position, the operating vehicle 100 can be moved in the XR direction whereby the drive belts 150 of the drive crawlers 131, 132, 141, 142 are moved in the corresponding direction and speed. After a certain distance in the XR direction, the drive crawlers located on the first transverse side (in the example the drive crawlers 131 and 141) come in contact with the respectively first support part $S_{i,j}$ whilst the drive crawlers each located on the first transverse side already rest on a support part $S_{(i+1),j}$ located further in front when viewed in the XR direction. Thus, the operating vehicle 100 is located in the rack travel mode in which the operating vehicle 100 can be brought into the horizontal path travel mode (top of FIG. 2 and FIGS. 3 and 41) or the diagonal path travel mode (middle of FIG. 2). Consequently the support parts $S_{i,j}$ or supporting elements and the drive crawlers 131, 132, 141, 142 are arranged such that the operating vehicle can change from travel in the rack to travel on the ground without further aids.

For this purpose, it is provided in particular that the rotational axes of the drive crawlers 131, 132, 141, 142 are arranged above the passage 121, 122.

In the ground mode, in particular by means of a conveying device of the operating vehicle 100, a ground receiving can be accomplished, i.e. a receiving of a storage container into the receiving space 120 of the operating vehicle 100 when the operating vehicle 100 is in ground mode. This can be accomplished in particular when the rotational axes of the drive crawlers 131, 132, 141, 142 are arranged above the passage 121, 122. The pivoting mechanism of the drive crawlers 131, 132, 141, 142 can be used as a lifting mechanism in order to perform a load transfer at different heights and a load transfer directly on the floor is also possible.

Alternatively to this, the rotational axes of the drive crawlers 131, 132, 141, 142 can be arranged below the passage 121, 122. In this embodiment of the operating vehicle 100, this can be designed in such a manner that a ground receipt or the described change from ground mode to rack mode cannot take place, but the rack mode can.

Contact of the drive crawlers 131, 132, 141, 142 of the operating vehicle with the support parts $S_{i,j}$ or travel lugs can be accomplished both in a frictionally engaged manner by means of suitably coated circulating drives and also positively by means of suitably configured circulating drives which, for example, engage with an external toothed structure into suitable toothed structures of the support parts $S_{i,j}$ or travel lugs.

For receiving and delivering a storage container in ground travel mode or rack travel mode, the operating vehicle 100 can furthermore have at least one positioning system which is designed in such a manner that this can insert a storage container LB through the passages 121, 122 into the receiving space 120 and move it out from this. In general the positioning system comprises at least one positioning part which is located in the receiving space 120 in such a manner that this abuts against a storage container LB or can be brought into abutment. In this case, the positioning part is moved by a drive motor to a position inside the receiving space 120 or from a position inside the receiving space 120 in the YW direction to the respective opening 121, 122 so that a storage container LB which abuts against the positioning part is moved by the positioning part out of the respective opening and can be moved into a storage area LC of a storage rack 1, 2.

The positioning system can be formed from one or two, or more than two positioning devices. Container positioning devices are described in the following which can each be used individually or in combination for an operating vehicle 100 according to the invention or can be used in a different type of operating vehicle.

Figure 11:
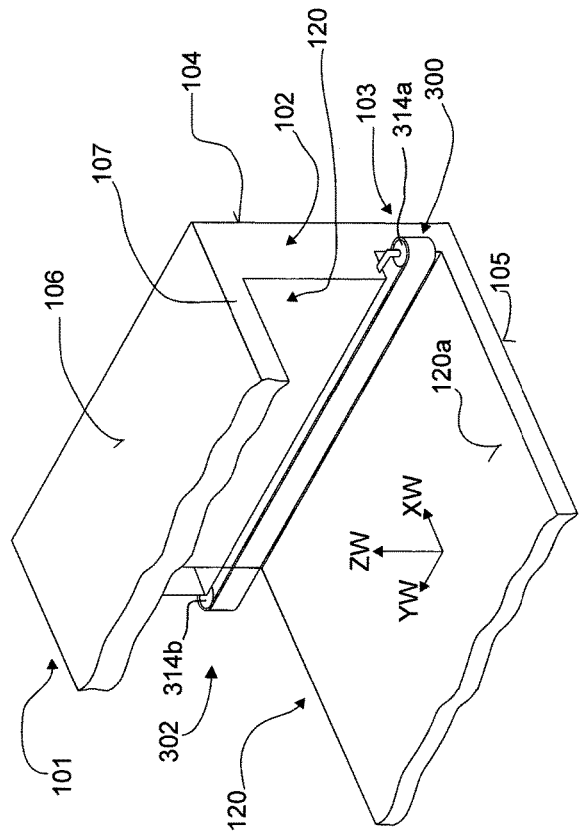
FIG. 11 shows a perspective schematic view of a section of an embodiment of the operating vehicle with an embodiment of a conveying device as a container positioning device which is formed from two belt drives, each of which is disposed on one of two mutually opposite outer sides of the receiving space.
Figure 12:
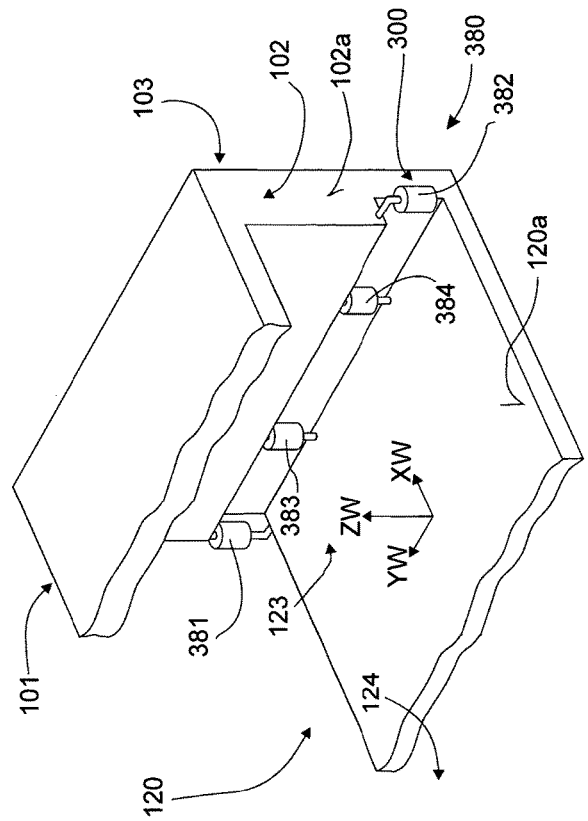
FIG. 12 shows a perspective view of a section of a further embodiment of an embodiment of the operating vehicle with a further embodiment of a conveying device as a container positioning device, which is formed from an arrangement of guide rollers of which one each is located on each of the two mutually opposite outer sides of the receiving space, wherein the embodiment of a conveying device can also be designed as a lateral guide device.
Figure 13:
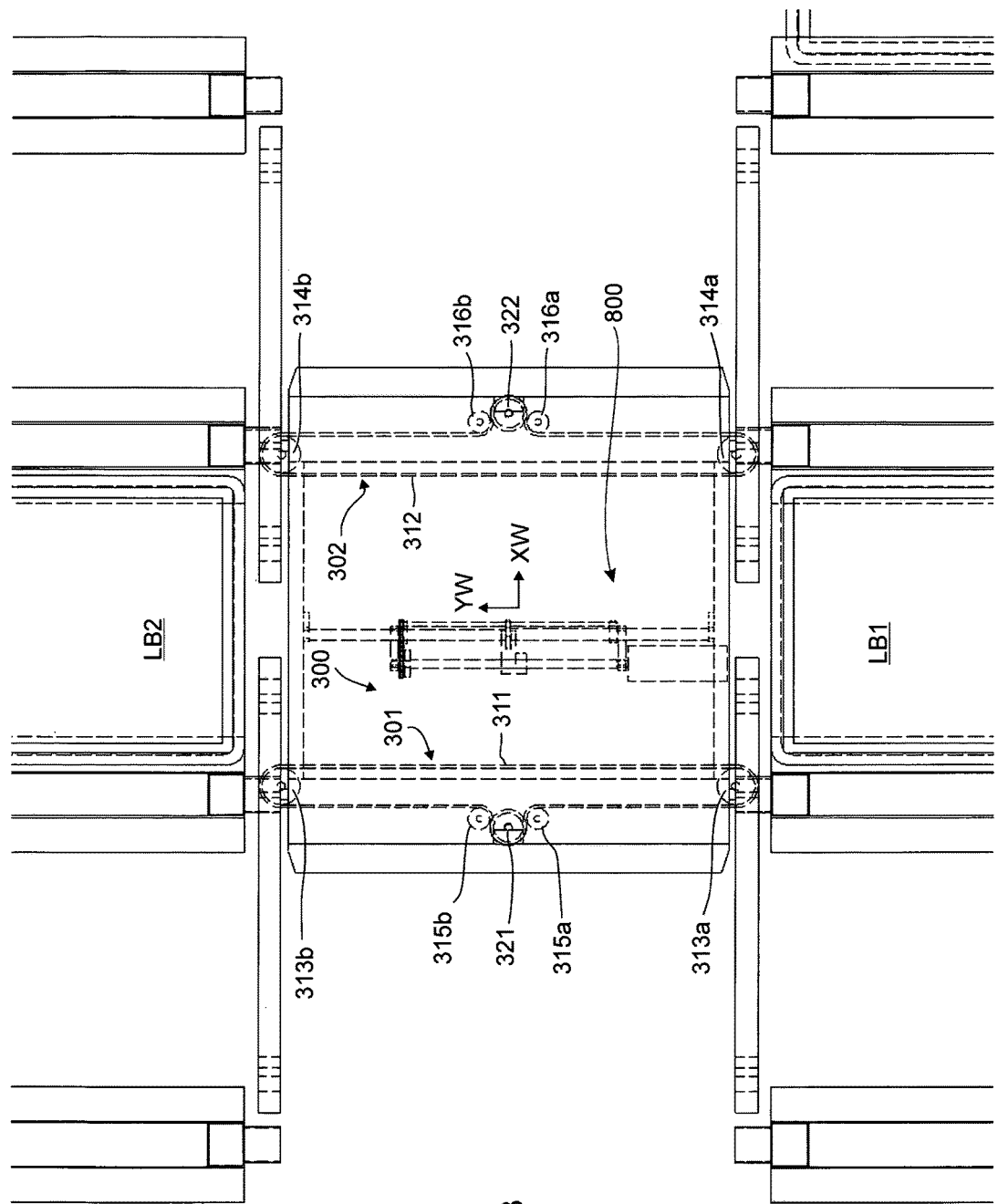
FIG. 13 shows a plan view of an operating vehicle according to FIG. 6 in which two positioning devices are each shown with dashed lines, wherein a first container positioning device is an embodiment of a conveying device implemented as a belt drive device and a second container positioning device is an embodiment of a gripping device.
Figure 15:
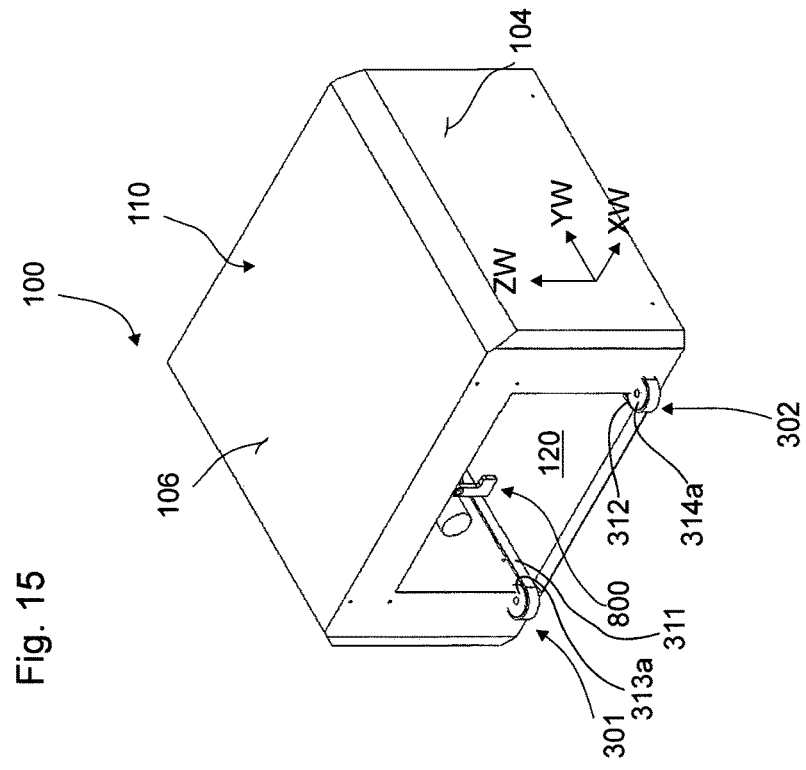
FIG. 15 shows a perspective view of the embodiment of the operating vehicle shown in FIG. 13.
Figure 14:
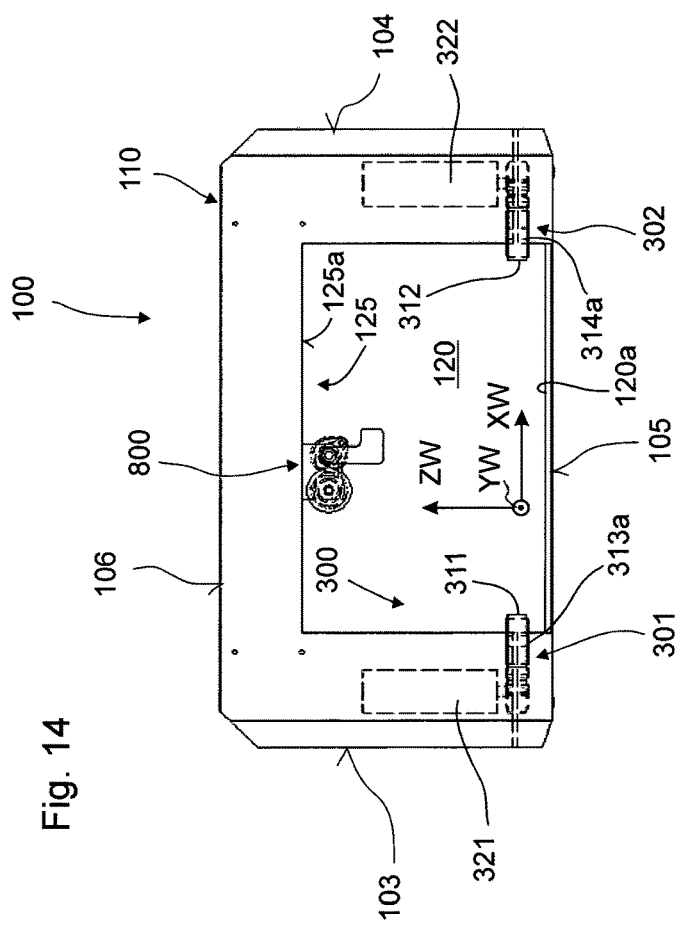
FIG. 14 shows a side view of the embodiment of the operating vehicle shown in FIG. 13.
Figure 19:
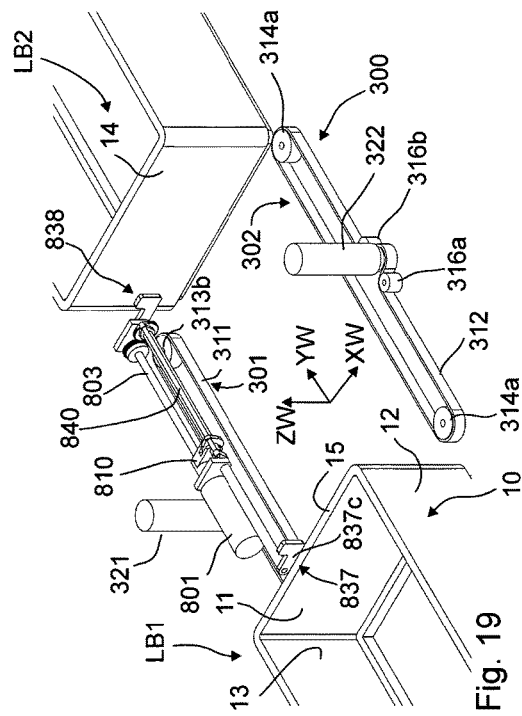
FIG. 19 shows a perspective view of the embodiment of the gripping device shown in FIGS. 16 and 17 in an operating state extended in a first positioning position in order to pull one of the containers out from the storage rack.

The positioning system can in particular be formed from positioning devices wherein one of the container positioning devices has two conveying devices which—as shown, for example, in FIGS. 11 to 13—each have a belt drive which are each arranged on one of two mutually opposite outer sides of the receiving space 120. When integrating the conveying devices into an operating vehicle 100, each conveying device is configured in such a manner that these stand in contact with respectively one of the mutually opposite side surfaces of a storage container LB of corresponding size and upon actuation of the same, introduce the storage container LB through one of the passages into the receiving space 120 or move it out from this.

In the embodiments of the operating vehicle 100 shown in FIGS. 7, 11 and 13 to 15, 17 as well as 30 to 35, this is formed with a positioning device in the form of a conveying device 300 comprising two belt drives 301, 302, of which each is arranged on one of the two opposite outer sides 123, 124 of the receiving space 120. Furthermore, each belt drive 301, 302 comprises one belt drive 311 or 312 and two deflecting rollers 313a, 313b or 314a, 314b. The deflecting rollers 313a, 313b or 314a, 314b can in particular be designed as drive rollers. In this embodiment, the following are provided:

a drive motor 321 or 322 functionally connected to a control device 510, a transmission mechanism 323 or 324 in particular in the form of a pinion for transmission of an initial torque of the drive motor 321 or 322 to the two deflecting rollers.

In one embodiment of the conveying device 300 with two belt drives 301, 302, when viewed in the transverse direction YW of the operating vehicle 100, respectively one deflecting roller 315a or 315b can be located before and after the output pinion 321a, 322a of the respective drive motor 321 or 322 adjacent to the respective output pinion 321a, 322a in such a manner that the respective drive belt 311 or 312 is pressed against a respective output pinion 321a, 322a of the respective drive motor 321 or 322.

Figure 30:
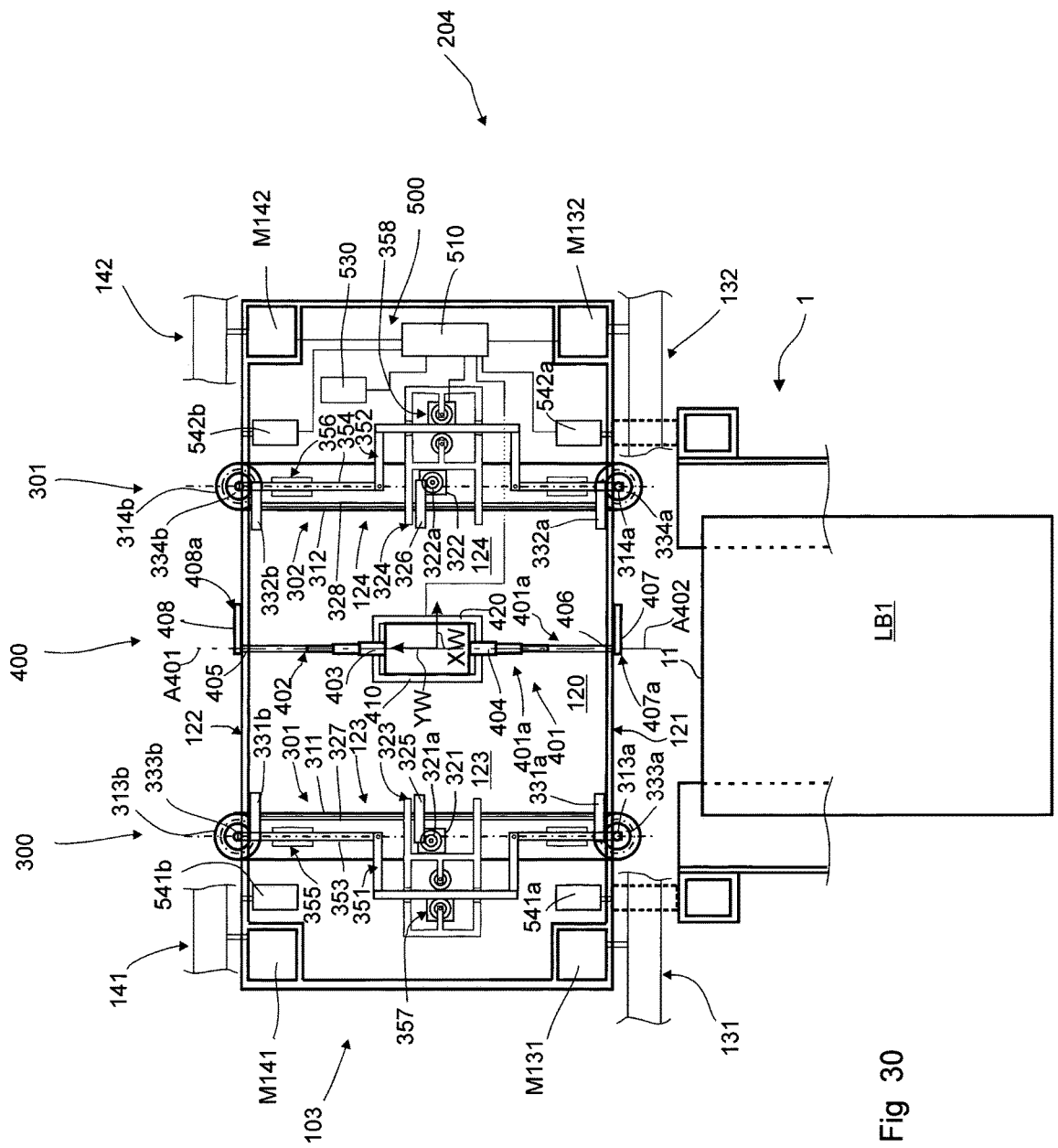
FIG. 30 shows a sectional view on the basis of the line L30-L30 in FIG. 5 of an embodiment of the operating vehicle with a conveying device which is formed from two belt drives and a further embodiment of a positioning device designed as a gripping device wherein the conveying device and the gripping device are each shown in a retracted position.
Figure 31:
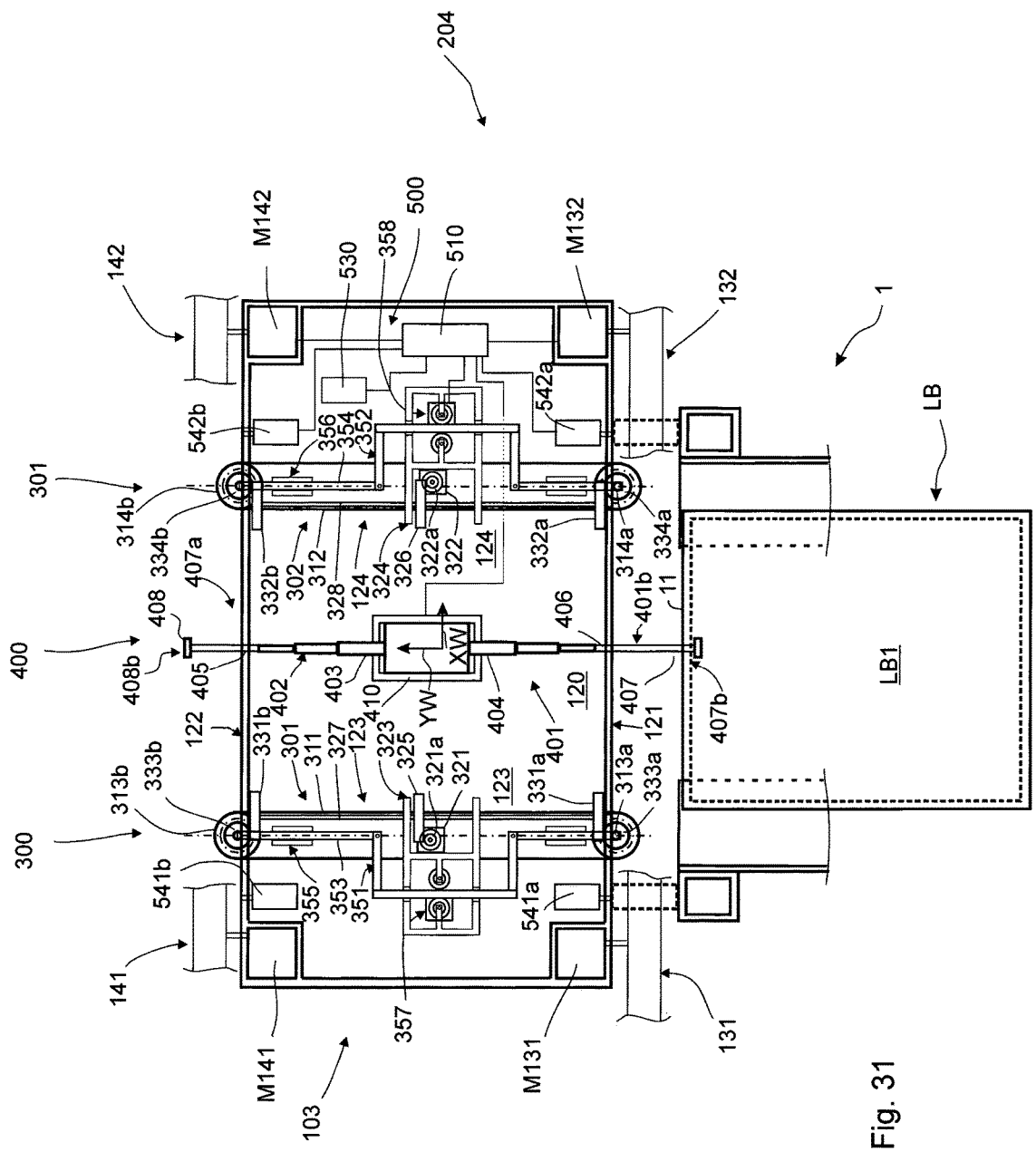
FIG. 31 shows the operating vehicle shown in FIG. 30 in the embodiment of FIG. 30 in an operating state in which the gripping device is located in engagement with a side wall of a storage container and has thereby not yet moved the storage container with respect to the storage rack in which the storage container is located.
Figure 32:
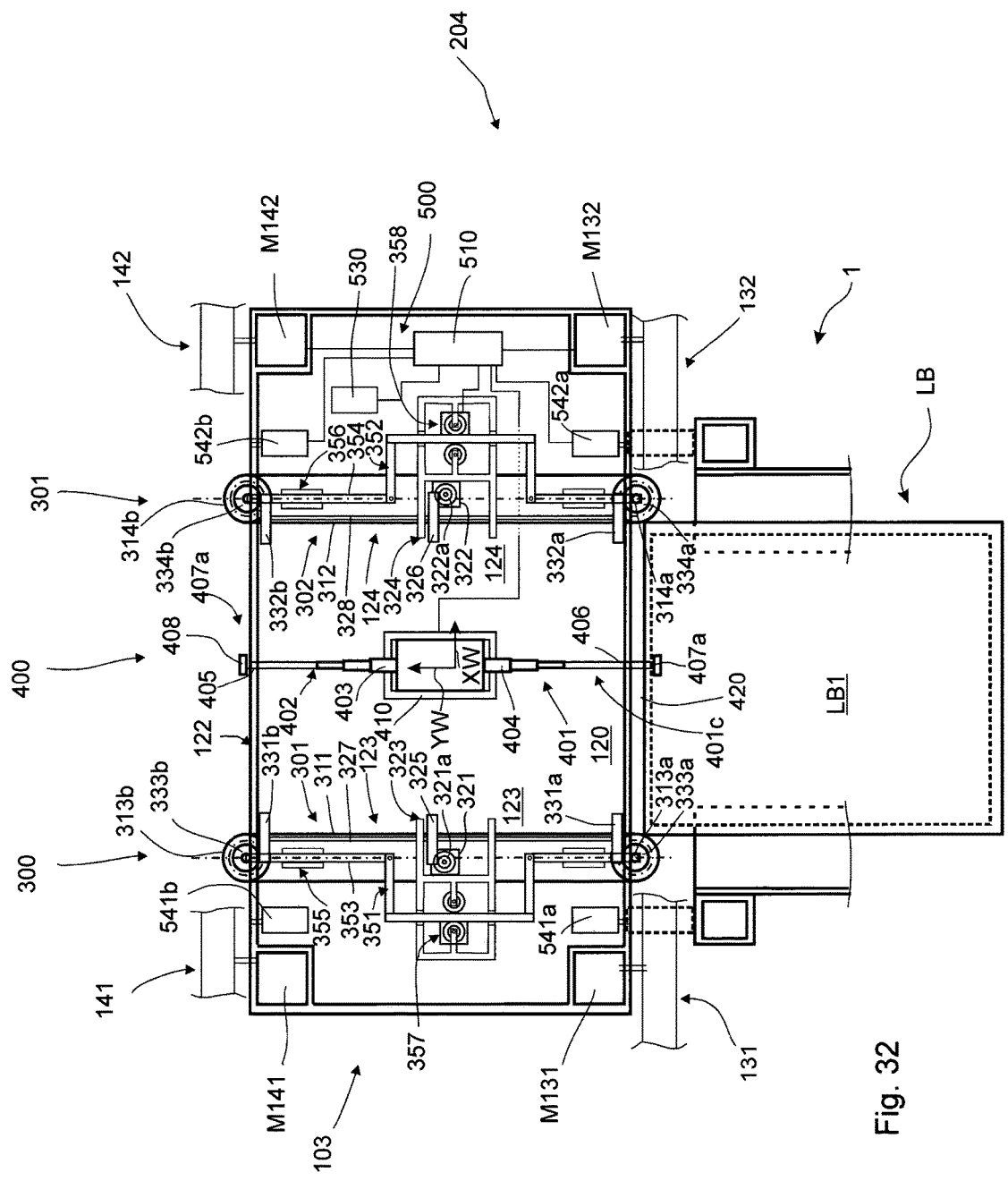
FIG. 32 shows the operating vehicle shown in FIG. 30 in the embodiment of FIG. 30 in an operating state in which the gripping device is located in engagement with a side wall of a storage container and has thereby moved the storage container partially from the storage rack in which the storage container is located into a position in which the storage container is in engagement with the conveying device.

In the embodiment shown in FIG. 30, the transmission mechanism 323 or 324 is implemented with a drive pinion 325 or 326 which is coupled to an output shaft of the drive motor 321 or 322 and to a transmission shaft 327 or 328, with pinions 321a, 321b or 322, 322b connected in a torque-proof manner to the transmission shaft 327 or 328, which are each coupled to a drive pinion 333a, 333b or 334a, 334b in order to drive the deflecting roller 313a, 313b or 314a, 314b coupled to this in the corresponding direction of rotation.

According to one embodiment shown in FIG. 30, each belt drive 310 extends in the transverse direction YW through the receiving space 120 and as an option, projects with an end section 311a, 311b beyond the surfaces 101a, 102a of the longitudinal sides 101 or 102. In this case, it can be provided in particular that the end sections 311a, 311b do not project further beyond the respective surface 101a, 102a of the respective longitudinal side 101 or 102 than the distance a 142 (FIG. 7) of the lateral outer edge of the respective drive crawlers 131, 132, 141, 142 when viewed in the YW direction at the location of the belt drive 310, 302.

Figure 35:
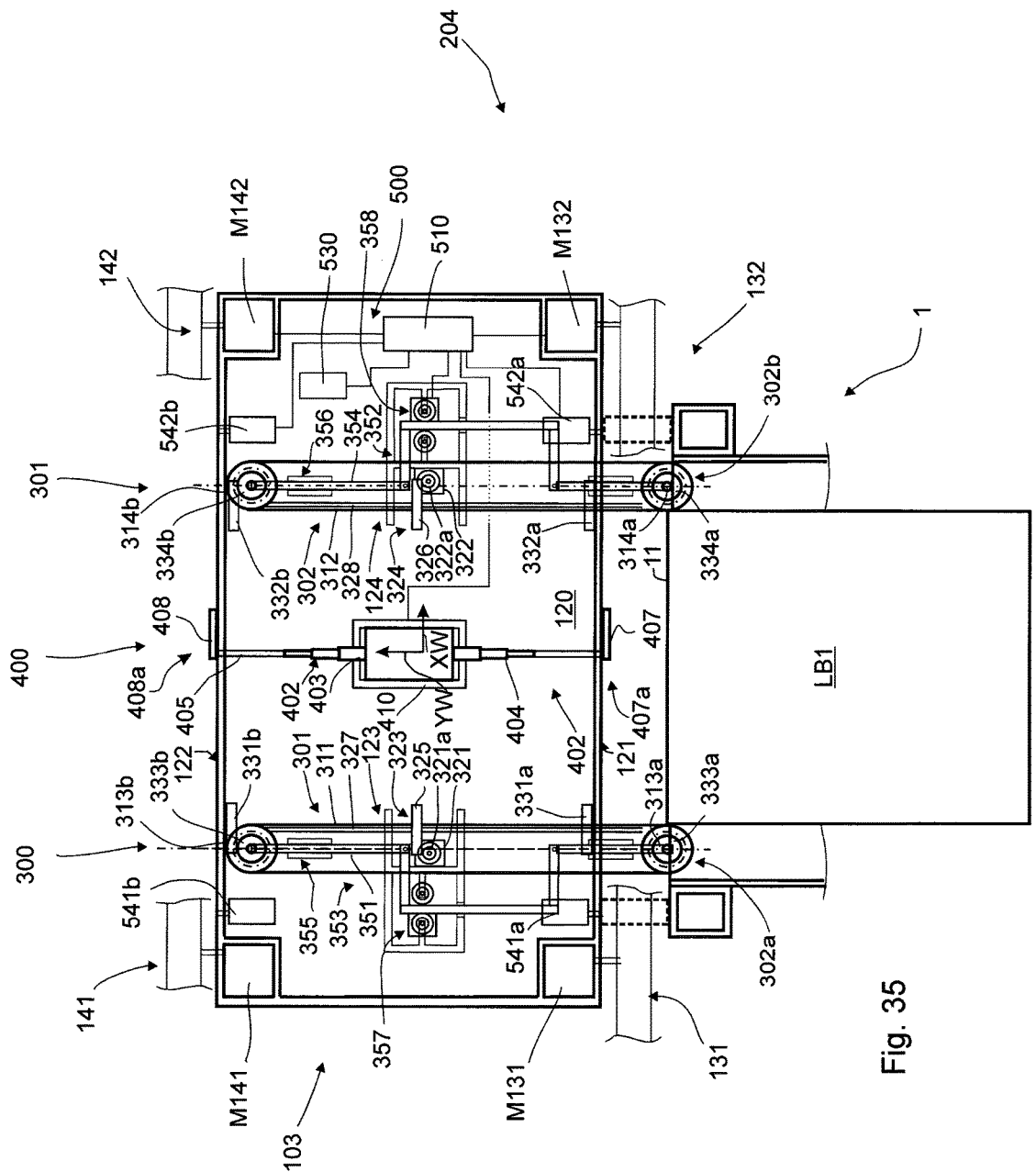
FIG. 35 shows the embodiment of an operating vehicle according to FIG. 30 in the same manner of representation, wherein the conveying device is shown in an extended position compared with the position in FIGS. 33 and 34, in which the conveying device is in abutment with the storage container and wherein the gripping device is located in the retracted state.

According to the embodiment of the conveying device 300 shown in FIG. 30, a belt drive positioning device 351, 352 is additionally provided, by which means a respective belt drive can be moved out at least in sections from the receiving space 120 (state 302b in FIG. 35). The belt drive positioning device 351, 352 is formed from:

a support device 353 or 354 at the end sections whereof respectively one of the deflecting rollers is mounted, a guide device 355 or 356 on which the support device 353 or 354 is mounted displaceably in the YW direction, a drive device 357 or 358 located in abutment or in engagement with the support device 353 or 354, which is functionally connected to the control device 510 and which upon corresponding actuation performs a displacement of the support device 353 or 354.

The control device 510 can in particular be connected to the motors M131, M132, M141, M142 of which respectively one is coupled to one of the drive crawlers 131, 132, 141, 142 in order to rotate these in each case and thus be able to bring them into predetermined rotational positions.

Furthermore a control system 500 is also provided according to the invention which can be used in each of the embodiments described herein and which comprises:

the control device 510, a position sensor device 530 and position sensors 541a, 541b, 542a, 542b, which can be arranged in particular on the longitudinal sides 101, 102.

In general, a control system 500 can be provided for respectively one positioning device and connected to this. It can however also be provided that for a plurality of positioning devices of an operating vehicle 100, overall one control system 500 is connected functionally to these.

The position sensor device 530 is functionally connected to the control device 510. In the control device 510, a regulating function can be implemented which allows an adjustment of the drive crawlers 131, 132, 141, 142 between a horizontal travel mode and a diagonal travel mode with the spatial position of the vehicle frame 110 remaining constant. Furthermore, in the control device 510 an identification function can be implemented or contained by which means information detected by the sensors about the position of the operating vehicle 100 on a storage rack and, for example, on a support part $S_{i,j}$ or a vertical rod Ri or the respectively current difference from a storage container region LC to be reached can be determined and displayed. In this way, the operating vehicle 100 can travel to predetermined positions of the storage rack 1, 2. For this purpose, it can be provided that an identification sign for the respective storage container region LC such as, for example, a code representation can be applied to the vertical rod of a storage rack 1, 2 at each storage container region LC so that when identifying such a sign, the control device 510 assumes that the operating vehicle 100 has reached a desired position on a storage rack 1, 2.

For clarity the figures do not show the function lines from the control device 510 to the components located on the other side of the drive device 410 in FIGS. 1 to 15 when viewed from this.

In general, the conveying device 300 can be formed from a positioning part which can be brought into abutment with an outer surface of the storage container LB. The storage container LB can then be moved by the positioning part which is driven by a drive motor coupled to the positioning part and can be moved along the receiving space insertion or removal direction and out from the receiving space 120 and into a storage region C. The positioning part can be a slider which is coupled to a servomotor such as a linear motor. The positioning part can also be implemented by a drive roller mounted rotatably at the side of the receiving space 120 which is coupled to a servo motor to produce a rotational positioning movement in order to be able to move this in abutment with a storage region C out from the receiving space 120 and into a storage region C.

In the embodiment of the operating vehicle 100 shown in FIG. 12, the conveying device 300 is formed from two arrangements 380 of guide rollers of which each is respectively arranged on one of the two opposite sides 112, 124 of the receiving space 120. In the embodiment of the arrangements 380 of guide rollers shown, each arrangement is formed from two outer guide rollers 381, 382 and two middle guide rollers 383, 384. The guide rollers are mounted rotatably in such a manner that their rotational axes run in the height direction ZW or along the height direction. As shown in FIG. 30, the two outer guide rollers 381, 382 can be mounted rotatably outside the receiving space 120. This has the advantage that a storage container can be guided over the respective lateral surface 101a, 102a when moving out from the receiving space 120 or moving into the receiving space 120. Respectively one arrangement of guide rollers 381, 382, 383, 384 is arranged on each of the two opposite outer sides 123, 124 of the receiving space 120. As a result, the arrangements 380 of guide rollers are located in such a manner that these can laterally guide a storage container LB located in the receiving space 120 when this is moved out from the storage container LB or moved into the receiving space 120 in or along the YR direction.

A drive motor functionally connected to the control device 510 can be coupled to one or more of the guide rollers 381, 382, 383, 384, by which means the respective guide rollers 381, 382, 383, 384 can be driven, i.e. can be set in rotation. In this way, respectively driven guide rollers 381, 382, 383, 384 in the additional function as drive rollers when the same abut against the surfaces of respectively opposite sides of the storage container LB, move this storage container LB out of the receiving space 120 and therefore convey this out or, by means of the external guide rollers when these are already abutting against longitudinal sides of a storage container LB, pull this into the receiving space 120 of the operating vehicle 100.

Furthermore the operating vehicle 100 can have a further positioning device designed as a gripping device with a positioning part with which a storage container LB can be gripper or which can be brought into abutment with a storage container LB and can be moved by executing positioning movements of the storage container LB relative to the operating vehicle 100.

An embodiment of such a gripping device is described hereinafter with reference to FIGS. 13 to 29, which is there designated with the reference number 800:

The gripping device 800 can be mounted on an upper surface 125a of an upper wall 125 of the vehicle frame 110 which delimits the receiving space 120 of the operating vehicle 100 in the direction of the vertical axis ZW. The gripping device 800 has a servo drive device 801 which is functionally connected to a control device 510 by means of a signal line 801a (FIG. 30). Furthermore, the gripping device 800 has a drive spindle 803 which is connected to a spindle drive motor (not actually shown) of the servo drive device 801 and an adjusting rod or finger axle 830. The control device 510 can produce spindle positioning signals and transmit them to the servo drive device 801 where the servo drive device 801 is designed in such a manner that as a result of each spindle positioning signal, this sets the drive spindle 803 into one of two mutually oppositely directed directions of rotation and thereby can move in both the directions of rotation. The drive spindle 803 is rotatably mounted on the vehicle frame 110 and can for this purpose be rotatably mounted in particular with a first end section 803a in a first mounting device 804 attached to the vehicle frame 110 and with a second end section 803b located opposite to the first end section 803a rotatably mounted in a second mounting device 805 attached to the vehicle frame 110. A spindle nut 810 is engaged with the drive spindle 803, which spindle nut is therefore arranged displaceably along the longitudinal axis A803 of the drive spindle 803.

The finger axle 830 is longitudinally displaceable along its longitudinal axis A803 and is mounted rotatably on the vehicle frame 110 and can thereby be mounted longitudinally displaceably and rotatably in particular in the first mounting device 804 and the second mounting device 805. The longitudinal axis A830 of the finger axle 830 in this case runs parallel to the longitudinal axis A803 of the drive spindle 803. A slider part 811 is attached to the spindle nut 810 which in particular is designed in one piece with the spindle nut 810 or can be part of the spindle nut 810. The slider part 811 has a joint mount 814 for the articulated receipt of a joint part 832 of an adjusting disk 831 so that the joint mount 814 and the joint part 832 together form a pivot joint device 815 having a rotational axis 815a. The rotational axis 815a runs parallel to the longitudinal axis A803 of the drive spindle 803.

The adjusting disk 831 is connected to the finger axle 830 in a torque-proof manner and can in particular be formed in one piece with this. At the same time, the adjusting disk 831 is arranged on the finger axle 830 in such a manner that the adjusting disk 831 is articulated with an edge section to the slider part 811. The adjusting disk 831 is also attached with an edge section to a drive rod 840 which extends parallel to the finger axle 830. The adjusting disk 831 has a longitudinal guide 831a, in particular in the form of a through bore in which the drive rod 840 is guided longitudinally displaceably with respect to the adjusting disk 831 and therefore the finger axle 830. The adjusting disk 831 forms a lever arm which brings about a movement of the drive rod 840 in the circumferential direction of the finger axle 830 around this in a direction of rotation of the adjusting disk 831 and thereby brings about a rotation of the finger axle 830 about its longitudinal axis A830. For this purpose, the drive rod 840 is mounted or fastened with a first section and in particular a first end section 840a in a first bearing part 847 and is mounted or fastened with a second section and in particular a second section 840b located opposite to the first end section 840a in a second bearing part 848. The first bearing part 847 and the second bearing part 848 each have a bearing device 847a or 848a with which the first bearing part 847 and the second bearing part 848 are each mounted rotatably and longitudinally displaceably on the finger axle 830. With a displacement of the finger axle 830 by means of the spindle nut 810 relative to the first mounting device 804 and the second mounting device 805, the first bearing part 847 and the second bearing part 848 are displaced relative to the finger axle 830 since the first bearing part 847 and the second bearing part 848 are held at a constant distance by the drive rod 840 and the drive rod 840 is displaced in the longitudinal guide 831a relative to the adjusting disk 831 since the first bearing part 847 and the second bearing part 848 are guided displaceably on the finger axle 830. The range of movement of the first bearing part 847 and the second bearing part 848 is in this case delimited by the mutually facing surfaces of the first mounting device 804 and the second mounting device 805.

On a first end section 830a of the finger axle 830, a hook or a finger 837 is fastened in a torque-proof manner to the finger axle 830. Furthermore, on a second end section 830b of the finger axle 830 located opposite the first end section 830a, a hook or a finger 838 is fastened in a torque-proof manner to the finger axle 830. The hooks 837, 838 comprise: a connecting section 837a or 838a, which is located in the region of the connection of the respective hook 837 or 838 to the finger axle 830 and preferably has a bore 837b or 838b for receiving and fastening the finger axle 830, as well as a hook section 837c or 838c which projects radially from the longitudinal axis A830. Consequently, a rotation of the finger axle 830 about its longitudinal axis A830 brings about a rotation of the hook 837 and 838 and a pivoting of the engaging sections 837a or 838a.

A coupling part 850 is attached in a torque-proof manner to the second end section 803b, which comprises an electromagnet which is electrically connected to the control device 510. Furthermore a first pinion 851 is mounted rotatably and longitudinally displaceably on the second end section 803b of the drive spindle 803. The first pinion 851 is located adjacent to the coupling part 850. The first pinion 851 is engaged with a second pinion 852 which is mounted rotatably on the finger axle 830 and connected in a torque-proof manner to the second bearing part 848.

The servo drive device 801 can comprise a magnetic coupling positioning device which, in response to a magnetic coupling activation signal generated by the control device 510 generates a corresponding magnetic coupling actuation signal and transmits this to the electromagnet via a signal line not shown. Alternatively the magnetic coupling positioning device can be part of the control device 510 so that the control device 510 also generates the magnetic coupling actuation signal. The electromagnet is configured in such a manner that as a result of the receipt of a magnetic coupling actuation signal, as a result of the magnetic force thereby produced, the first pinion 851 which is mounted longitudinally displaceably on the drive spindle 803 is attracted and couples in the direction of rotation. The first pinion 851 is engaged with a second pinion 852 which is mounted rotatably on the finger axle 830 and connected in a torque-proof manner to the second bearing part 848.

The operating mode of the gripping device 800 is as follows:

In an initial position shown in FIG. 17, the finger axle 830 is located in a neutral position relative to the drive spindle 803. As a result of the generation of a spindle positioning signal, the drive spindle 803 is set in rotation and the finger axle 830 is thereby displaced by means of the spindle nut 810 relative to the drive spindle 803. If no magnetic coupling positioning signal has been transmitted to the electromagnet of the coupling part 850, the first pinion 851 is not rotated with the drive spindle 803 and is at best only insignificantly set in rotation. When the coupling part 850 is rotationally coupled with the first pinion 851 as a result of a magnetic coupling activation signal and the drive spindle 803 is rotating or set in rotation, the rotational movement of the first pinion 851 is transmitted to the second pinion 852 which is in engagement with this. As a result of the rotation of the second pinion 852, the finger axle 830 and thus the fingers 837, 838 are rotated via the drive rod 840 and the adjusting disk 831. During the rotation of the fingers 837, 838, a rotation of the drive spindle 803 takes place at the same time and therefore also an advance movement of the finger axle 830 with the fingers 837, 838 which however is negligible if the rotational movement of the fingers 837, 838 to be executed in each case extends over about a quarter rotation of the drive spindle 803.

If the gripping device 800 is installed in an operating vehicle 100, in this way the finger axle 830 can be adjusted and positioned in the vehicle transverse direction YW and—when operating the operating vehicle 100 in a storage rack arrangement LA—relative to a container LB in a storage rack 1 of the storage rack arrangement LA. In addition, in each position of the finger axle 830 the fingers 837, 838 can be turned and in particular hooked into a storage container LB or a device attached thereon in order to move the respective storage container LB relative to the storage rack 1 when the finger axle 830 is moved by corresponding rotation of the drive spindle 803.

It is described hereinafter with reference to FIGS. 18 to 25 how, by means of a gripping device 800 according to FIG. 16 on an operating vehicle (e.g. the operating vehicle 100) travelling in a storage rack arrangement LA, a storage container LB located in a storage rack 1 of the storage rack arrangement LA, which in FIGS. 18 to 29 is provided with the reference number 10, is moved into the operating vehicle. In FIGS. 26 to 29 it is described how, by means of a gripping device 800 according to FIG. 16, which is attached to an operating vehicle travelling in a storage rack arrangement LA, a storage container LB located in an operating vehicle is moved into a storage rack 1, e.g. of the storage rack arrangement LA. The storage containers are generally provided with the reference numbers 10 in FIGS. 18 to 29. At the same time, the operating vehicle, as shown in FIGS. 18 to 25, can have an additional positioning device in particular in the form of the conveying device 300. However, the method can be implemented with the gripping device 800 or with a variant of the gripping device 800 alone, that is without the gripping device 800 shown especially in FIG. 16. The gripping device 800 can also be installed in a different type of operating vehicle than an operating vehicle designed according to the invention. The storage containers are generally provided with the reference number 10 in FIGS. 18 to 29 and the side walls thereof are provided with the reference numbers 11, 12, 13, 14.

Figure 21:
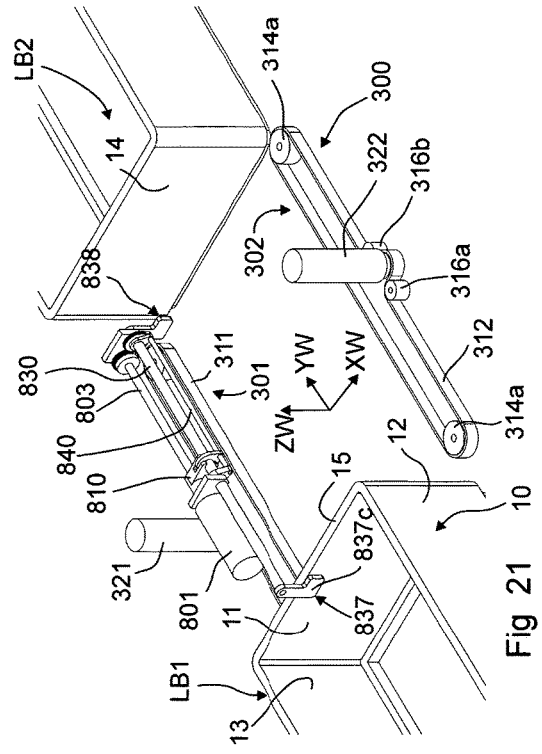
FIG. 21 shows a perspective view of the embodiment of the gripping device shown in FIGS. 16 and 17 in an operating state in which the coupling hook grips behind a side wall of the storage container.
Figure 18:
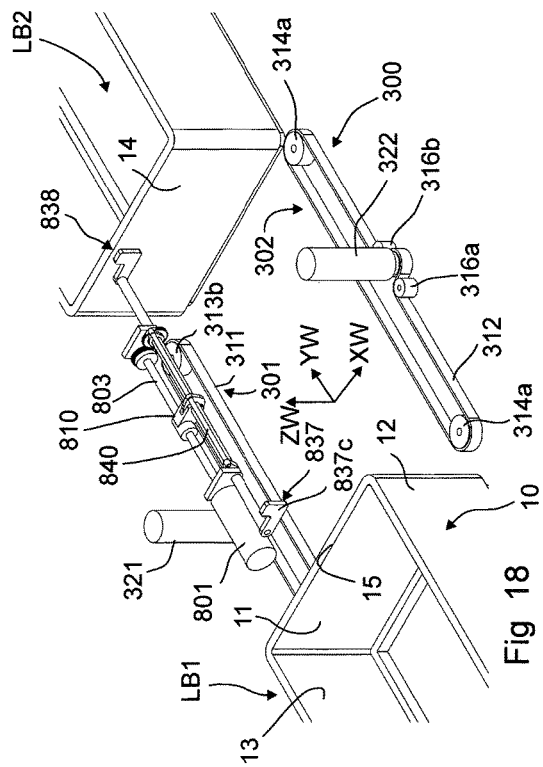
FIG. 18 shows a perspective view of the embodiment of the gripping device shown in FIGS. 16 and 17 in a first retracted operating state where two storage containers are shown which are each located in different storage racks of a storage rack arrangement.
Figure 20:
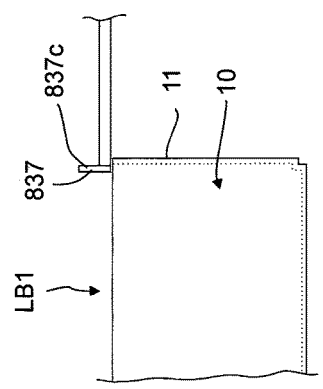
FIG. 20 shows a side view of a rotatable coupling hook of the gripping device shown in FIGS. 16 and 17 in a position which this adopts in the first retracted operating state and up till the grasping of a container.
Figure 23:
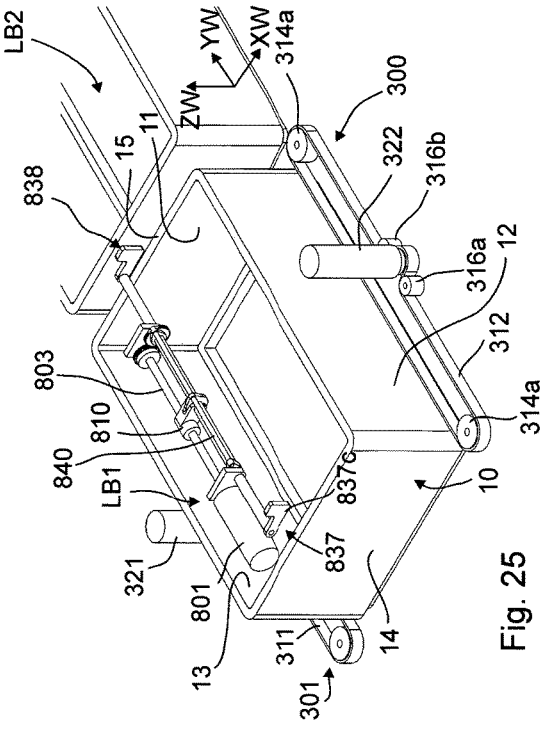
FIG. 23 shows a perspective view of the embodiment of the gripping device shown in FIGS. 16 and 17 in an operating state in which the coupling hook is located in a decoupling position in relation to the storage container.
Figure 24:
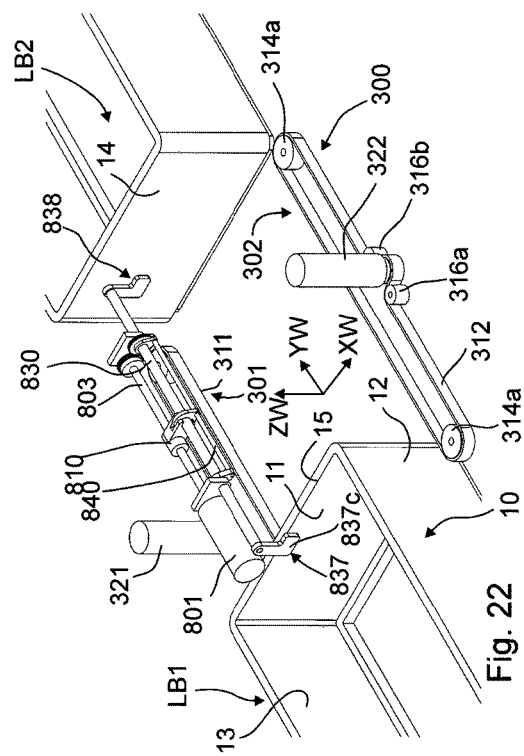
FIG. 24 shows a perspective view of the embodiment of the gripping device shown in FIGS. 16 and 17 in an operating state in which the storage container is moved by the conveying device into the receiving space of an operating vehicle.
Figure 25:
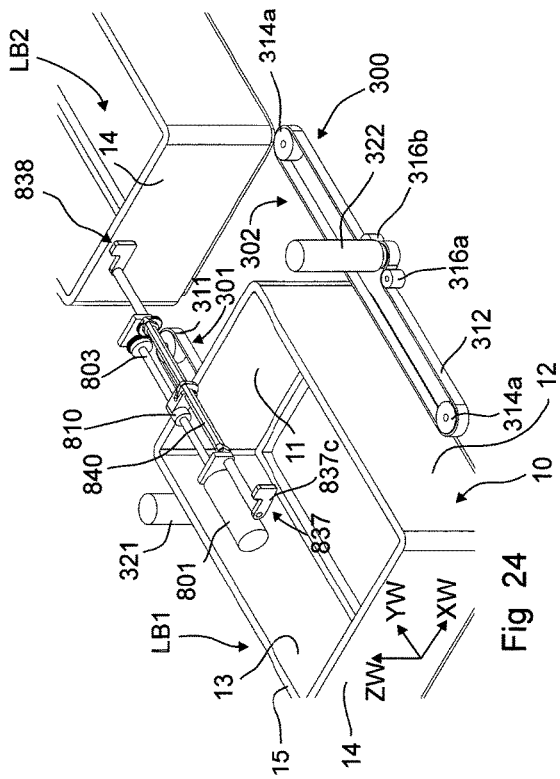
FIG. 25 shows a perspective view of the embodiment of the gripping device shown in FIGS. 16 and 17 in an operating state in which the storage container has been moved by the conveying device completely into the receiving space of an operating vehicle, FIGS. 26 to 29 each show perspective views of the embodiment of the gripping device and the conveying device shown in FIGS. 16 and 17 in operating states which occur during movement of a storage container out from the receiving space of an operating vehicle into a storage rack.

For moving out a storage container 10 from a storage rack 1 in an initial situation shown in FIG. 18 in which the finger axle 830 of the gripping device 800 is located in a neutral position, the finger axle 830 is moved as a result of a spindle actuation signal along the vehicle transverse direction YW, in the example shown contrary to the vehicle transverse direction YW, until the finger 837 reaches over the side wall 11 of the storage container 10 located on the vehicle. This state is shown in perspective view in FIG. 19 and in FIG. 20 a section is shown in a side view. During this movement and in this position, the finger 837 is in a position in which the hook section 837c extends to the side, i.e. in the ZY direction or upwards, i.e. in the ZW direction and not downwards. In this state, as a result of a magnetic coupling activation signal and a spindle actuation signal, the finger axle 830 is turned downwards (contrary to the ZW direction) and into a position in which the hook section 837c grips behind the side wall 11 of the storage container 10 (FIG. 21). In this position, the finger axle 830 is moved as a result of a corresponding spindle actuation signal along the vehicle transverse direction YW, in the example shown contrary to the vehicle transverse direction YW until the storage container 10 comes into engagement with the conveying device 300, i.e. the conveyor belts 311, 312 abut against the side walls 12, 13 of the storage container 10. In this situation, the motors 321, 322 of the conveying device 300 are actuated in such a manner that the conveyor belts 311, 312 move the storage container 10 completely into the receiving space 120 of the respective operating vehicle (FIGS. 24 and 25). Previously or during this movement, as a result of a magnetic coupling activation signal as well as a spindle positioning signal, the finger axle 830 is rotated into a position in which the hook section 837*c* extends to the side, i.e. in the ZR direction or upwards, i.e. in the ZW direction and not downwards (FIG. 23).

Figure 26:
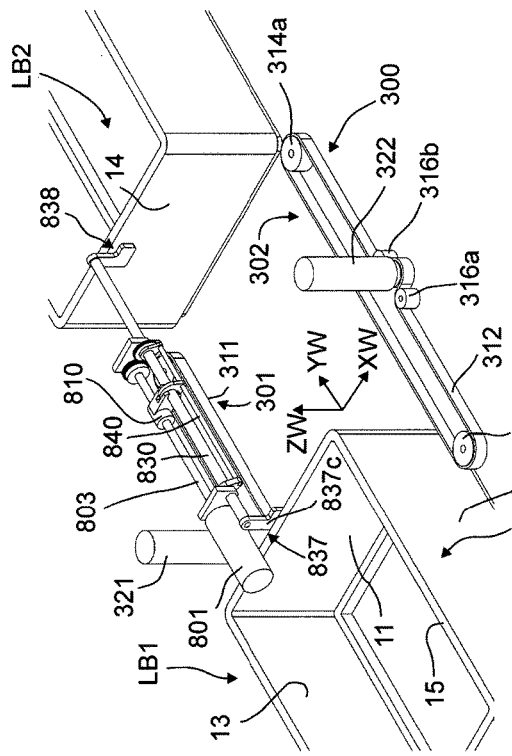
Figure 27:
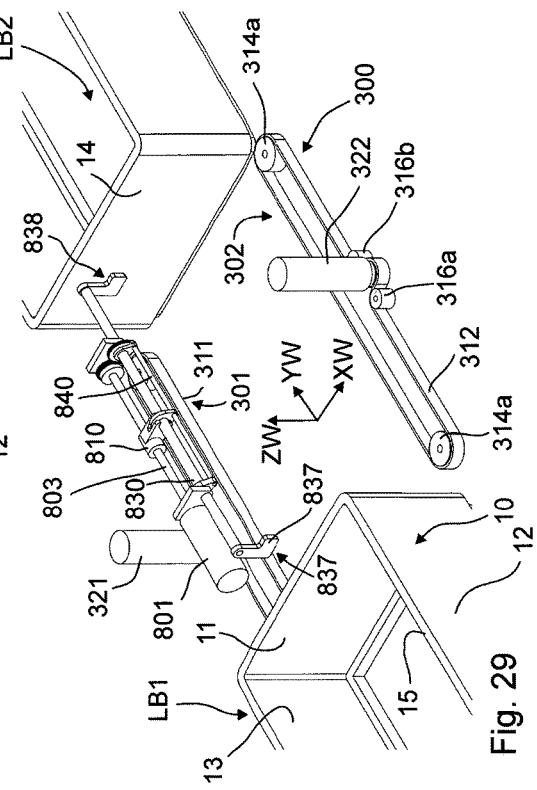
Figure 28:
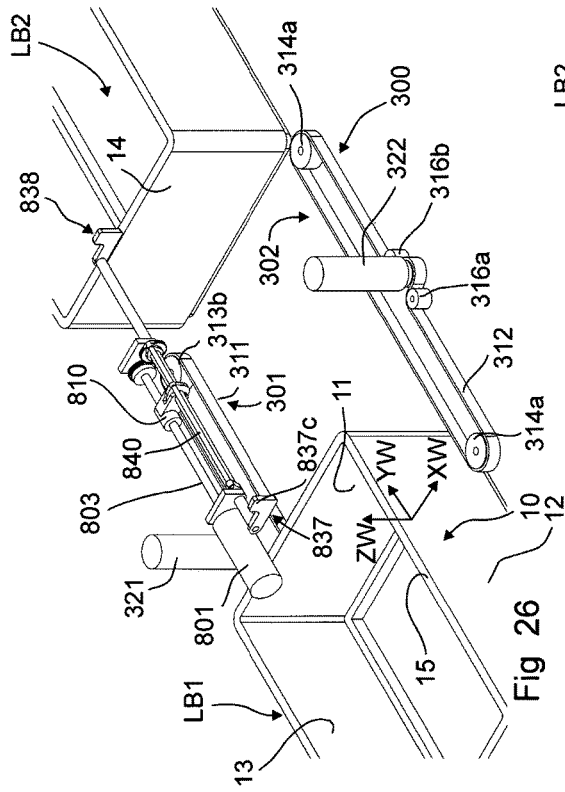
Figure 29:
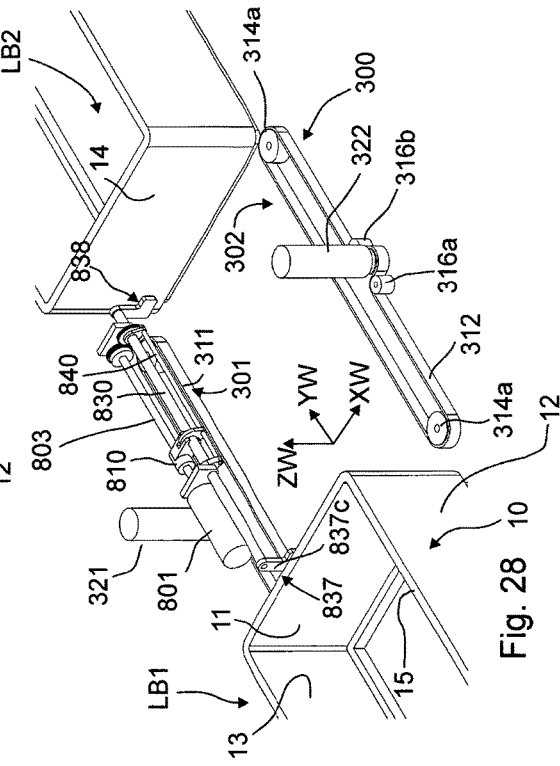

During movement of a storage container 10 out from the receiving space 120 of the respective operating vehicle, in the situation of FIG. 25 the motors 321, 322 of the conveying device 300 are actuated in such a manner that the conveyor belts 311, 312 move the storage container 10 out from the receiving space 120 of the respective operating vehicle until the rear side wall 11 when viewed in the direction of movement has been moved through under the finger 837 (FIG. 26). Then as a result of a magnetic coupling activation signal and a spindle positioning signal, the finger axle 830 is rotated into a position in which the hook section 837*c* extends downwards (FIG. 27). The transmission of a magnetic coupling activation signal is then terminated so that the coupling part 850 and the first pinion 851 are decoupled and thereupon as a result of a spindle actuation signal, the finger axle 830 is moved in the direction of that storage rack 1, 2 into which the storage container 10 is to be moved until the storage container 10 is located completely within the respective storage rack 1, 2 (FIG. 28).

A further embodiment of a gripping device 400 is shown in FIG. 30. The gripping device 400 comprises a first telescopic rod 401 extending in the YW direction which can be extended from a retracted state in the YW direction and a second telescopic rod 402 extending in the YW direction, which can be extended from a retracted state contrary to the YW direction. Each telescopic rod 401, 402 has respectively one longitudinal axis A401 or A402 and is fastened with a respectively first end 403 or 403 on a mounting device 420. In an alternative embodiment, the mounting device 420 can also be mounted displaceably in each YW direction on the inner surface of the upper wall 107 or it can be located outside the receiving space 120 of the operating vehicle 100.

The gripping device 400 furthermore has a drive device 410. Furthermore, each telescopic rod 401, 402 has an extending and retracting device for extending and retracting the respective telescopic rod 401, 402. The drive device 410 is on the one hand coupled to each of the telescopic rods 401, 402 and designed in such a manner that the respective telescopic rod 401, 402 can be extended or retracted by activation. Furthermore, the gripping device 400 has a rotational drive device which can be integrated in the mounting device 420 with which each of the fingers or hooks or function hooks 407 or 408 can be rotated in particular between two end positions about a rotational axis running in the YW direction. In one embodiment it can be provided that the function hooks 407 or 408 can be rotated between a rotational position 407*a*, 408*a* shown in FIG. 30 and a rotational position 408*a* and 408*b* shown in FIG. 33 about a rotational axis running in the YW direction.

The drive device or servo drive device 410 of the gripping device 400 is functionally connected via control lines to the control device 510 (FIGS. 12 to 15). As a result of a sequence program implemented in the control device 510 for a predetermined receipt of a storage container LB into the receiving space 120 of the operating vehicle 100 or for a predetermined delivery of a storage container LB into a storage region LC in a storage rack 1, 2, the drive device 410 is actuated.

Figure 36:
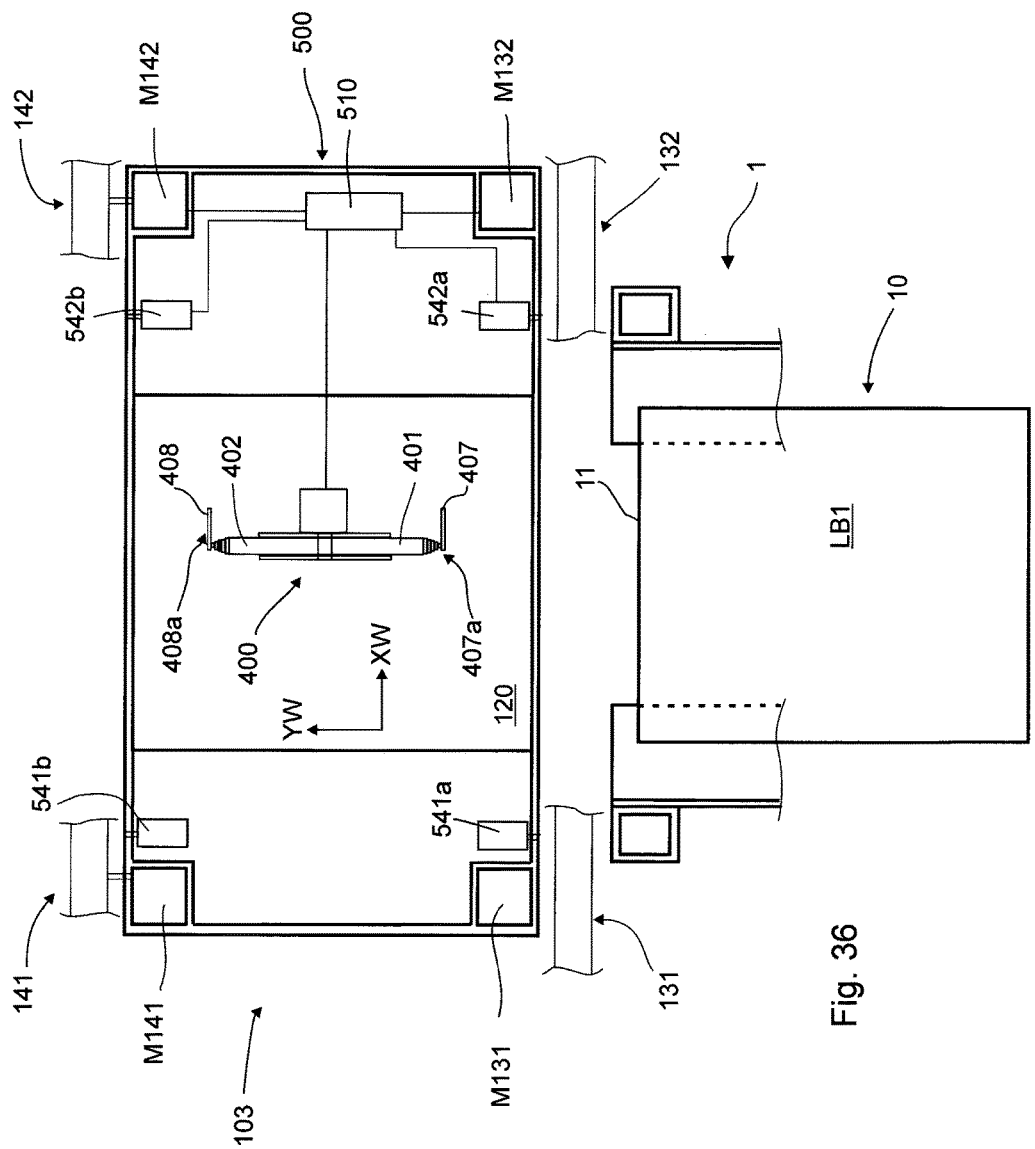
FIGS. 36 to 38 show a plan view similar to the line L30-L30 of FIG. 5 of a further embodiment of a positioning device designed as a gripping device, wherein the gripping device is shown in various positions in each case.
Figure 37:
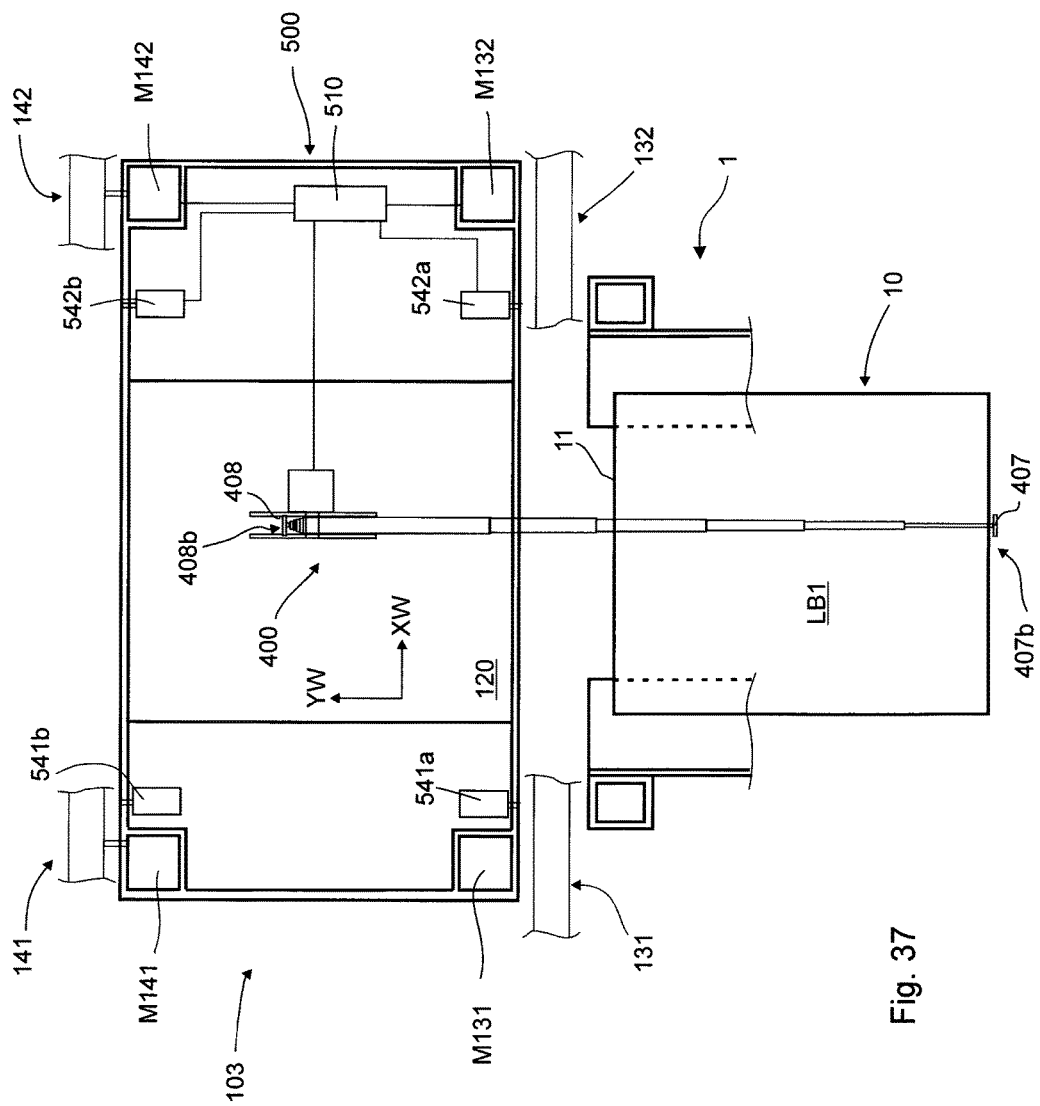
Figure 38:
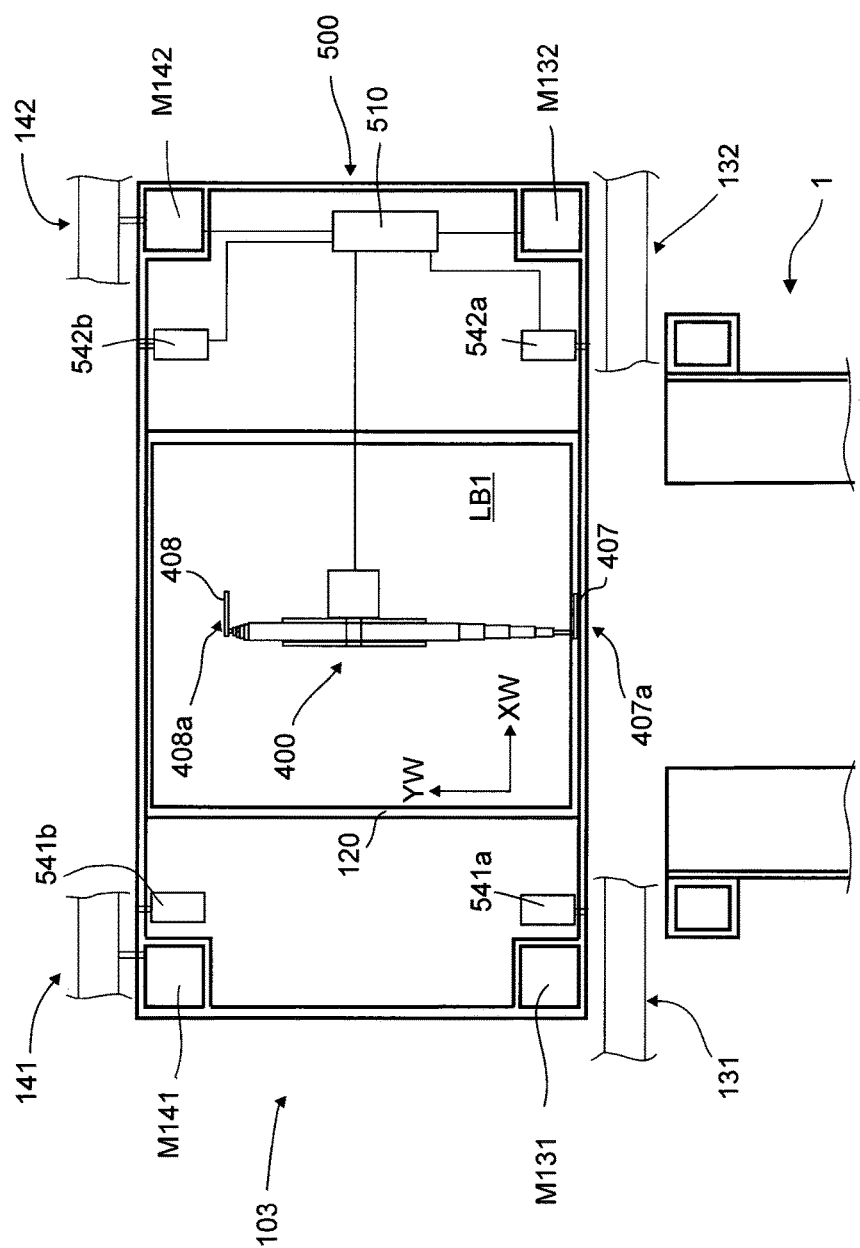
Figure 39:
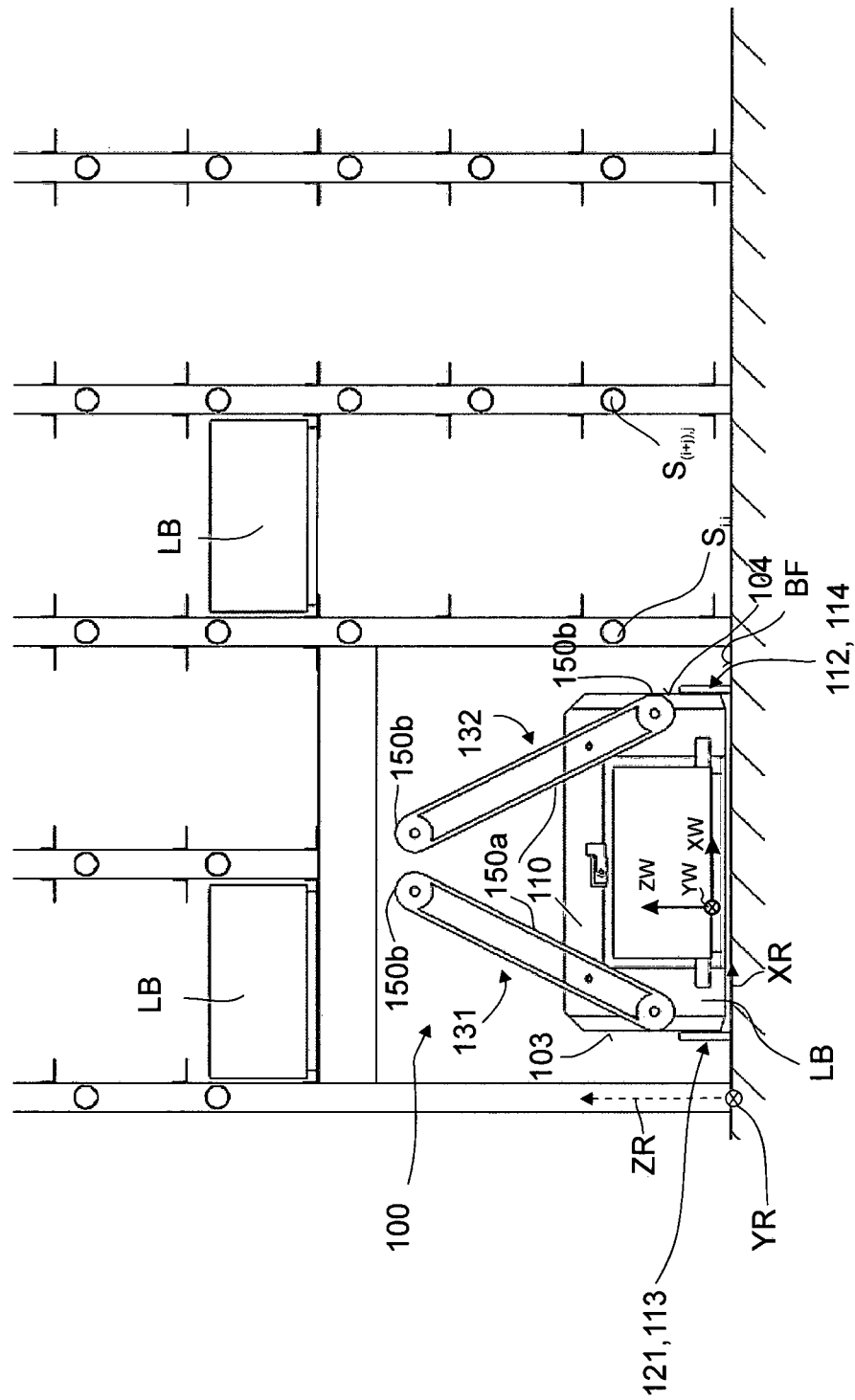
FIGS. 39 to 41 show various states of the embodiment of an operating vehicle according to FIG. 5 by which means the operating vehicle is transferred from a ground travel mode to a rack travel mode.

The embodiment of the gripping device 400 according to FIGS. 36 to 38 is designed in such a manner that this gripping device 400 can be used in an operating vehicle and in particular an operating vehicle 100 according to the invention as a single positioning device for delivery or retrieval of a storage container LB1 which, without a further positioning device, i.e. without in particular a conveying device 300 (FIGS. 17 and 30 to 35), can move a storage container LB located completely in the receiving space 120 out from the respective operating vehicle and completely into a storage rack 1, 2 and after corresponding extension of the telescopic rod and gripping behind the storage container LB as well as rotating the finger 407 into an engagement position with the storage container LB (FIG. 37) can withdraw a storage container LB located completely in a storage rack 1, 2 from the storage rack 1, 2 and move it completely into the receiving space 120 (FIG. 38).

Figure 33:
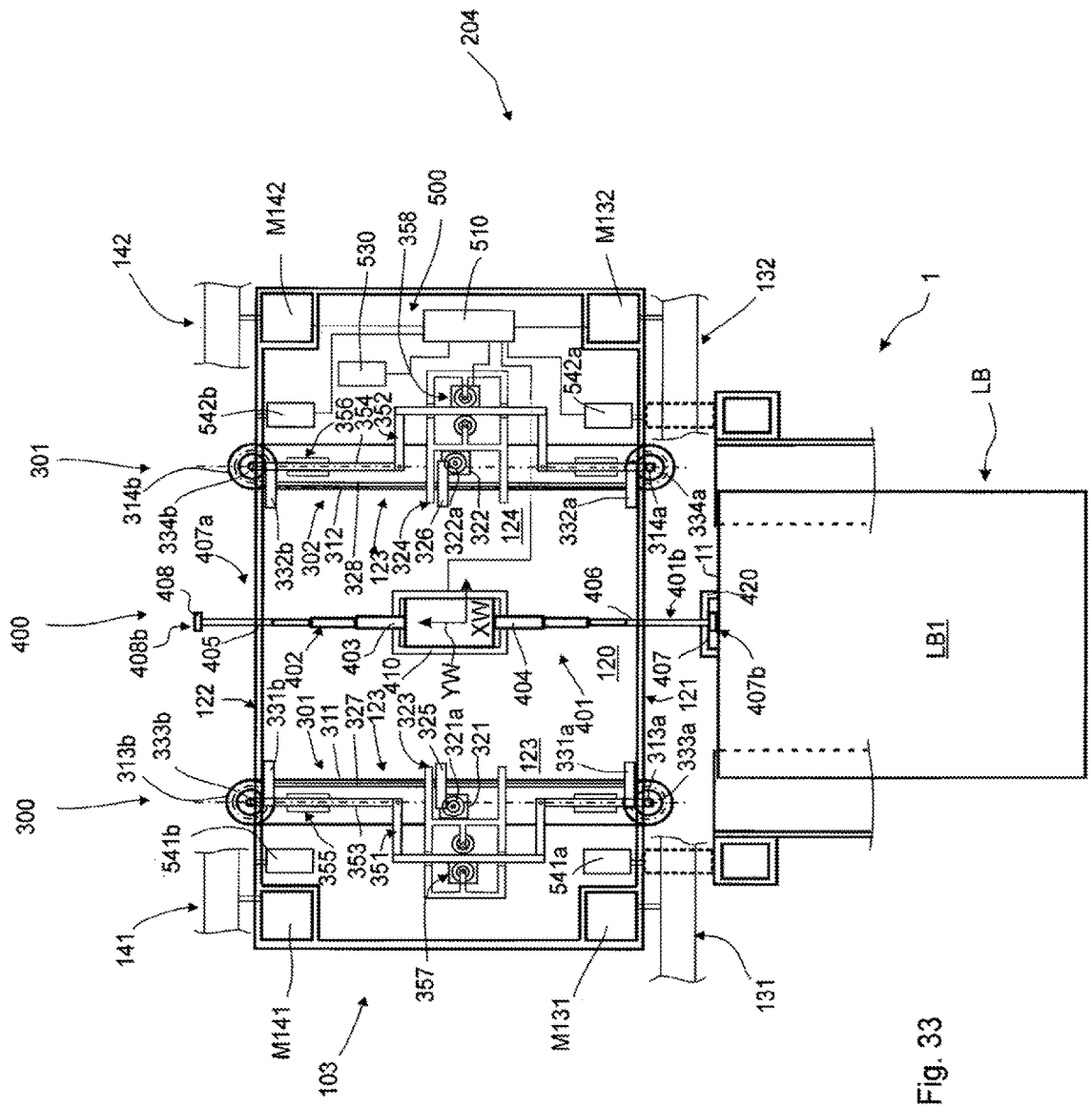
FIG. 33 shows the embodiment of the operating vehicle according to FIG. 30 in the same manner of representation, wherein the gripping device is shown in an extended position in which the gripping device is in engagement with a storage container which has a different type of receiving device for receiving the coupling hook compared with the storage container shown in FIGS. 30 to 32.
Figure 34:
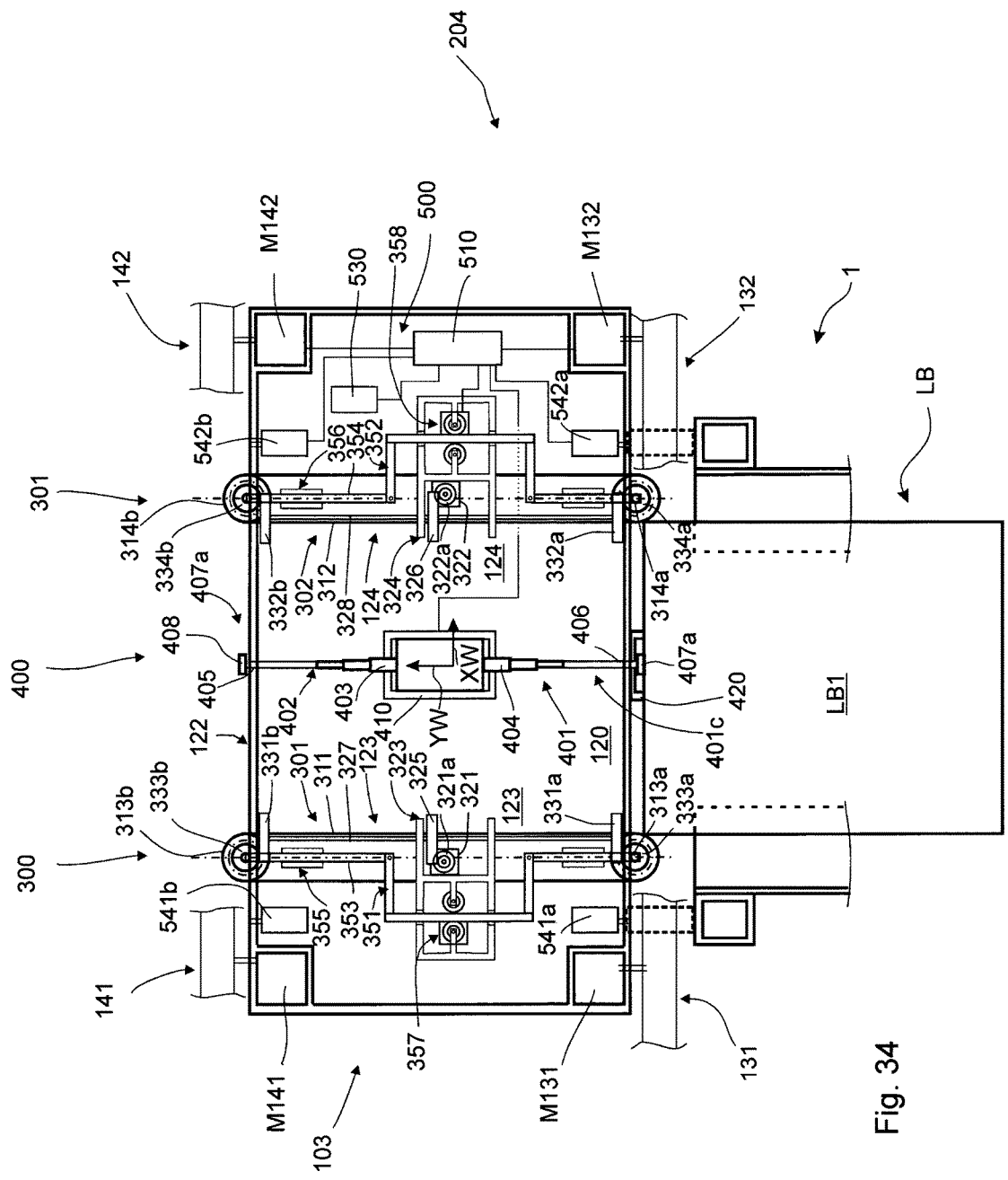
FIG. 34 shows the embodiment of the operating vehicle and the storage container according to FIG. 33 in the manner of representation of FIG. 33, wherein the gripping device is shown in a further retracted position compared with the position shown in FIG. 33 in which the gripping device is in engagement with the storage container.

FIGS. 30 to 35 show an operating vehicle with a further embodiment of the gripping device 400. As a result of such a control device 510, for receiving a storage container LB from a storage region LC in a storage rack 1, 2, it can initially be provided that, for example, the telescopic rod 401 is moved from a retracted state 401*a* (FIG. 30) into an extended state 401*b* (FIG. 33) in which the finger or function hook 407 or 408 lies in the region of a hook receiving device 420 such as a clip of a storage container LB to be inserted into the receiving space 120 of the operating vehicle 100 (state LB1 in FIG. 33). In this state 401*b*, for example, the function hook 407 is rotated about the longitudinal direction A401 into an engagement position 407*b* (FIG. 33). As shown schematically in FIG. 33, this can be achieved in particular by a 90 degree rotation of the function hook 408. As a result, the function hook 407 is in engagement with the hook receiving device 420, which in particular can be a clip, an eye or generally a recess.

In the embodiments of the gripping device 400, 800 in particular according to FIGS. 16, 30, 36, a hook or function hook disposed on a positioning rod of the same in an extended state of the gripping device 400, 800, is rotated from a receiving position about a longitudinal axis A401, A402, A830 into an engagement position in order to grip a storage container to be moved into the operating vehicle 100 so that the hook or function hook in this position can pull the storage container into the operating vehicle 100.

In a next step, the respective telescopic rod 401 or 402 is retracted from the position 401*b* into a position 402*c* (FIG. 34) until the storage container LB is located with a contact section in abutment with a positioning part of the conveying device 300 and in particular with a drive belt 311 and 312 of the conveying device 300. This state is designated with the reference number LB3 in FIG. 34. Before or after reaching this state, the conveying device 300 is activated by movement of the drive belts 311 or 312 and specifically in such a manner that a storage container LB which is located in contact with the conveying device 300 in such a manner that it is pulled into the receiving space 120 of the operating vehicle 100 by the conveying device 300. The respective function hook is rotated into the position 407*a* and the telescopic rod, in the example, the telescopic rod 407 is completely retracted. This state is shown in FIG. 35. When the storage container LB has reached a desired position in the receiving space 120 of the operating vehicle 100, the actuation of the conveying device 300 is stopped. As a result, the process for withdrawal of a storage container LB from a storage rack (in the example the storage rack 1) is completed.

A combined actuation of the conveying device 300 and the gripping device 400 is thus achieved in this method.

For deposition of a storage container LB into a storage region LC of a storage rack 1, 2, a delivery program is started in the control device 510. In so doing, the conveying device 300 is triggered in such a manner that this actuates the drive belts 311 or 312 and sets them in motion in such a manner that a storage container LB which is located in the receiving space 120 of the operating vehicle 100 and is laterally in abutment with the drive belts 311 and 312, is moved from the receiving space 120 of the operating vehicle 100 in the direction of the storage region LC of the respective storage rack 1, 2. On or after reaching the state LB3 of the storage container LB (cf. FIG. 34) in which the storage container LB still abuts against the drive belts 311 and 312 of the conveying device 300, the function hook 407 is moved by extending the respective telescopic rod 401 or 402 onto the side wall of the storage container LB facing the function hook 407 and then by rotation into the position 407b, the function hook 407 is brought into engagement with the hook receiving device 420. Then, on command of the drive device 410 the telescopic rod 401 is extended to such an extent that the storage container LB lies in a desired position in the respective storage rack 1, 2. At the same time however, it must not be provided that the hook is brought previously into the rotational position 407b.

These process sequences can also be executed in a similar manner on a storage rack which is located on the other longitudinal side 102 of the operating vehicle 100.

The one gripping device 400 can in particular also be implemented in combination with a conveying device 300 which is implemented from two arrangements 380 of guide rollers according to FIG. 12. According to one embodiment of the operating vehicle 100, it can be provided in this case that the conveying device 300 is executed with guide rollers, wherein the guide rollers are not driven by a motor and therefore fulfil a pure guide function when guiding a storage container LB out from the receiving space 120 of the operating vehicle 100.

FIGS. 42 to 45 show another embodiment of the operating vehicle which in these figures is provided with the reference number 600. In this embodiment of the operating vehicle 600, a pair of drive crawlers is articulated to each rotational axis 631a, 632a, 641a, 642a so that the pairs 631 or 632 or 641 or 642 of drive crawlers are obtained. Consequently, the pair 631 of drive crawlers is formed from the drive crawlers 633, 634, the pair 632 of drive crawlers is formed from the drive crawlers 635, 636, the pair 641 of drive crawlers is formed from the drive crawlers 643, 644, the pair 642 of drive crawlers is formed from the drive crawlers 645, 646.

In this case, the pair 631 of drive crawlers 633, 634 is arranged articulated to the first longitudinal side 101 and adjacent to the first transverse side 103 and the pair 632 of drive crawlers 635, 636 is arranged articulated to the first longitudinal side 101 and adjacent to the second transverse side 104. Furthermore, the pair 641 of drive crawlers 643, 644 is arranged articulated to the second longitudinal side 102 and adjacent to the first transverse side 103 and the pair 642 of drive crawlers 645, 646 is arranged articulated to the second longitudinal side 102 and adjacent to the second transverse side 104. The rotational axes 631a, 632a, 641a, 642a can in particular be located in a side wall, which each form the longitudinal sides 101, 102 and in particular when viewed in the longitudinal direction XW, at the side of the receiving space 120.

Respectively one motor M631 or M632 or M641 or M642 can be connected to the articulation device formed by the rotational axes 631a, 632a, 641a, 642a, which motors can rotationally move the respective drive crawler pair to which the respective rotational axis belongs. The motors M631, M632, M641, M642 are each functionally connected to the control device 510. In this way, a rotational position of each of the drive crawlers predetermined by the control device can be set by the control device 510 in order, for example, to set the horizontal path travel mode or the diagonal path travel mode or vertical path travel mode or execute these in each case.

According to one embodiment of the operating vehicle 600, it is provided that the rotational axes 631a, 641a which are formed on different longitudinal sides 101, 102 run coaxially to one another, i.e. lie on the same straight line and that also the rotational axes 632a and 642a which are formed on different longitudinal sides 101, 102 run coaxially to one another, i.e. lie on the same straight line. This profile of the rotational axes can be provided in all embodiments of the operating vehicle 600. In this embodiment, the vehicle-fixed coordinate system is defined in such a manner that the transverse direction YW runs parallel to the rotational axes 631a or 632a or 641a or 642a and the longitudinal direction XW runs vertically to the rotational axes 631a or 632a or 641a or 642a, where the origin of the coordinate system lies on the base 120a of the receiving space 120 of the operating vehicle 600.

In this case, it can be provided in particular that the rotational axes 631a, 632a, 641a, 642a are arranged above the passage. Alternatively to this, the rotational axes 631a, 632a, 641a, 642a can be arranged below the passage.

The operating vehicle 600 differs from the operating vehicle 100 by the drive crawlers and the relevant operating functions. Furthermore, the operating vehicle 600 comprises:

an additional drive crawler 637 which is arranged rigidly, i.e., not articulated, on the first longitudinal side 101 and adjacent to the first transverse side 103 or on the first transverse side 103 and adjacent to the first longitudinal side 101 by means of a mounting 667, an additional drive crawler 638 which is arranged rigidly, i.e., not articulated, on the first longitudinal side 101 and adjacent to the first transverse side 104 or on the second transverse side 104 and adjacent to the first longitudinal side 101 by means of a mounting 668, an additional drive crawler 647 which is arranged rigidly, i.e., not articulated, on the second longitudinal side 102 and adjacent to the first transverse side 103 or on the first transverse side 103 and adjacent to the second longitudinal side 102 by means of a mounting 677, an additional drive crawler 648 which is arranged rigidly, i.e., not articulated, on the second longitudinal side 102 and adjacent to the second transverse side 104 or on the second transverse side 104 and adjacent to the second longitudinal side 102 by means of a mounting 678.

Figure 42:
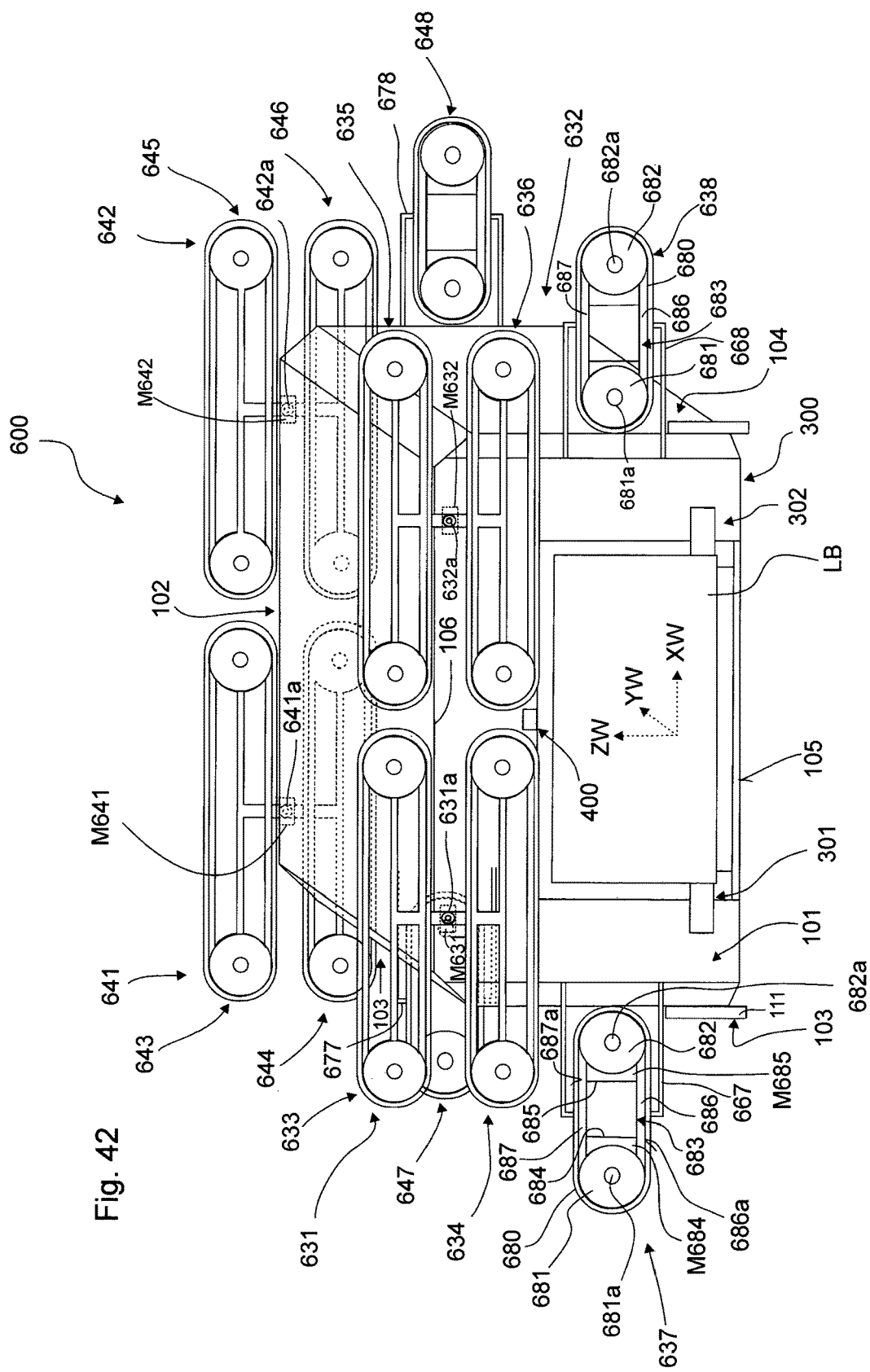
FIG. 42 shows a perspective view of a further embodiment of an operating vehicle which, compared with the embodiment of the same shown in FIG. 5, has two pairs of crawler drives on each longitudinal side.
Figure 43:
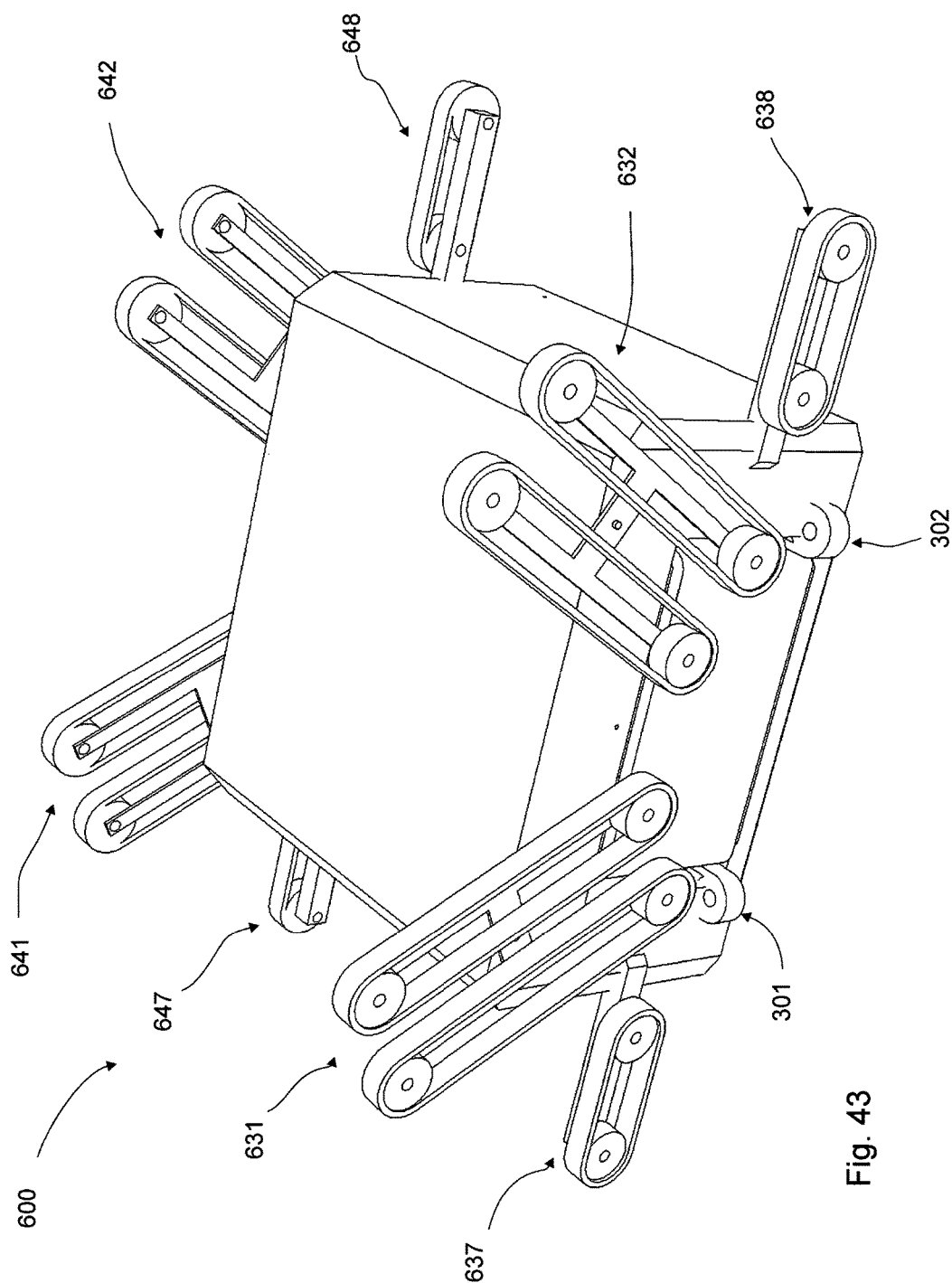
FIG. 43 shows a further perspective view of the embodiment of an operating vehicle according to FIG. 42.
Figure 44:
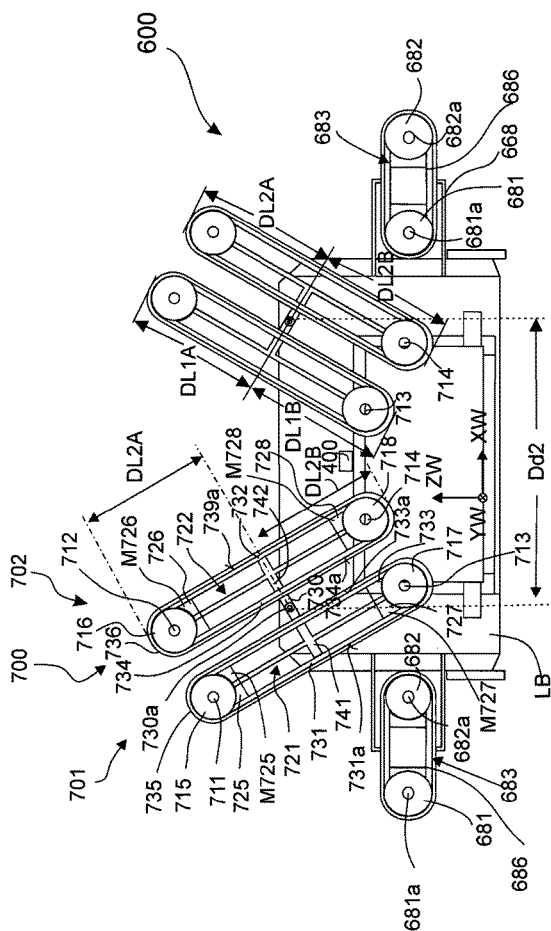
FIG. 44 shows a side view of the embodiment of an operating vehicle according to FIG. 42, wherein the pairs of drive crawlers of the same are located in an intermediate position.
Figure 45:
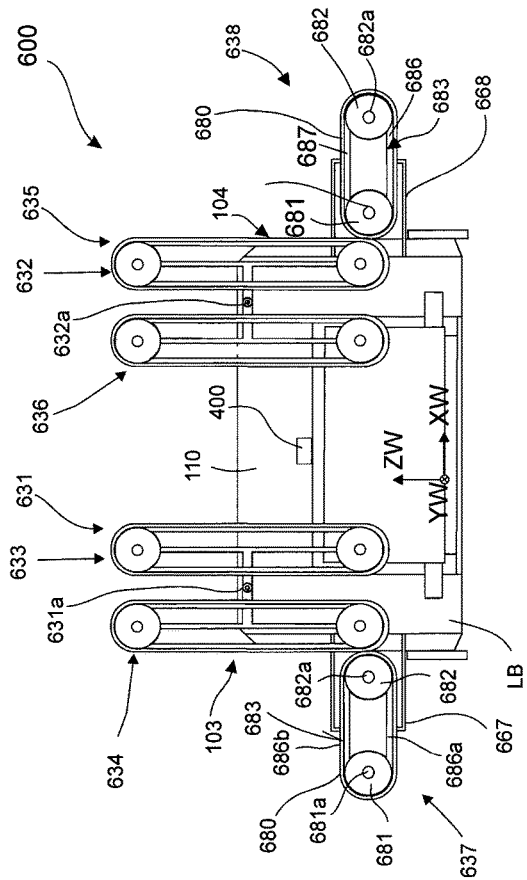
FIG. 45 shows a side view of the embodiment of the operating vehicle according to FIG. 42, wherein the pairs of drive crawlers of the same are located in a vertical travel mode position.

The additional drive crawlers 637, 638, 647, 648 are described hereinafter with reference to the additional drive crawler 637 shown in FIG. 42:

Each additional drive crawler 637, 638, 647, 648 has a drive belt 680 which is mounted on a first and a second deflecting roller 681, 682 and in particular can be spanned by the deflecting rollers 681, 682.

Each additional drive crawler 637, 638, 647, 648 furthermore has a support device 683 with two pivot bearings 681*a* or 682*a* on which the two deflecting rollers 681, 682 are mounted. The longitudinal direction of the respective additional drive crawler 637, 638, 647, 648 is seen herein as the direction of the connecting line of the rotational axes which are provided by the pivot bearings 681*a* or 682*a*.

In the embodiment shown the support device 683 is formed from two end pieces 684, 685 with two pivot bearings 681*a* or 682*a* on which respectively one of the deflecting rollers 681, 682 is mounted and from two support arms or connecting pieces 686 and 687 which each connect the end pieces 684, 685 to one another. The two support arms or connecting pieces 686 and 687 each run in the longitudinal direction and transversely to the thickness direction of the respective additional drive crawler 637, 638, 647, 648 at a distance from one another and rest with the ends thereof and outer sides 686*a* or 687*a* adjacent to the circumferential surfaces of the deflecting rollers 681 or 682 and adjoin these continuously so that the drive belt 680 abuts against the outer sides 686*a* or 687*a* of the support arms 686, 687 and is supported between the deflecting rollers 681 or 682.

Drive motors M684, M685, each coupled to one of the deflecting rollers 681, 682, are attached to each of the end pieces or another location of the respective additional drive crawler 637, 638, 647, 648. Alternatively it can be provided that only one drive motor M684, M685 is attached to the support device 683. Each of the at least one drive motor M684, M685 of the respective additional drive crawler 637, 638, 647, 648 is functionally connected in each case via a control line (not shown) to a control device 510 (FIG. 30) so that the drive belt 680 can be rotated as a result of trigger commands of the control device 510. In this way, the drive motors M684, M685 of each additional drive crawler 637, 638, 647, 648 can be triggered by the control device 510 independently of one another and as a result at each drive crawler 637, 638, 647, 648, a predetermined direction of movement and speed of each of the deflecting rollers 681 or 682 and therefore of the respective drive belt can be set.

The pairs of drive crawlers will be described hereinafter, wherein the drive crawlers 633, 634, 635, 636, 643, 644, 645, 646, which pertain to respectively one pair 631 or 632 or 641 or 642 of drive crawlers are provided with the same reference numbers. The pairs 631, 632, 641, 642 of drive crawlers of the operating vehicle 600 are described by reference to the drive crawler pair 631 of FIG. 44 where the drive crawler pair is also designated with the general reference number 700 and a first drive crawler of the same is designated with the reference number 701 and a second drive crawler of the same is designated with the reference number 702.

The first drive crawler 701 and the second drive crawler 702 each have a support device 721 or 722, each comprising:

an outer support arm 731 or 732 and an inner support arm 733 or 734, wherein the inner support arms 733 or 734 are mutually adjacent support arms of the drive crawler pair 700 and have mutually facing outer surfaces 733*a* or 734*a* and wherein the outer support arms 731 or 732 form outer surfaces 731*a* or 732*a* located opposite one another, two spaced-apart end pieces 725 or 726 and 727 or 728 which are connected to the support arms at oppositely located ends of the same and held by these, wherein a pivot joint 711 or 712 and 713 or 714 is implemented in each of the end pieces 725 or 726 and 727 or 728, deflecting rollers 715 or 516 and 717 or 718 of which one each in each of the end pieces 725 or 726 and 727 or 728, a drive belt 735 or 736, a connecting part 730 which connects the support device 721 and the support device 722 to one another and on which the respective pivot joint of the drive crawler pair 700 is implemented by means of which the drive crawler pair 700 as a rigid structure is rotatable on the frame device 110 of the operating vehicle 600.

The distance between the respective inner support arms 733 or 734 is at least sufficiently great that a support part $S_{i,j}$ and the drive belts each located on the surfaces 733*a* and 734*a* can lie between the mutually facing surfaces 733*a* and 734*a* so that travel of the operating vehicle 600 along the storage racks can be accomplished whereby the support part $S_{i,j}$ rests between the drive belts lying on the mutually facing surfaces 733*a* and 734*a* (FIGS. 46 to 49). As a result, with a corresponding movement of the drive belts as a result of an actuation by the control device 510, a movement of the respective drive crawler pair can be accomplished with respect to the support part $S_{i,j}$ abutting against each of these.

According to one embodiment of the operating vehicle 600, this has no motor on the rotational axis 730*a* in order to set the respective drive crawler pair in rotation: if for example, sections of the drive belt which abut against the support part $S_{i,j}$ on a drive crawler pair 700 are moved in mutually opposite direction when viewed in the direction of the rotational axis 730*a*, a rotation of the respective drive crawler pair is accomplished relative to the support part $S_{i,j}$. If on the other hand, sections abutting against the support part $S_{i,j}$ are moved in the same direction when viewed in the direction of the rotational axis 730*a*, a linear movement of the respective drive crawler pair takes place relative to the support part $S_{i,j}$.

The connecting line between rotational axes, i.e. between centres of the pivot joints 711, 713 or 712, 714 is defined as the longitudinal direction of a drive crawler of a drive crawler pair. As a result, for each drive crawler of a drive crawler pair, there is a half-length DLA2 extending in the longitudinal direction between pivot joint 630*a* and the outermost point on the drive belt at the pivot joint 711 or 712 and a half-length DL2B between the pivot joint 630*a* and the outermost point on the drive belt on the pivot joint 713 or 714. The lengths DL1A, DL1 are maximally provided in such a manner that the two drive crawler pairs arranged on a longitudinal side 101 or 102 can pivot past one another and that the outermost ends of a drive crawler pair when viewed from the pivot joint can be pivoted past a support part $S_{i,(j+1)}$ when a support part $S_{i,j}$ lies coaxially with the pivot joint 730*a* (FIGS. 23 and 24).

According to one embodiment of the operating vehicle 600, the pivot joint 730*a* of one drive crawler pair 700 is each located on a central line which is the geometrical central line between the two connecting lines of the rotational axes of the pivot joints 711, 712, 713, 714 of the deflecting rollers of one drive crawler 701, 702 each of a drive crawler pair 700. In particular the rotational axes of the pivot joints 711, 712, 713, 714 of a drive crawler pair 700 are designed in such a manner that the two rotational axes of the pivot joints 711, 712, 713, 714 of different drive crawlers 701, 702 lie axisymmetrically to one another in relation to the central line between the two connecting lines of the rotational axes of the pivot joints 711, 712, 713, 714 as the axis of symmetry.

In this case, it can be provided that the vertical distance DS3 of the respectively adjacent support parts $S_{i,j}$ is at least a factor of 1.05 greater than the larger value of DL2A or DL2B.

Figure 49:
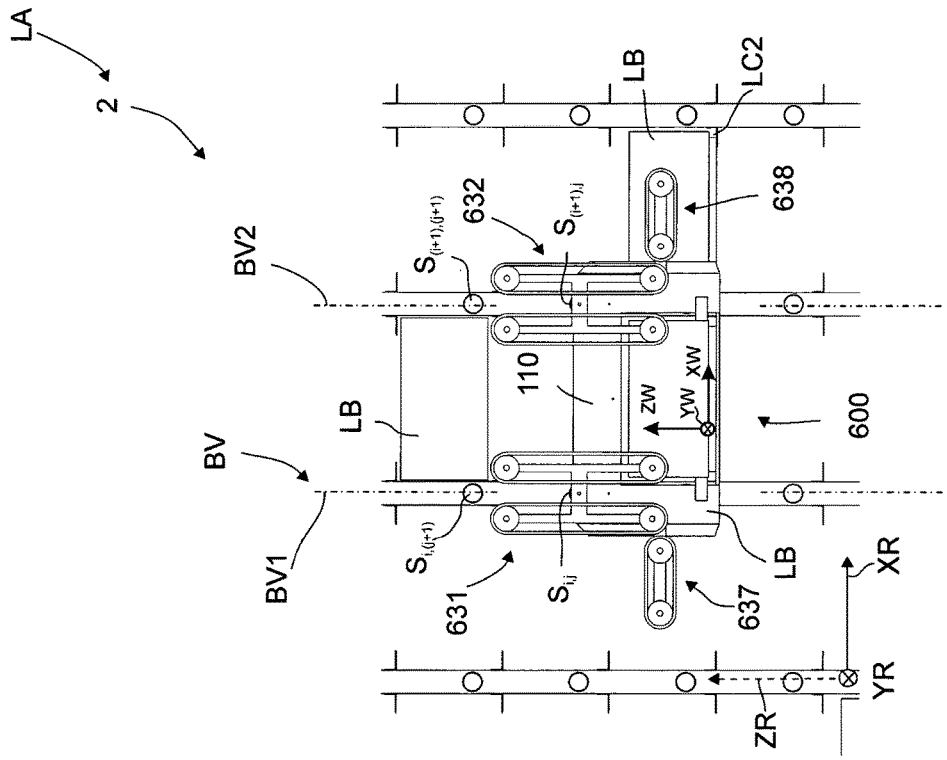
FIG. 49 shows a side view of the embodiment of the operating vehicle according to FIG. 42 in the vertical path travel mode at two storage racks of a storage rack arrangement according to the invention.
Figure 48:
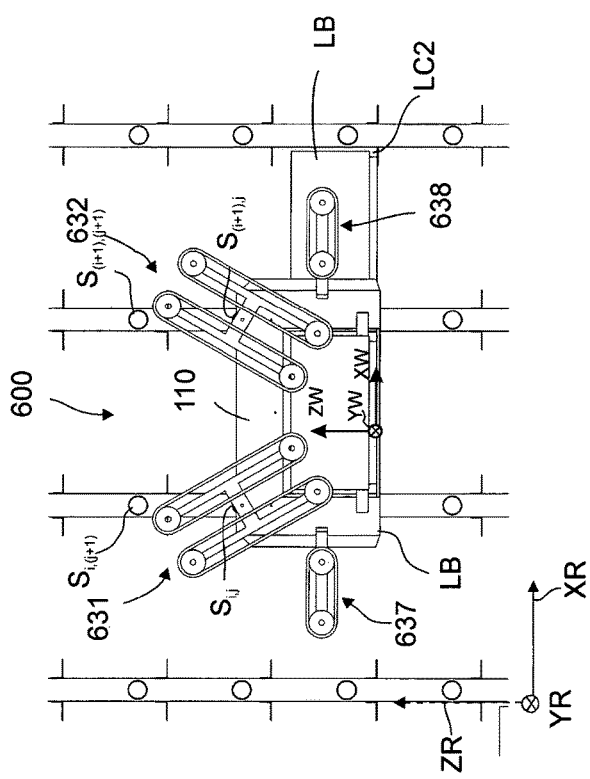
FIG. 48 shows a side view of the embodiment of the operating vehicle according to FIG. 42 at two storage racks of a storage rack arrangement according to the invention, wherein the pairs of drive crawlers of the same are located in the intermediate position according to FIG. 44.

With the operating vehicle 600, it is therefore possible to additionally travel a vertical path BV in addition to a diagonal path BD and a horizontal path BH. Such a vertical path BV is shown in FIG. 49 with the tracks BV1 and BV2 which are the connecting lines of the support parts $S_{i,j}$ along which the operating vehicle 600 travels when travelling a vertical path BV, i.e. in the vertical path travel mode.

Figure 46:
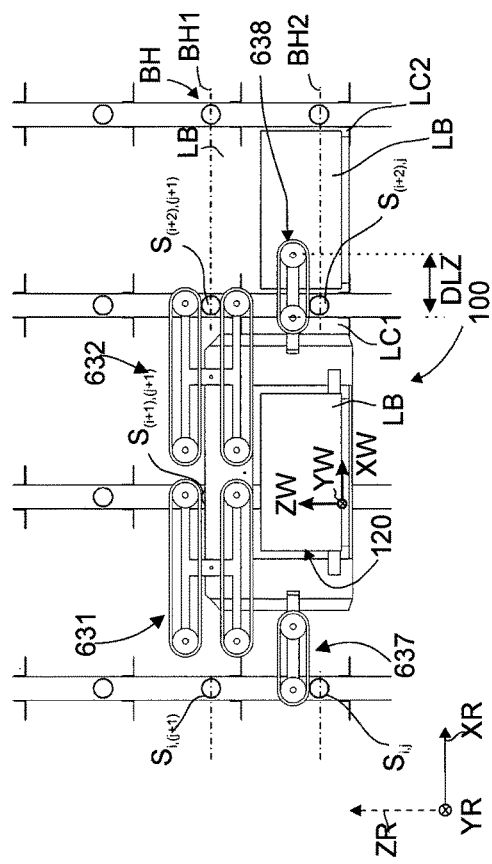
FIG. 46 shows a side view of the embodiment of the operating vehicle according to FIG. 42 in the horizontal path travel mode on two storage racks of a storage rack arrangement according to the invention.
Figure 47:
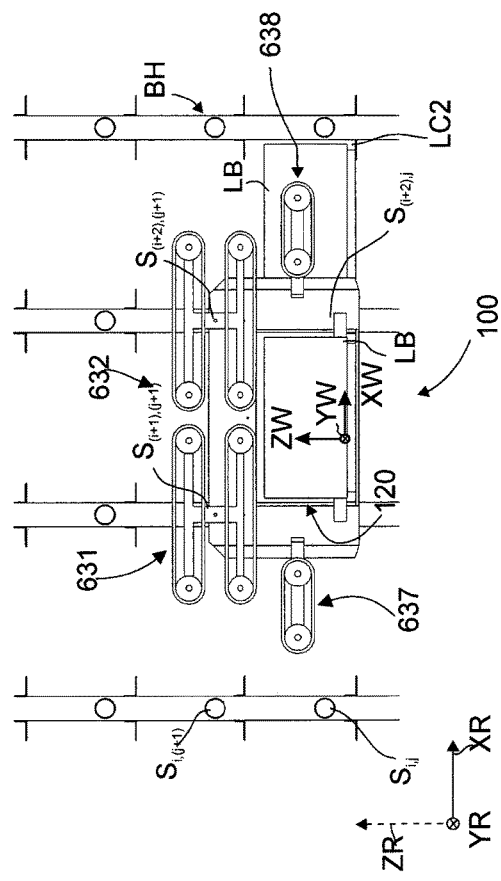
FIG. 47 shows the embodiment of the operating vehicle according to FIG. 42 in the view according to FIG. 46 in the horizontal path travel mode, wherein the operating vehicle has moved in the horizontal direction relative to the storage rack compared to the position shown in FIG. 46.

In the horizontal path travel mode, i.e. when travelling a horizontal path BH, the longitudinal directions of the drive crawler pairs run in the XR direction (FIG. 46). Since the longitudinal extension of the drive crawler pairs is designed in such a manner that the conveyor belts 735 and 736 of an individual drive crawler pair do not each abut simultaneously against two support parts $S_{i,j}$ and $S_{(i+1),j}$ in the XR direction, the additional drive crawlers 637, 638, 647, 648 are provided. These are arranged when viewed in the ZW direction in such a manner that these rest temporarily with their underside when viewed in the ZW direction on one support part each $S_{i,j}$ when the operating vehicle 600 travels a horizontal path BH. The additional drive crawlers 637, 638, 647, 648 can be located with their full extension behind the vehicle frame 110 in particular when viewed from the origin of the XW direction. At the same time, the additional drive crawlers 637, 638, 647, 648 have such a length DLZ between the rotational axes 681a and 682a and the additional drive crawlers 637, 638, 647, 648 are arranged in such a manner in the longitudinal direction XW that an additional drive crawler (in FIG. 46 the additional drive crawler 637 and 647) lies on a support part $S_{i,j}$ when in the direction of travel of the operating vehicle 600 in the XR direction—a support part $S_{(i,(j+1)}$ no longer rests between mutually facing surfaces of the conveyor belts 735, 736 of drive crawler pairs (in the example, the drive crawler pairs 631, 641).

Figure 22:
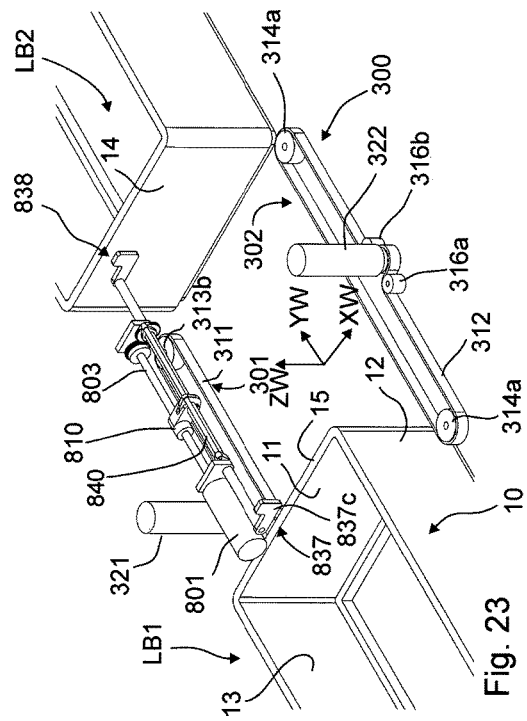
FIG. 22 shows a perspective view of the embodiment of the gripping device shown in FIGS. 16 and 17 in an operating state in which the storage container is gripped by the coupling hook and brought into a position in a receiving space of an operating vehicle with a conveying device implemented as a belt drive device in which the storage container is gripped by the conveying device.

The transition from the horizontal path travel mode to the vertical path travel mode or conversely is shown in FIGS. 22, 23, 24. In this case, the rotation of the drive crawler pair takes place when the respective support parts $S_{i,j}$ and $S_{(i+1),j}$—when viewed in the YR direction—are located in the rotational axes 631a, 632a, 641a, 642a of each of the pivot joints. The operating vehicle 600 must therefore be positioned accordingly for this process: in particular for this purpose the operating vehicle 800 can have a sensor in at least one of the rotational axes 631a, 632a, 641a, 642a which is capable of detecting that a support part $S_{i,j}$ is located in the respective rotational axis 631a, 632a, 641a, 642a. These sensors are each connected to the control device 501 so that this can command the operating vehicle 600 accordingly in order to bring the operating vehicle 600 into the state relative to the storage racks in which a pivoting of the drive crawler pair and in particular a transition from the diagonal path travel mode or horizontal path travel mode into the vertical path travel mode and conversely is possible. The at least one sensor can in particular be an identification sensor which can detect in an optical manner such a superposition of a support part $S_{i,j}$ and a pivot joint.

According to a further aspect, a vehicle 1000 and in particular an operating vehicle is provided which is movable along a longitudinal direction XR of the same on a floor. The vehicle 1100 can in particular be designed according to one of the embodiments of an operating vehicle described herein, e.g. with the reference numbers 100 or 600. The vehicle 1100 can however be designed in a different manner and for example, have no drive crawlers such as the drive crawlers 131, 132, 141, 142. The vehicle 1100 generally has a movement device by means of which the vehicle 1100 can be driven on the floor and can be moved and controlled in defined directions. A coordinate system assigned to the vehicle 1100 in a fixed-body manner is plotted in FIG. 50, which designates a longitudinal direction XW, a transverse direction YW and a vertical direction or vertical axis ZW. The longitudinal direction XW can be defined in such a manner that this points in the neutral steering position of the vehicle 1100 and in particular forms a symmetry axis of the vehicle 1100. The vertical axis ZW can be defined in such a manner that this stands perpendicularly on a plane spanned by the rotational axes of the movement device.

In the configuration of the movement device with running wheels for moving the vehicle 1100, the vehicle 1100 can in particular have at least three running wheels. In the embodiment of the vehicle 1100 shown in FIG. 50, the vehicle 1100 has four running wheels 1111, 1112, 1113, 1114 (FIG. 5) whose rotational axes run along the YW axis or in particular parallel to the XW axis of the vehicle 1100. In an embodiment in which these running wheels 1111, 1112, 1113, 1114 are arranged on the vehicle frame 1110 and in this case at least two wheels 1111, 1112 or 1113, 1114 are arranged on mutually opposite sides of the vehicle 1100 and at the same position of the XW axis for executing steering movements of the vehicle 11000, an alignment of the rotational axes of the running wheels 1111, 1112, 1113, 1114 is possible in this way. In the embodiments of the operating vehicle 100 shown the running wheels 1111, 1112, are articulated to the longitudinal side 1101 and the running wheels 1113, 1114 are articulated to the longitudinal side 1102 located opposite the longitudinal side 1102. Located on each longitudinal side 1101, 1102, are rotational axes of running wheels arranged on the respective longitudinal side which in their neutral steering position when viewed at least in the vertical direction or contrary to the vertical axis ZW optionally run perpendicular to the longitudinal direction XW of the vehicle 1100.

Figure 50:
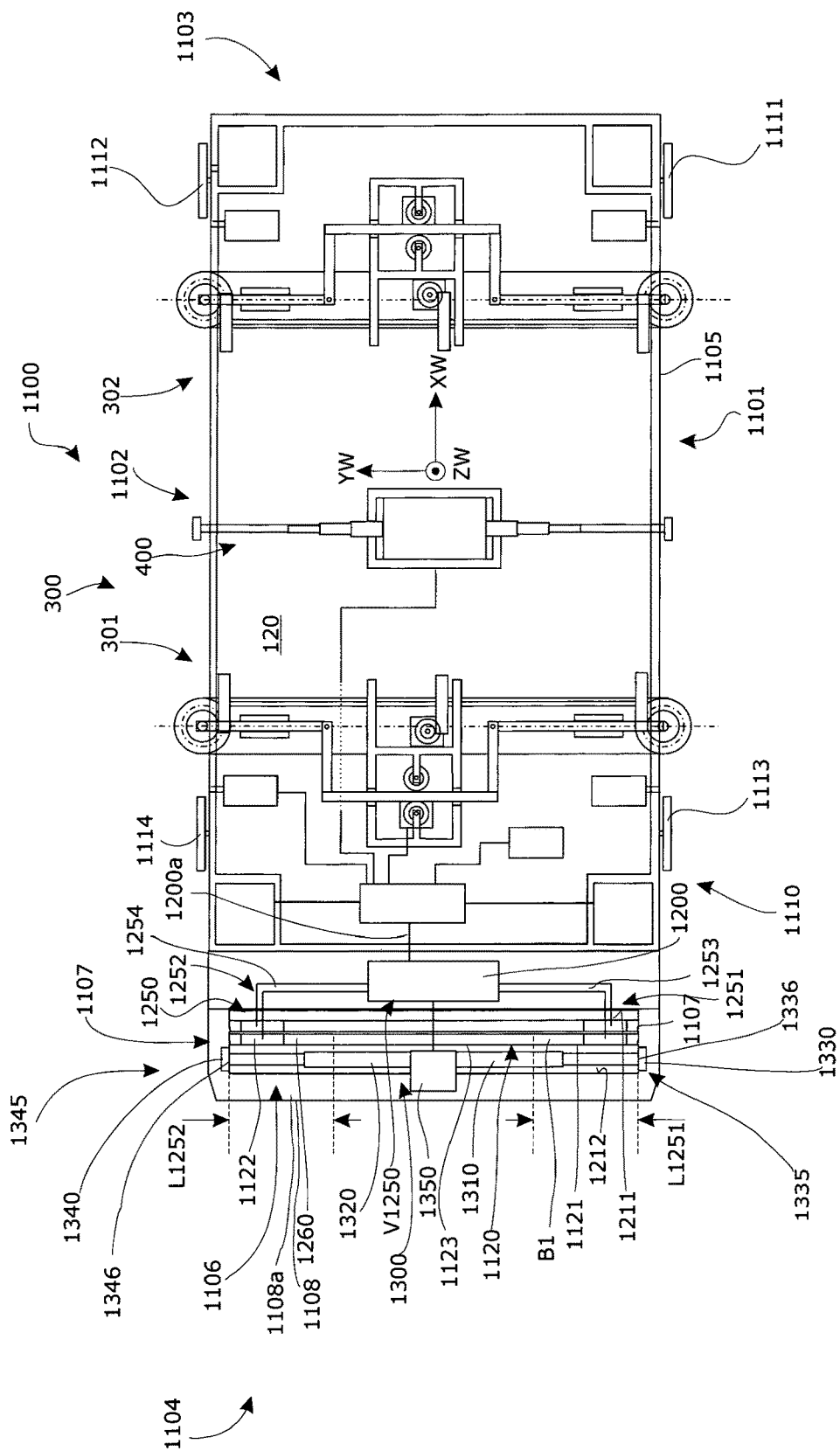
FIG. 50 shows a sectional view as a plan view of another embodiment of a vehicle with a guide device having a battery guide path which runs transversely to the longitudinal direction of the vehicle so that a battery inserted in the battery guide path in the same is movable transversely to the longitudinal direction of the vehicle.

Alternatively or additionally to the running wheels 1111, 1112, 1113, 1114, the vehicle 1100 can have the drive crawlers 131, 132, 141, 142 shown, for example, in FIG. 5 or the drive crawlers shown in FIGS. 42 to 45. In this case, the features of the aspect of the invention treated here can be applied to the embodiments of the vehicle 100, 600 described herein or to a vehicle which is configured as the embodiments of the vehicle 100, 600 but without the drive crawlers described herein being arranged thereon. In FIG. 50 the vehicle 1100 has no such drive crawlers.

In relation to the components of the vehicle, the embodiment of the vehicle 1100 shown in FIG. 50 is based on the embodiment of the vehicle 100 according to FIG. 30 so that the components of the vehicle 1100 are only partially provided with reference numbers and otherwise the reference numbers specified in FIG. 30 are assigned to the respective components.

The vehicle 1100 shown in FIG. 50 has a receiving space 120, a conveying device 300 with drive belts 301, 302 and a gripping device 400, in each case according to the embodiment of the vehicle according to FIG. 30. The vehicle 1100 can also have only one device from the combination of the conveying device 300 and the gripping device 400. The optionally provided conveying device for introducing a storage container into the receiving space 120 can also be executed in a different way. The optionally provided gripping device can also be executed in a different way.

The vehicle frame 1105 of the vehicle 1100 has a recess 1106 which is formed by the vehicle frame 1100 on a vehicle side 1104 pointing in the longitudinal direction XR. The recess 1106 comprises a battery receiving region 1107 for receiving a battery B1 for the electrical supply of electrical components of the vehicle. The recess 1106 can be configured to be open towards the vehicle side 1106 so that the battery receiving region 1107 is accessible from the vehicle side 1104. In this case, the recess 1106 can be formed by a support part 1108 extending flat in the direction of the vehicle side 1106 or a plate of the vehicle frame 1110. Furthermore, at the same time or independently of this, the vehicle frame 1105 can have a surface 1108a pointing into the vertical axis ZW above which in relation to the vertical axis ZW the recess 1106 and the battery receiving region 1107 is located. The surface 1108a can be the surface of a support part 1108 of the vehicle frame 1100 extending flat in the direction of the vehicle side 1106. The recess 1106 can be open towards the top in relation to the vertical axis ZW. Alternatively to this, this can be formed as a tunnel shape where the vehicle frame 1105 can have one or more recesses through which such a tunnel-shaped recess 1106 opens towards the vehicle side 1104. Also in the case of such a tunnel-shaped recess 1106a, the base surface thereof can be formed by the surface 1108a by the surface of a support part 1108 of the vehicle frame 1110 extending flat in the direction of the vehicle side 1106.

The vehicle 1100 furthermore has a guide device 1200 with a battery guide path 1120 which runs transversely to the longitudinal direction XR so that a battery B1 inserted in the battery guide path 1110 can be moved in the same transversely to the longitudinal direction XR of the vehicle 1100. The battery guide path 1110 can in particular be arranged in the recess 1102.

Figure 51:
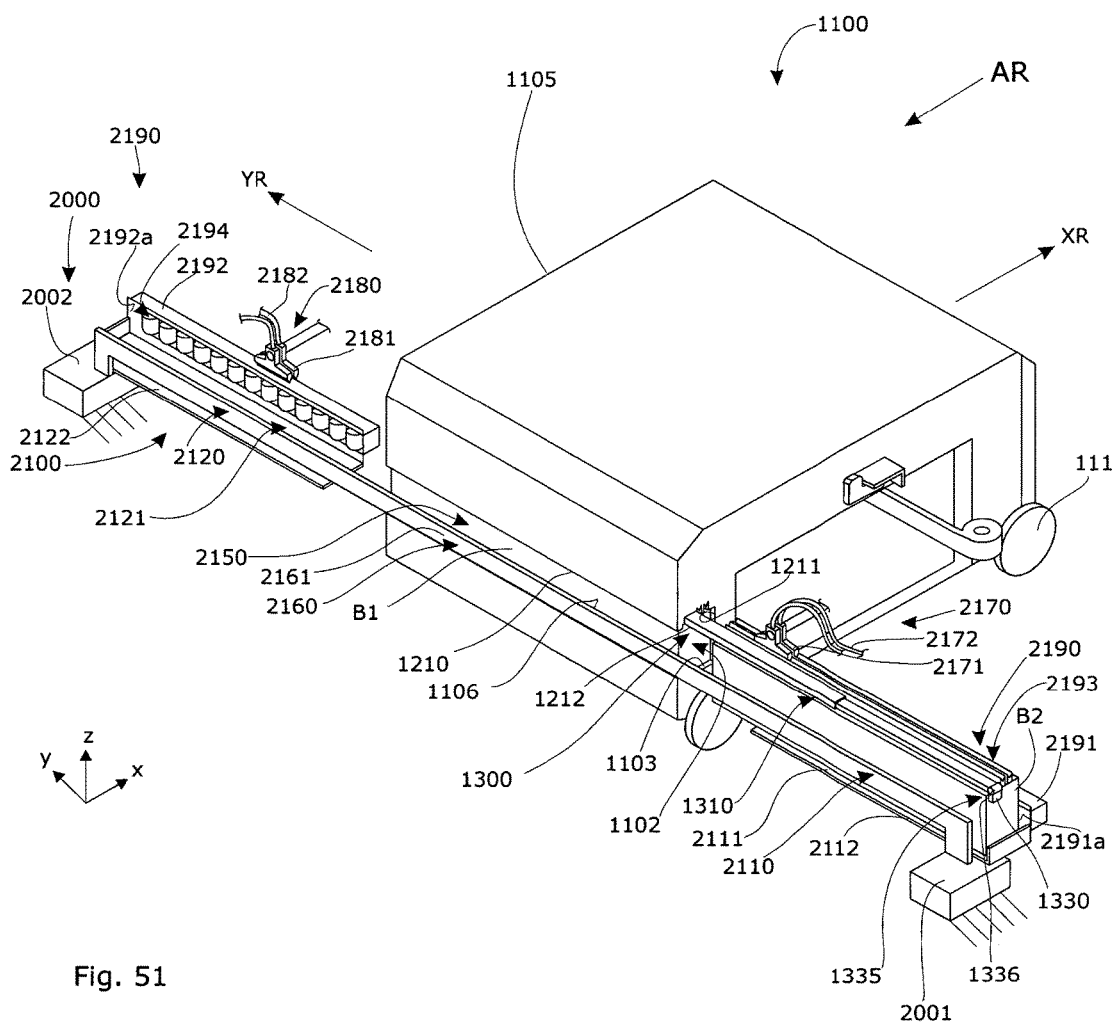
FIG. 51 shows a perspective view of an embodiment of a battery exchange station combined with a vehicle docked at this station, wherein in an initial state a first battery is located in a battery guide path of a recess of the vehicle and a second battery is located in the battery exchange station.
Figure 52:
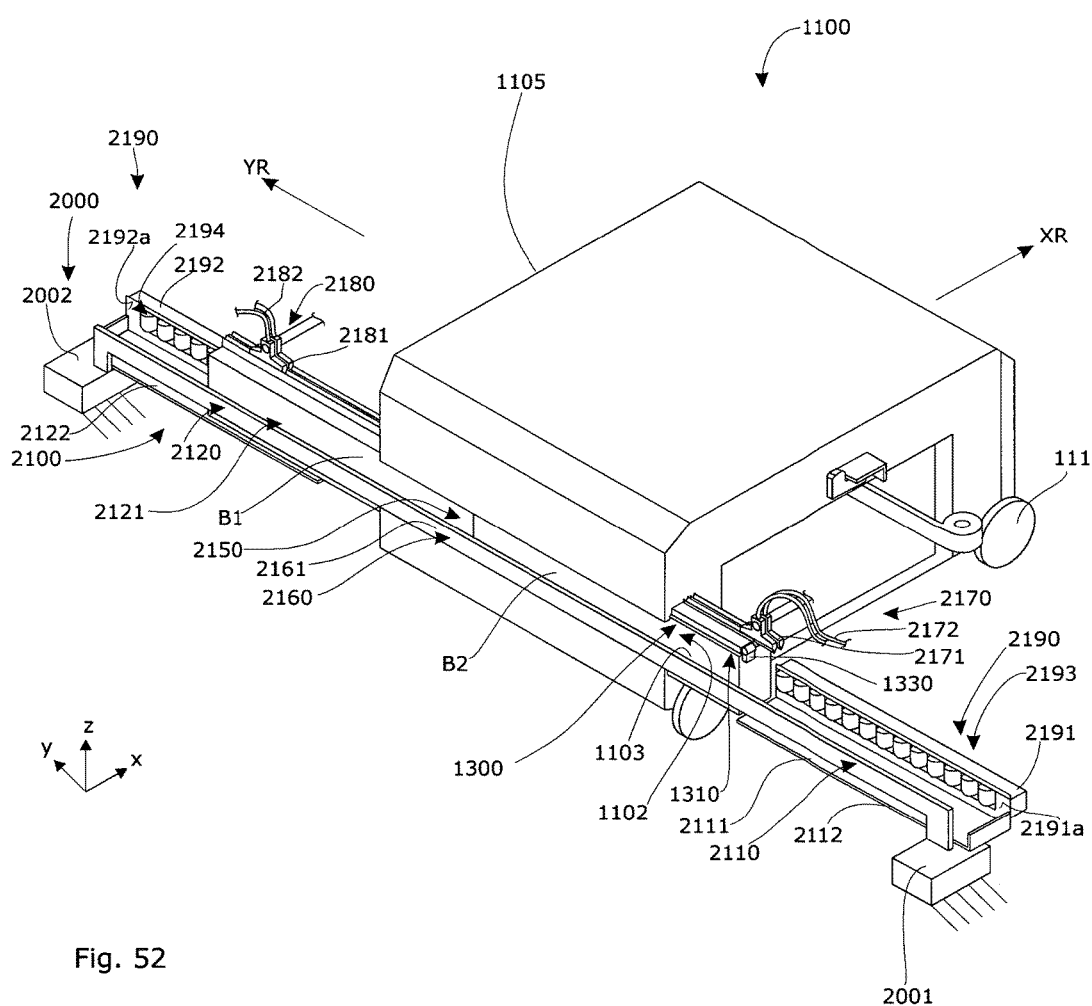
FIG. 52 shows the combination of the battery exchange station and the vehicle docked at this station according to FIG. 51 in an intermediate state in which the first battery is moved partially out of the recess of the vehicle by means of an exchange positioning device and the second battery is moved partially out of the first guide path device of the battery exchange station by means of the exchange positioning device and has been moved partially into the recess of the vehicle.
Figure 53:
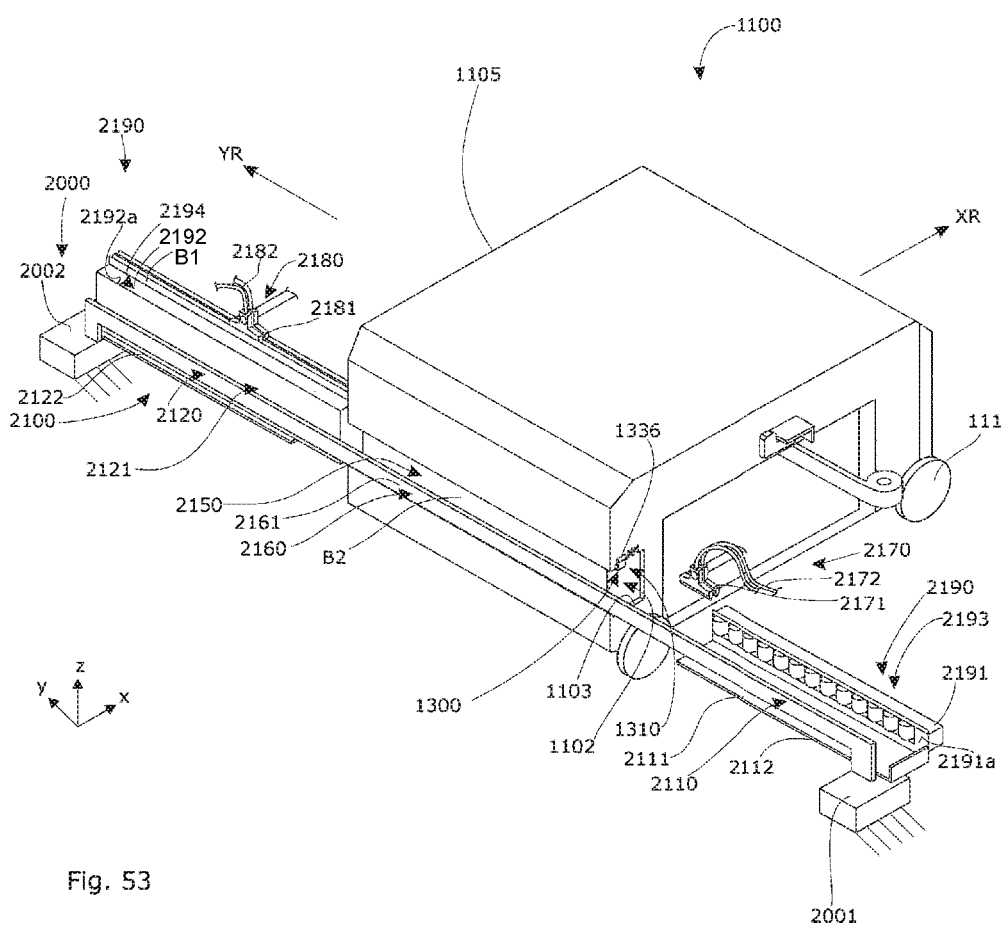
FIG. 53 shows the combination of the battery exchange station and the vehicle docked at this station according to FIG. 51 in a final exchange state in which the first battery is moved completely out of the recess of the vehicle by means of an exchange positioning device and is moved into a second guide path device of the battery exchange station and the second battery has been moved completely out from the first guide path device of the battery exchange station by means of the exchange positioning device and has been moved completely into the recess of the vehicle.

Furthermore, the vehicle 1100 can have a retaining device 1210 fastened to the vehicle frame 1105 for retaining the battery B1 on the vehicle frame 1110. The retaining device 1210 provides a counter bearing against a movement of a battery B1 towards the vehicle side 1104. The retaining device 1210 can therefrom as shown in FIG. 51, be configured as a wall part of the vehicle frame 1105 which forms an upper boundary of the recess 1102 in relation to the vertical axis ZW, located on the vehicle side 1104. The retaining device 1210 can in particular be executed in such a manner that the retaining device 1210 fastened to the vehicle frame 1105 for retaining the battery B1 on the vehicle frame 1105 is executed in such a manner that the battery is movable along the battery guide path 1120 and is held by the retaining device 1210 transversely to this. In the embodiment of the vehicle 1100 according to FIG. 50, the retaining device 1210 is formed as mutually opposite surfaces 1211, 1212 extending in the YW direction which are located facing one another and which form the battery guide path 1120. In this way, the embodiment of the retaining device 1210 fastened to the vehicle frame 1105 for retaining the battery B1 on the vehicle frame 1105 is executed in such a manner that the battery can be moved between the surfaces 1211 and 1212 along the battery guide path 1120 and is held by the retaining device 1210 or the surfaces 1211, 1212 transversely to this. The retaining device 1210 can be configured as a pin-shaped or hook-shaped part which projects from above from R.

The vehicle 1100 also has a contacting device 1250 which comprises two connection devices 1251, 1252 and at least one contact retaining device 1255, 1256 for retaining the connection devices 1251, 1252. In this case, the connection devices 1251, 1252 are executed in such a manner that these are each brought in contact in a contacting section 1260 of a contact strip or a contact loop of a battery B1 inserted into the battery guide path 1110. The contacting section 1260 runs in the longitudinal direction of the battery B1 which in the inserted state of the same runs in the direction of the battery guide path 1110. In this case, the contacting section 1260 can also be a strip-shaped contact surface which runs through the upper side of the battery B1, which in its inserted state points in the ZW direction, in the longitudinal extension of the battery upper side. Alternatively to this it can be provided that edge sections define the contacting section 1260 at the ends thereof so that the contacting section 1260 does not run completely through the longitudinal extension of the battery upper side. In this case, it can be provided that the contacting section 1260 runs at least 75% through the longitudinal extension of the battery B1 on its battery upper side, which in the inserted state of the same points in the ZW direction.

The two connection devices 1251, 1252 are arranged along the battery guide path 1110 or when viewed in the YW direction consecutively. In this case, it can be provided that at the mutually facing edges thereof these are located at the shortest distance from one another when viewed in the YW direction, which is at least half the smallest width of the guide path 1110 into which the battery B1 can be inserted, in relation to the longitudinal direction XR.

The battery guide path 1110 can generally be configured as an elongate or groove-shaped indentation in the vehicle frame 1105 or optionally as a support part 1108 of the vehicle frame 1110 extending flat in the direction of the vehicle side 1106. The battery guide path 1110 has lateral end sections 1111, 1112 which are located on the respective vehicle longitudinal side 1101, 1102 and which each form a lateral end of the battery guide path 1110 and a central section 1113 located between the lateral end sections 1111, 1112. The lateral end sections 1111, 1112 open on the vehicle sides 1101 or 1102 so that a battery B1 on the vehicle sides 1101 or 1102 can be inserted into the battery guide path 1110. It can also be provided that the connection devices 1251, 1252 of the contacting device 1250 are each located in a lateral end section of the battery guide path 1110 located on the vehicle sides 1101 or 1102, which each extend over a maximum of a quarter of the total length of the battery guide path 1110.

The vehicle 1100 can have a power supply device 1200 which is electrically connected to electrically operated components of the vehicle 1100 in order to supply these with power. The power supply device 1200 can comprise a distributor module with which the power supplied by the power supply device 1200 can be supplied to the various electrically operated components. One line 1253 or 1254 each is connected to the connection devices 1251, 1252 which each electrically connect the connection devices 1251, 1252 to the power supply device 1200 of the vehicle 1100.

In the embodiment of the vehicle 1100 shown in FIGS. 50 and 51, a replacement positioning device 1300 is fastened to the vehicle frame 1110. The replacement positioning device 1300 shown in FIGS. 50 and 51 comprises two telescopically retractable and extendable gripping rods 1310, 1320 which extend from a drive device 1350 in mutually opposite directions and in each case along the battery guide path 1110. The drive device 1350 is fastened to the vehicle frame 1105 and in the longitudinal extension of the battery guide path 1110 when viewed in the longitudinal direction XR of the vehicle 1100, is located centrally or in a central region of the guide path 1110.

Respectively one driving device 1330 or 1340 is formed at the ends of the gripping rods 1310, 1320 located on the respective vehicle sides 1101, 1102 and pointing towards these. This comprises respectively one driver or a hook device 1335 or 1336 and a coupling device 1345 or 1346 with which the respective driver or the hook device 1335 or 1336 is coupled to the outer end of the respective gripping rods 1310, 1320. The coupling device 1345 or 1346 can comprise one positioning device each or be coupled to a positioning device which can be triggered by the control device 510 functionally connected to this. As a result, the driving device 1330, 1340 can be moved into a driver position in which a hook device 1335 or 1336 can be placed onto an outer or away-facing surface of a battery B1 located in the guide path 1120, when viewed from the drive device 1350, in order to pull this. In this position, the hook device 1335 or 1336 can also be placed on a surface of the battery B1 facing the drive device 1350 in order to push this away when viewed from the drive device 1350. It can also be provided that, controlled by the control device 510, each of the coupling devices 1345 or 1346 and the hook device 1335 or 1336 can be brought into a decoupling position in which the described driver function is not provided since the hook device 1335 or 1336 is located outside the circumference of the battery B1. In this way—in a respectively corresponding position of the respective hook device 1335 or 1336—a battery B1 located in the guide path 1120 can be moved out from this or moved into this in both mutually opposite directions of the guide path 1120.

According to a further aspect of the invention, the battery exchange station 2000 is provided, which is configured for docking a vehicle 1100 with a battery B1 in order to take up the battery B1 located in the vehicle 1100 and insert a battery B2 located in the battery exchange station 2000 into the vehicle 1100.

An embodiment of the battery exchange station 2000 is shown in FIG. 51, which comprises an exchange device 2100. The embodiment of the exchange device 2100 is shown together with a vehicle 1100 which is docked to the exchange device 2100.

The exchange device 2100 comprises a first guide path device 2110 with a first guide path 2111 and a second guide path device 2120 with a second guide path 2121, where the guide paths 2111, 2121 are each formed by a respective guide path section 2110 or 2120. The exchange guide device 2100 is configured in such a manner that the guide paths 2113, 2114 run in their respective extension towards one another and are aligned with respect to one another in such a manner that a battery B2 located at least in sections in a first of the guide paths 2113, 2114 can be moved from this into the respectively second of the guide paths 2113, 2114 without leaving the respectively first of the guide paths 2113, 2114.

The first guide path device 2110 and the second guide path device 2120 can each be formed as an elongatedly extending support part or in general as a guide path base body 2112 or 2122 which in the embodiment of FIG. 51 is executed as a plate. The elongatedly extending support part can comprise an indentation extending in the longitudinal direction thereof to form the respective guide path which opens outwards in the longitudinal direction on its end sections located opposite one another.

Alternatively, the connecting device as shown in FIG. 51, can comprise a continuous surface pointing in the opposite direction to the docking direction AR and extending over the docking region 2150 and optionally also over the longitudinal extension of the guide paths 2113, 2114 which forms a rear boundary wall in relation to the docking direction AR for a battery B1 located in the vehicle 1100, in particular when the battery B1 is moved out from the vehicle 1100 and into one of the guide path devices 2110, 2120. The battery exchange station 2000 has a connecting device 2160 which fastens the two guide path devices 2110, 2120 to one another. In the embodiment of FIG. 51, the connecting device 2160 is designed as a connecting rod.

Furthermore, at the same time or independently of these variants, the battery exchange station 2000 can have a front boundary device 2190 in relation to the docking direction AR. This can be formed from a first boundary wall 2191 and a second boundary wall 2192, where the first boundary wall 2191 delimits the first guide path 2113 contrary to the docking direction AR and the second boundary wall 2192 delimits the second guide path 2114 contrary to the docking direction AR. In this embodiment the front boundary device 2190, the guide path base body 2112 or 2122 and the connecting device 2160 form the interior of the respective guide path devices 2110, 2120 or guide paths 2113, 2114.

A docking region 2150 is formed between the guide paths 2113, 2114 into which an end section 1104a of the vehicle 1100 in which a battery B1 to be taken up into the battery exchange station 2000 can be inserted.

Furthermore, the battery exchange station 2000 comprises an exchange positioning device 2200 for moving a battery B2 located in the exchange guide device 2110 along the two guide path sections 2111, 2112.

The battery exchange station 2000 also comprises a contacting device 1250 which comprises two connection devices 1251, 1252 and at least one contact retaining device 1255, 1256 for holding the connection devices 1251, 1252. In this case, the connection devices 1251, 1252 are executed in such a manner that these are each brought in contact in a contacting section 1260 of a contact strip or a contact loop of a battery B1 inserted into the battery guide path 1110.

The battery exchange station 2000 comprises a first electrical connection device with a contacting component which is located laterally or above the respective guide path for contacting an electrical connection of a battery located in the guide path and a retaining device on which the contacting component is arranged.

The battery exchange station 2000 comprises a second electrical connection device with a contacting component which is located laterally or above the respective guide path for contacting an electrical connection of a battery located in the guide path and a retaining device on which the contacting component is arranged.

The battery exchange station 2000 comprises a docking section 2190 located between the two guide path sections 2111, 2112 and configured as recess 2191, having a docking wall comprising a docking surface directed contrary to a docking direction on which the vehicle with a vehicle side on which a battery to be exchanged at the docking station is located, can be brought to abut with the vehicle to be docked.

Figure 54:
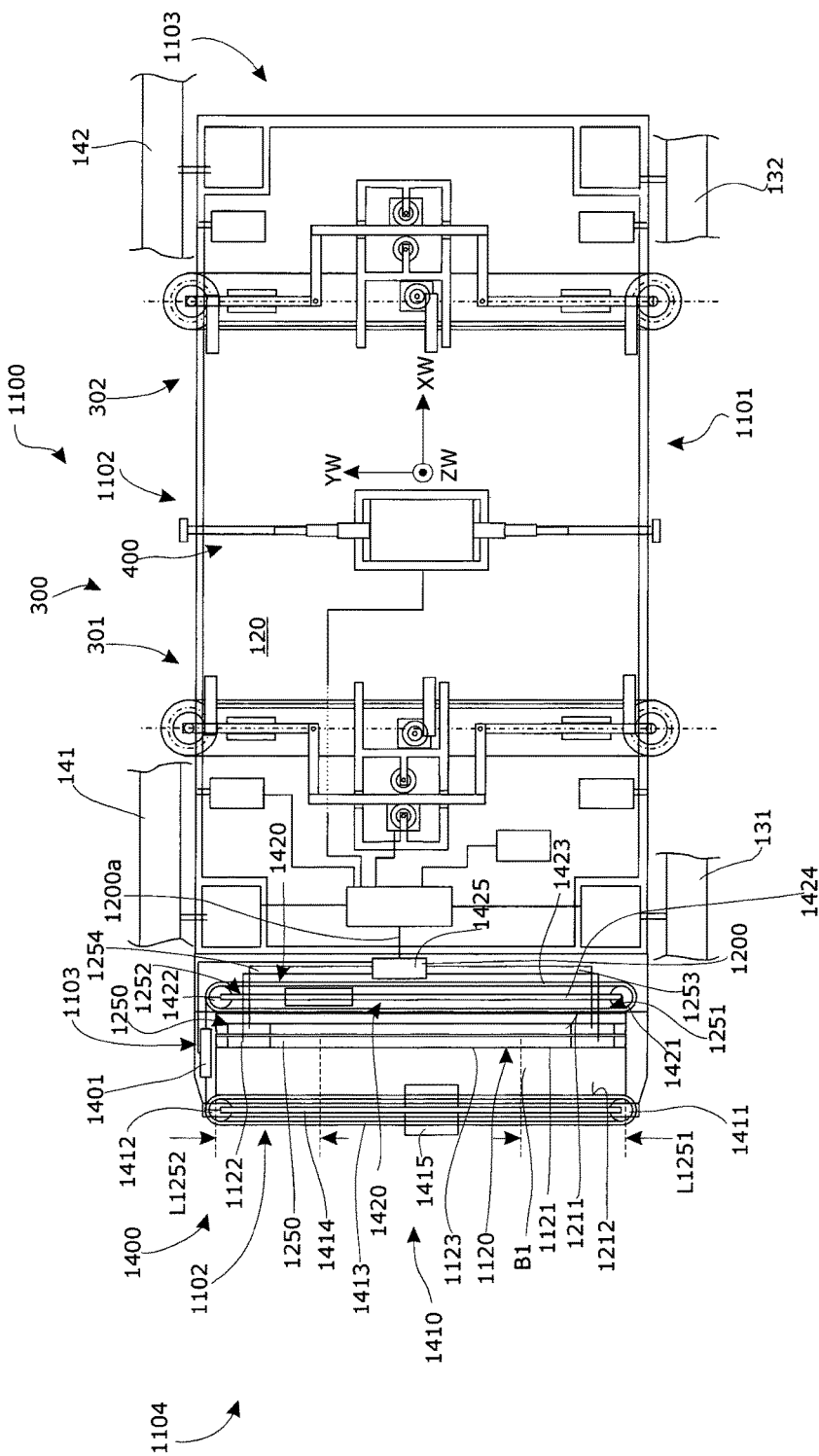
FIG. 54 shows a section view as a plan view of a further embodiment of a vehicle with a guide device having a battery guide path, wherein the vehicle has a further embodiment of an exchange positioning device compared with FIG. 50, FIGS. 55 to 57 show various exchange states in each case in a perspective view of a combination of the battery exchange station and the vehicle docked at this station, which is designed according to FIG. 54.
Figure 55:
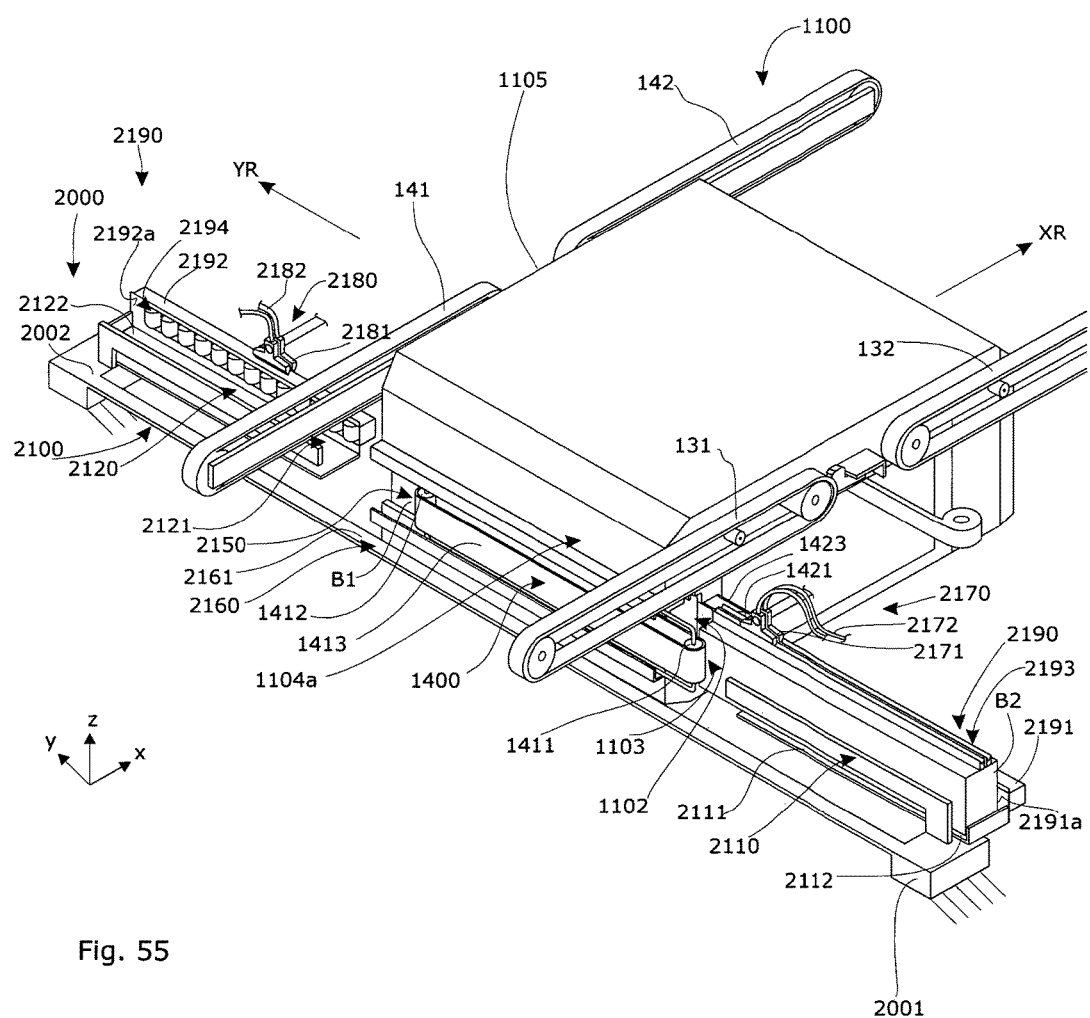
Figure 56:
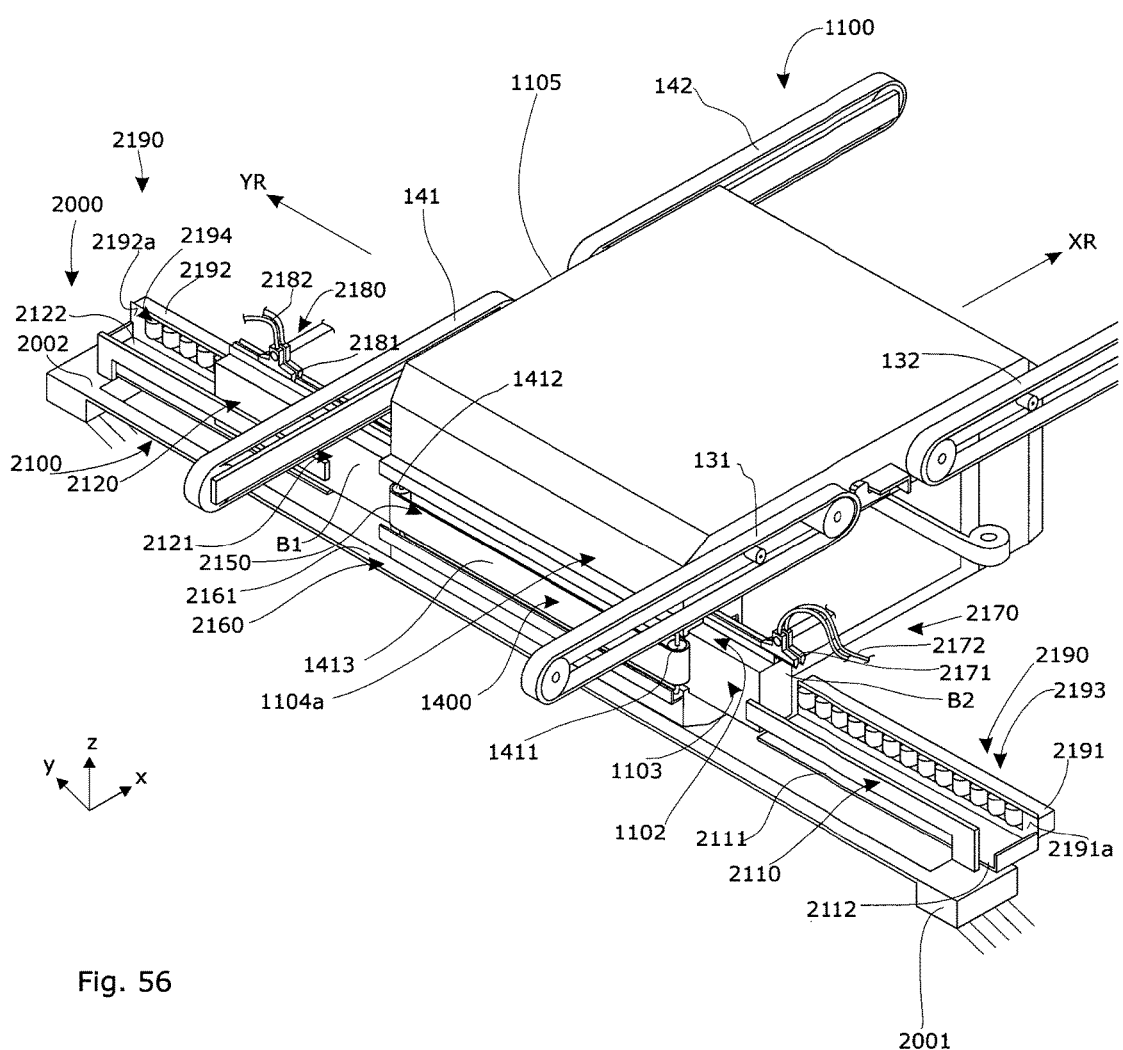
Figure 57:
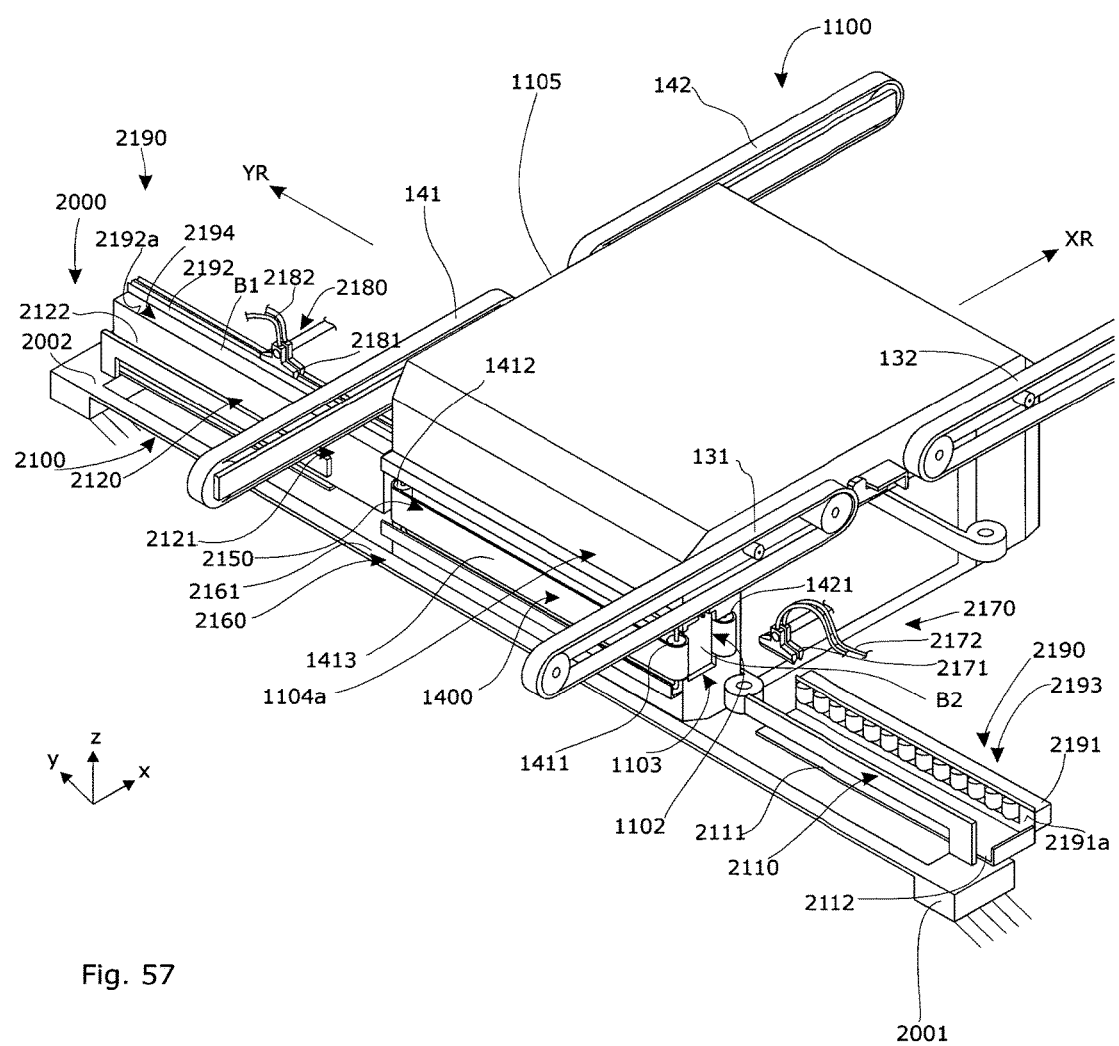
Figure 58:
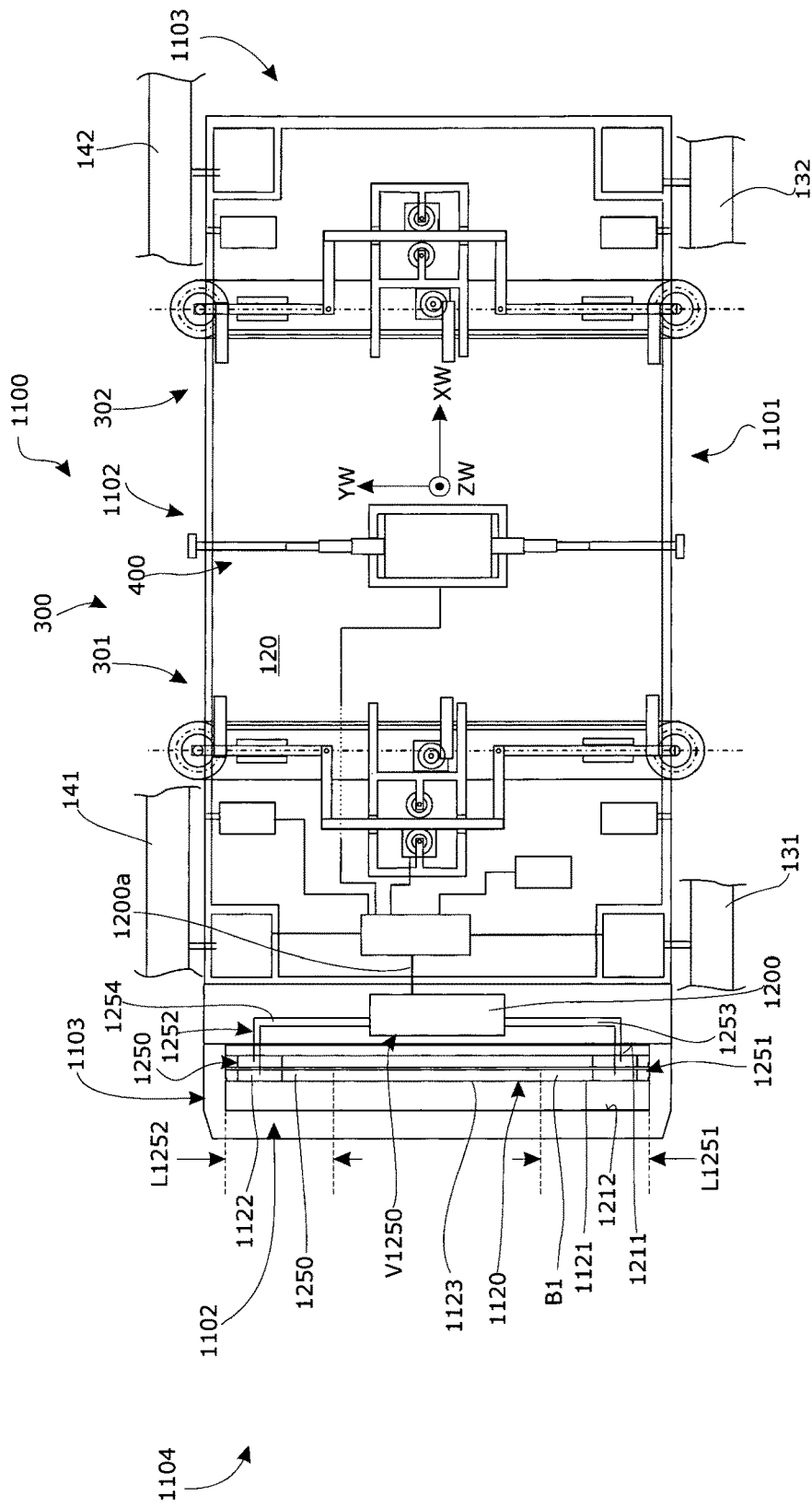
FIG. 58 shows a sectional view as a plan view of another embodiment of a vehicle with a guide device having a battery guide path, wherein the vehicle has another embodiment of an exchange positioning device compared with FIGS. 50 and 54, FIGS. 59 to 62 show various exchange states in each case in a perspective view of a combination of the battery exchange station and the vehicle docked at this station, which is designed according to FIG. 54, FIGS. 63 to 67 show views of a further embodiment of the vehicle with a guide device having a battery guide path and an exchange positioning device in combination with an embodiment of a battery exchange station with a battery exchange station.
Figure 59:
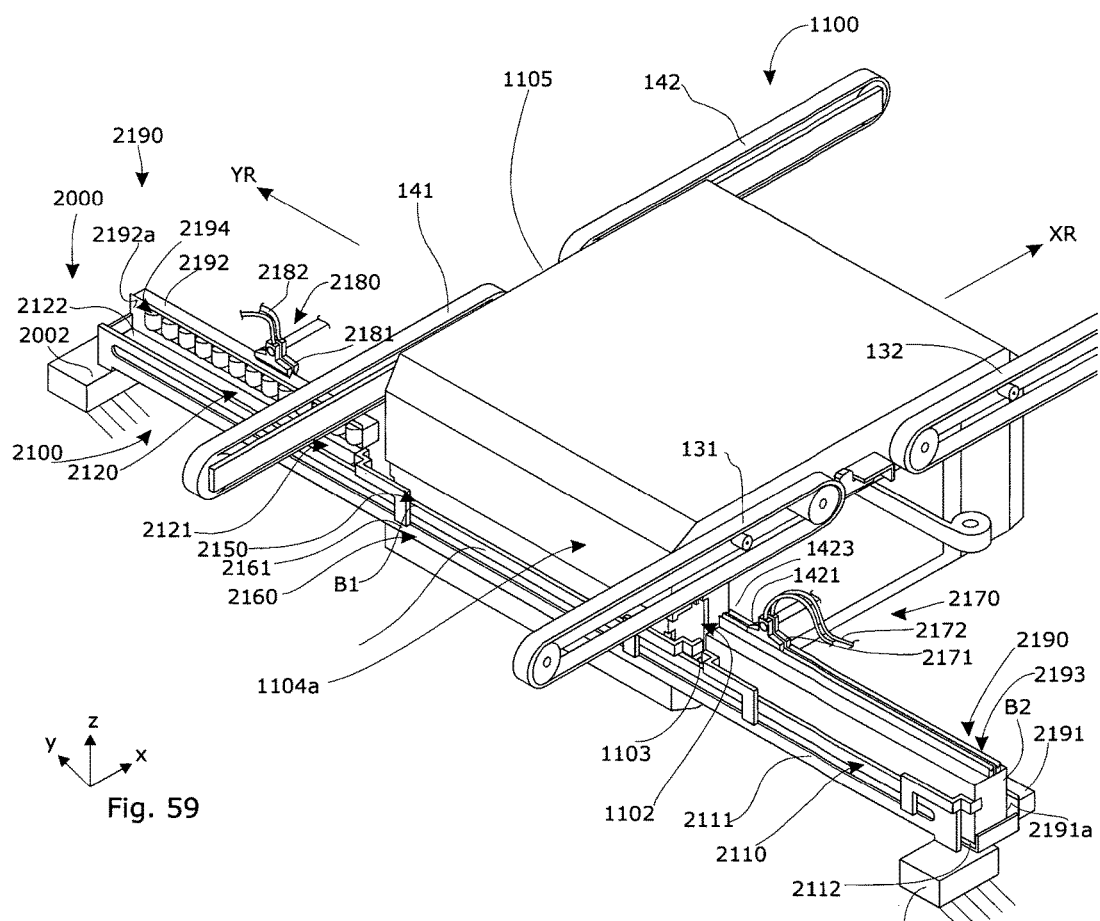
Figure 60:
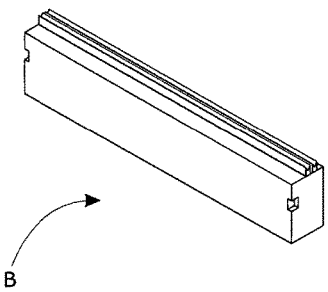
Figure 61:
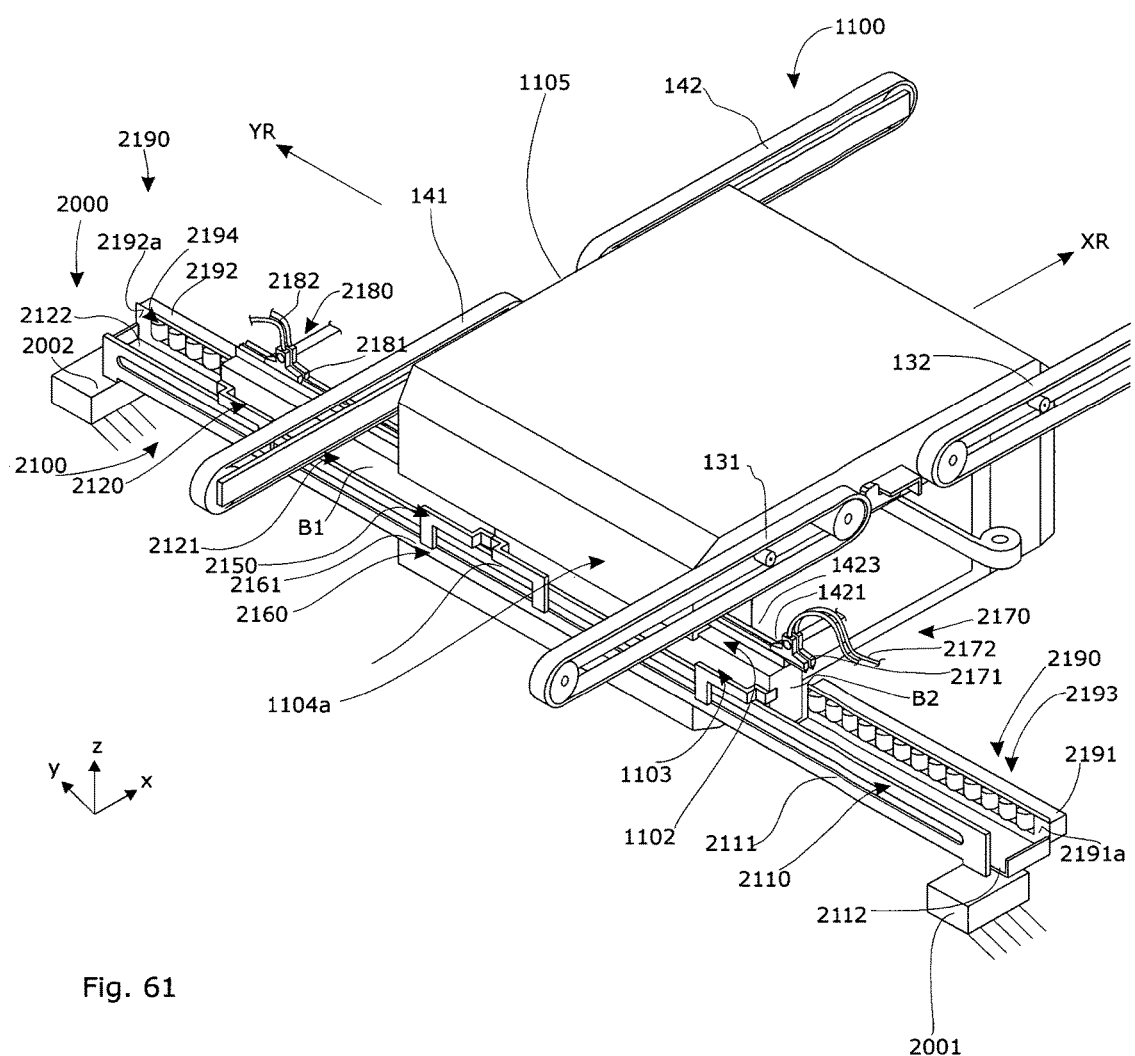
Figure 62:
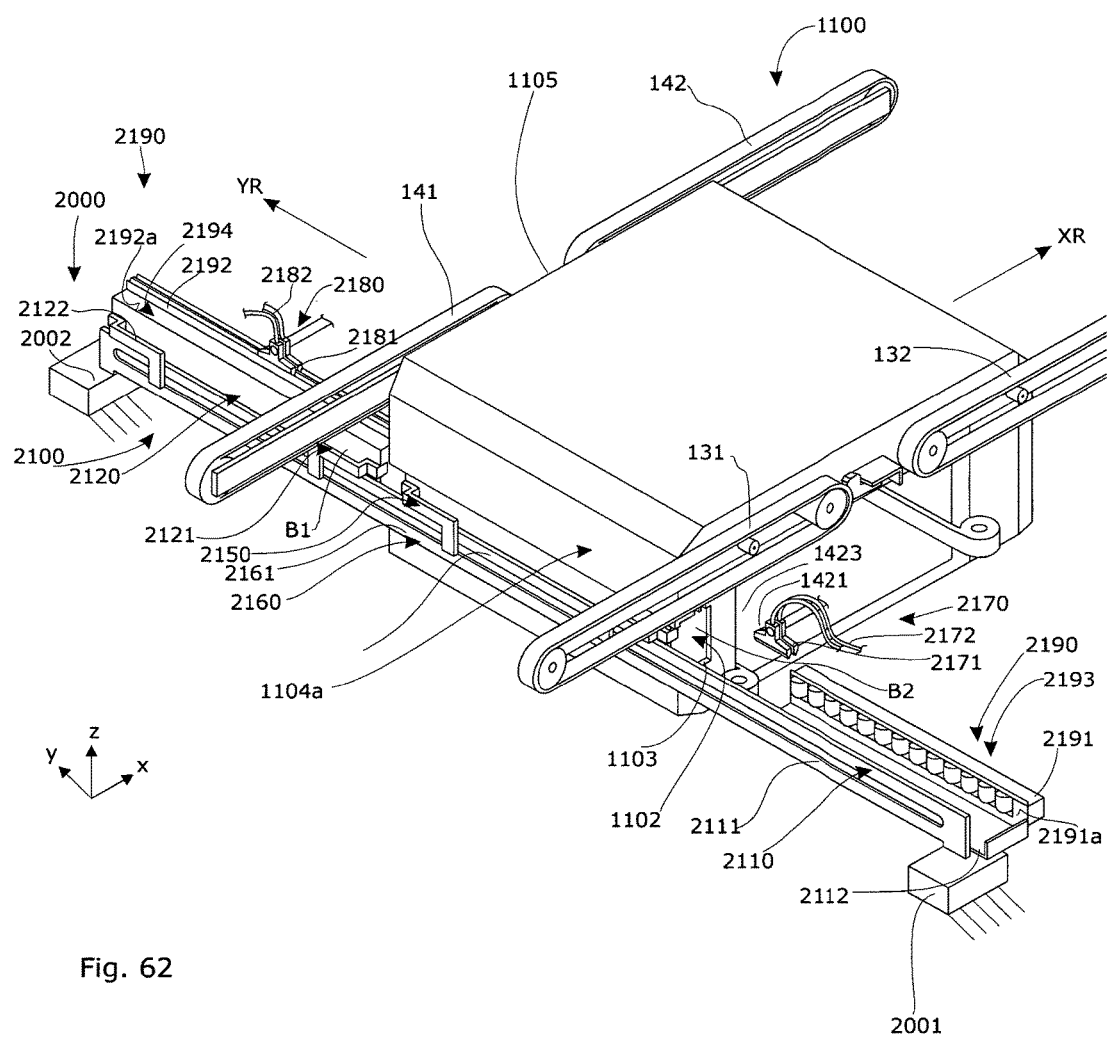

FIG. 54 shows a further embodiment of a vehicle positioning device on a vehicle 1100 which is designated with the reference number 1400. In this embodiment the vehicle positioning device 1400 is configured as a belt drive 1410 with a positioning belt 1413 which extends along the vehicle guide path 1110. In this case, the belt drive 1410 is located in such a manner that this presses the battery B1 located in the vehicle guide path 1110 against the guide surface 1211 facing the positioning belt 1411 (embodiment of FIG. 50). In this way, the battery B1 can be moved along the vehicle guide path 1110 by moving the positioning belt 1411 of the belt drive 1410. In particular, a battery B1 gripped by the belt drive 1410 and located in the battery exchange station 2000 can thus be taken up into the vehicle guide path 1110, e.g. of an embodiment of a battery exchange station 2000 described herein or another battery exchange station.

Alternatively the vehicle positioning device 1400 can comprise another positioning belt 1421 of a second belt drive 1420 which is arranged in such a manner that the battery guide path 1120 is located between the belt drives 1410 and 1420 and a battery B1 located therein is pressed by both so that this can displaced together with the battery along the battery guide path 1120.

In this case, it can in particular be further provided that the belt drives 1410 and 1420 can be moved together and at the same speed along the battery guide path 1120 by means of a drive device connected to the control device 510. In this case, the battery exchange station 2000 need not have a positioning device because the vehicle positioning device 1400 can independently remove a battery B2 from the battery exchange station 2000 when the vehicle positioning device 1400 is extended to the relevant side of the vehicle 1100.

A storage rack arrangement has two storage racks 1, 2 which extend along with respect to one another and in each case along a longitudinal direction XR and a depth direction TR and a vehicle docking station 1100 according to an embodiment described herein which is fastened to the storage racks 1, 2 in such a manner that the guide paths extend transversely to the longitudinal direction XR of the storage racks 1, 2, where the docking section 2190 configured as recess 2191 is located between the storage racks 1, 2.

Figure 63:
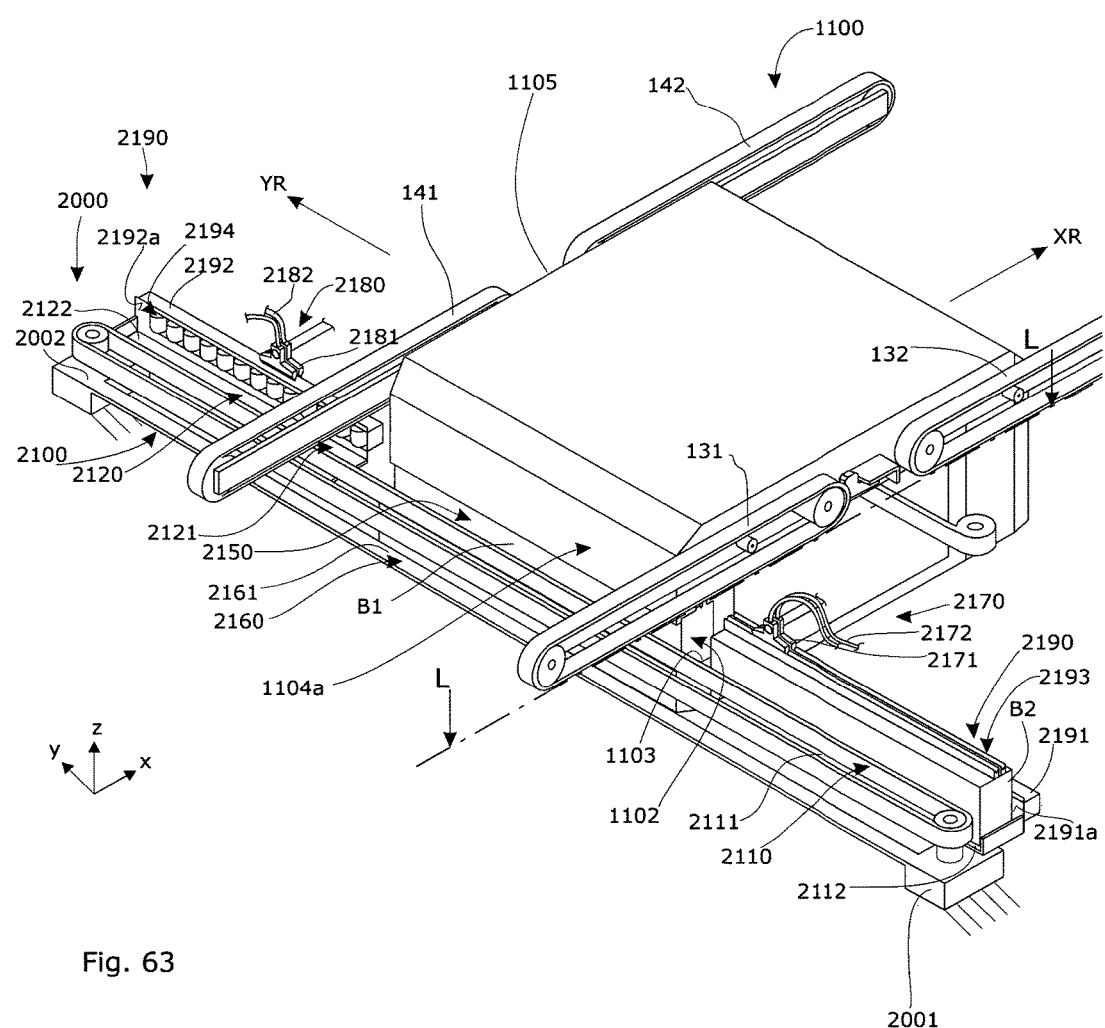
Figure 64:
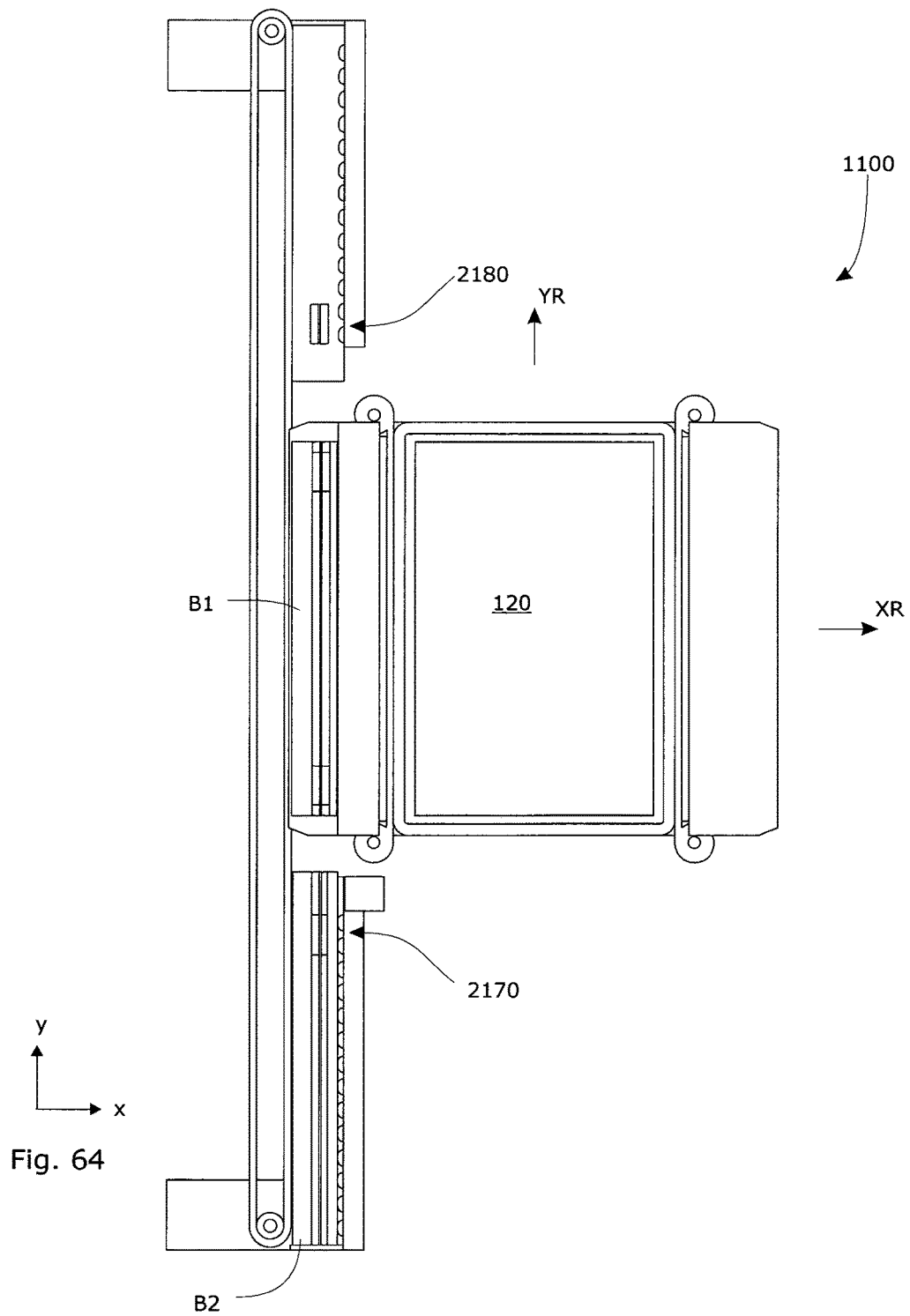
Figure 65:
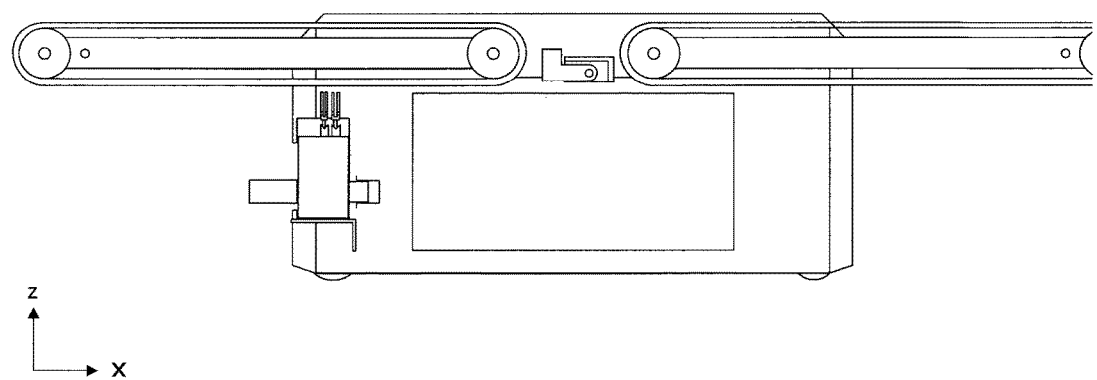
Figure 66:
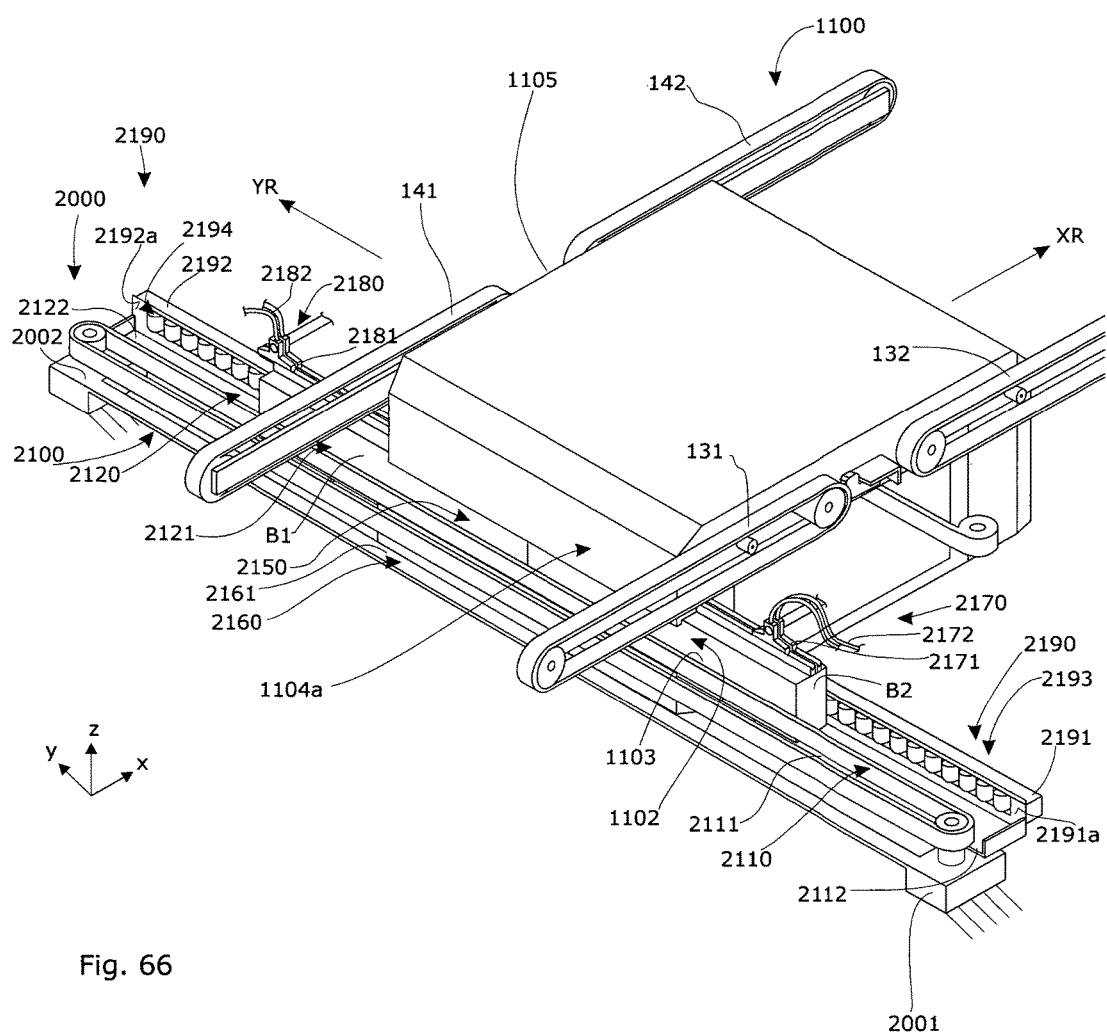
Figure 67:
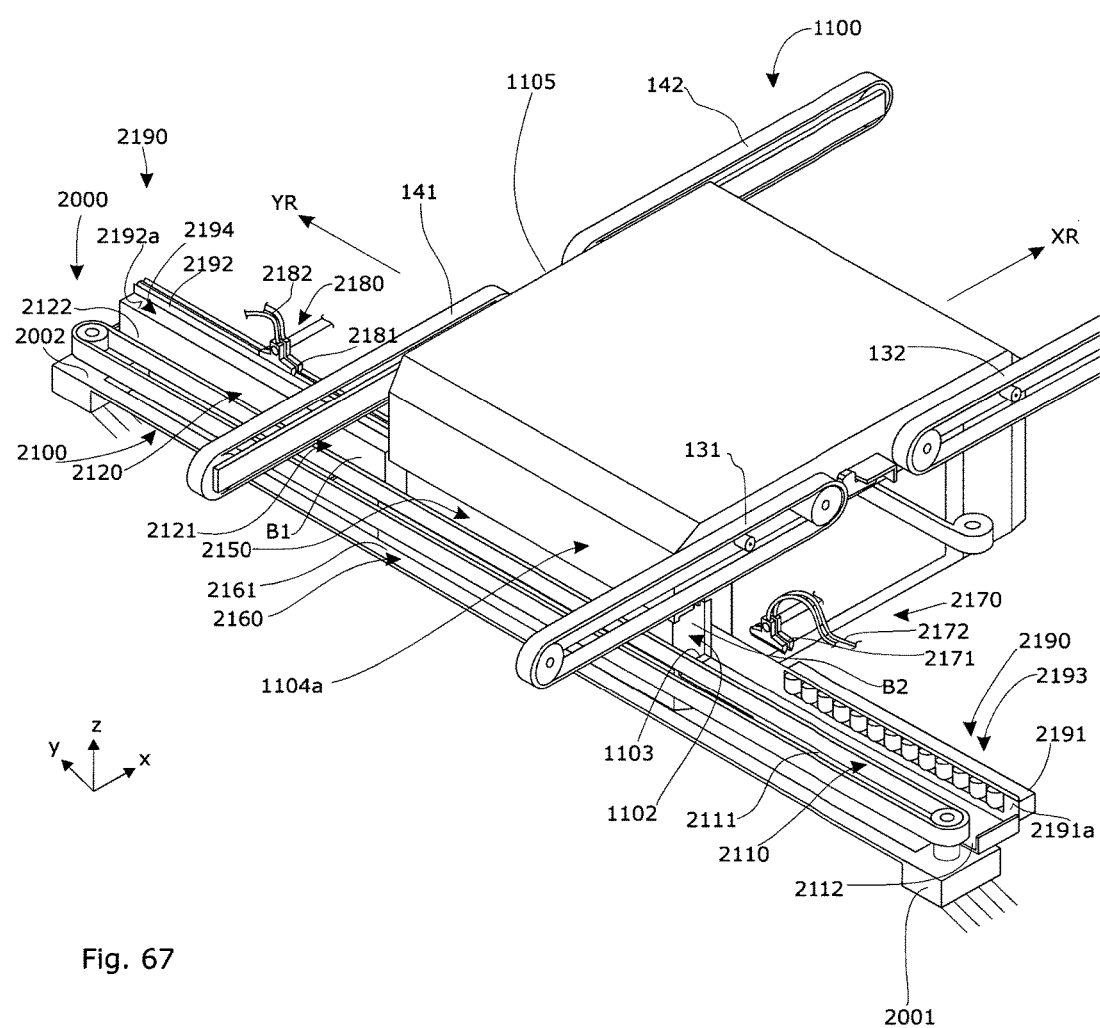
Figure 68:
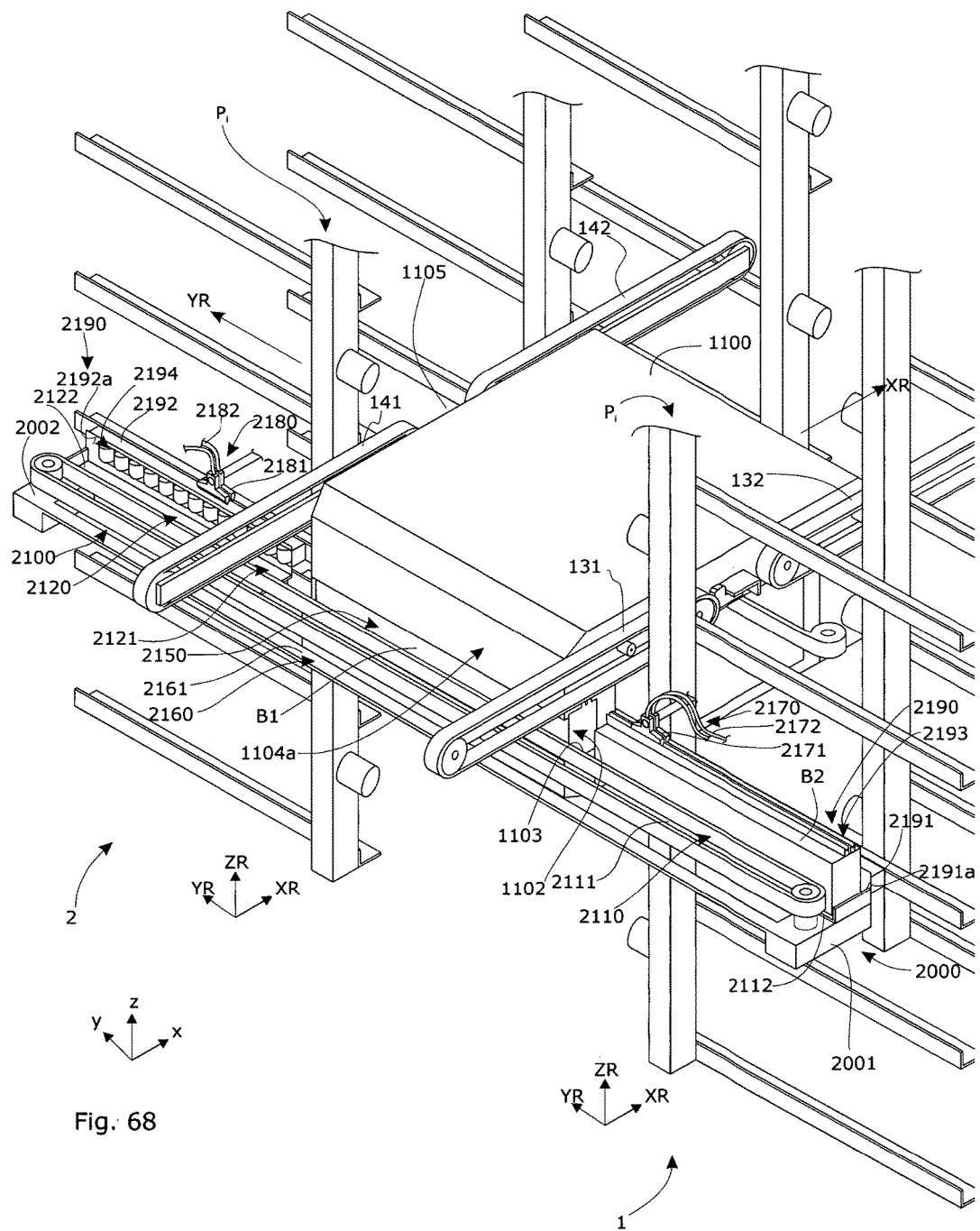
FIGS. 68 to 69 show the embodiment of the battery exchange station shown in FIGS. 63 to 67 in a state fastened to two storage racks.
Figure 69:
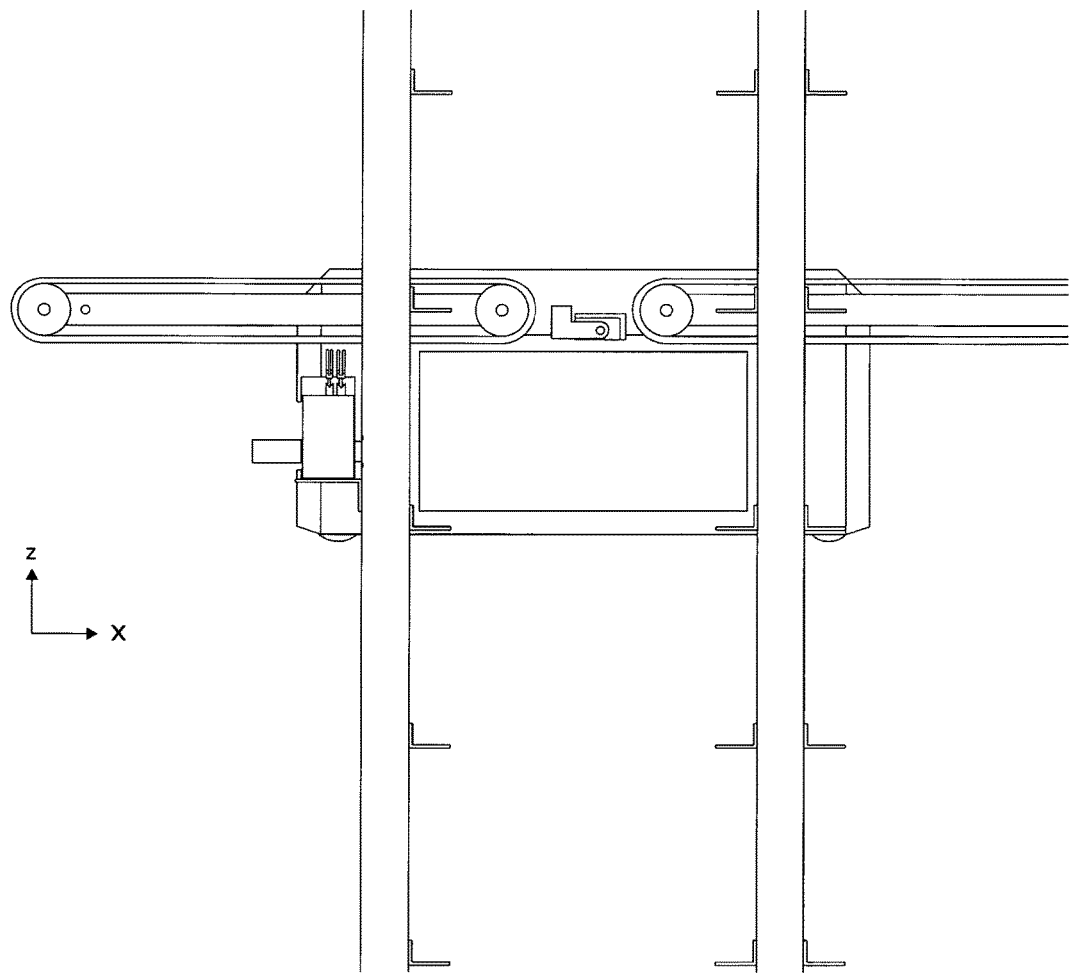
Figure 70:
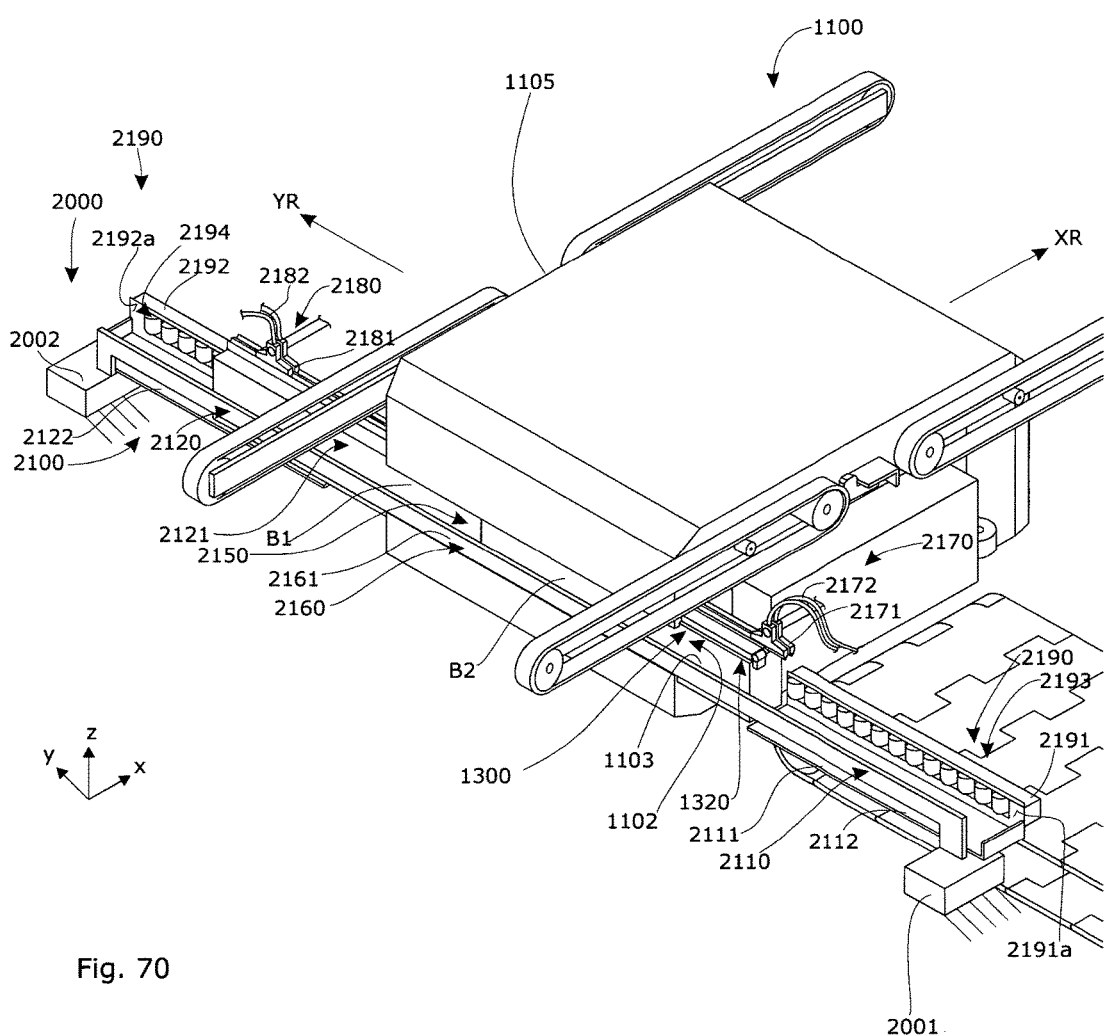
FIG. 70 shows a battery exchange process at an arrangement according to FIGS. 68 to 69, wherein conveyor belts are installed at the storage racks by which means a storage container can be moved into a receiving area of the vehicle.

In the embodiment of the battery exchange station 2000 according to FIG. 63 the battery exchange station has an exchange positioning device in the form of a belt drive 2200. Located between the belt drive 2200 and the first boundary wall 2191 or the second boundary wall 2192 is the battery to be moved.

In general the battery exchange station can be fastened laterally by means of fastening devices 2001, 2002 on a floor or a support.

The invention claimed is:

1. An operating vehicle for transporting a storage container along a storage rack comprising:
   a vehicle frame which forms two longitudinal sides located opposite one another,
   transverse sides extending transversely thereto,
   a receiving space for receiving the storage container and a passage each located on at least one of the longitudinal sides, through which a storage container can be inserted into the receiving space in a receiving space insertion direction and from which the storage container can be removed in a receiving space removal direction,
   wherein the operating vehicle further comprises:
   two pairs of drive crawlers, each drive crawler comprising a caterpillar track propulsion system, the drive crawlers extending along the longitudinal sides for supporting the operating vehicle on support devices mounted on the storage rack, of which one pair each of the drive crawlers is disposed in an articulated manner on each longitudinal side of the operating vehicle,
   wherein the drive crawlers of each pair of drive crawlers are each articulated by means of a rotational device having a rotational axis and viewed along the longitudinal sides, the rotational axes are located laterally of the receiving space.

2. The operating vehicle according to claim 1, wherein the rotational axes of the drive crawlers are disposed above the passage.

3. The operating vehicle according to claim 1, wherein the operating vehicle has a conveying device with at least one actuator coupled to a drive motor, which is located in the receiving space in such a manner that this abuts against a storage container located in the receiving space or can be brought into abutment and that, when this is driven by the drive motor, moves the storage container located in the receiving space out from the receiving space in the receiving space insertion or removal direction.

4. The operating vehicle according to claim 3, wherein the conveying device comprises two conveying devices of which one each is located on each side of the receiving space and which are configured in such a manner that a storage container can be inserted into the receiving space and removed from this receiving space by these conveying devices on these sides located opposite one another through the passages.

5. The operating vehicle according to claim 1, wherein the operating vehicle comprises a gripping device for positive gripping of a storage container, wherein the gripping device has a positioning device by means of which the storage container can be displaced relative to the receiving space.

6. The operating vehicle according to claim 1, wherein the operating vehicle can change from travel in the rack to travel on the ground and conversely without further aids.

7. The operating vehicle according to claim 1, further comprising a plurality of running wheels mounted to the transverse sides of the operating vehicle.

8. A method for moving an operating vehicle at a storage rack arrangement in the direction of a longitudinal direction of the operating vehicle, wherein the operating vehicle has at least two longitudinal sides extending along the longitudinal direction and located opposite one another and drive crawlers, each drive crawler comprising a caterpillar track propulsion system, the drive crawlers located on each longitudinal side one behind the other in the longitudinal direction, which drive crawlers are articulated to a vehicle frame, wherein the method comprises the steps:
   aligning drive crawlers of the operating vehicle in the longitudinal direction of the operating vehicle, wherein each of the drive crawlers rests on a support part of a storage rack arrangement and wherein the drive crawlers of the operating vehicle on each longitudinal side rest on support parts of different storage racks of the storage rack arrangement,
   driving respectively one drive belt of each of the drive crawlers and thereby advancing the operating vehicle in the longitudinal direction of the same on the support parts between the storage racks.

9. The method according to claim 8, wherein the method comprises the following steps: starting from a horizontal operating position of the drive crawlers, in which these extend in the longitudinal direction of the operating vehicle and the operating vehicle can be moved on the support parts along a horizontal path, simultaneous pivoting of the drive crawlers in the same direction about their respective rotational axis in the direction of a diagonal path of the respective storage rack, driving the respectively one drive belt of each of the drive crawlers and thereby moving the operating vehicle on a diagonal path.

10. The method according to claim 9, wherein the simultaneous pivoting of the drive crawlers in the same direction takes place during the movement of the operating vehicle on the support parts.

11. A method for moving an operating vehicle, wherein the operating vehicle changes between the following operating states:

a rack operating state in which advancement of the operating vehicle in a longitudinal direction of the same takes place on support parts between storage racks, wherein drive crawlers each drive crawler comprising a caterpillar track propulsion system, are located on support parts and a crawler ground operating state in which the operating vehicle travels on the drive crawlers on a ground on which the storage racks stand after the drive crawlers have been rotated into a ground travelling position by raising a frame of the vehicle from the ground, wherein in a transition from the rack operating state to the crawler ground operating state or from the crawler ground operating state to the rack operating state, the operating vehicle is located in a third transition operating state in which the drive crawlers articulated to a first transverse side of the operating vehicle are located on support parts of the storage racks and at the same time drive crawlers articulated to a second transverse side of the operating vehicle rest on the ground and thereby position the frame of the vehicle relative to the ground.

12. A method for moving an operating vehicle, wherein in a first step driving the operating vehicle on the ground (G) in a chassis ground operating state on a ground operating chassis disposed on a frame of the vehicle travels in a direction running transversely to a longitudinal direction of storage racks whilst drive crawlers, each drive crawler comprising a caterpillar track propulsion system, are located in a rotational position in which the drive crawlers do not touch the ground, then in a second step driving the operating vehicle along the longitudinal direction of the storage racks and between the storage racks in a crawler ground operating state in which the operating vehicle on the drive crawlers travels on a ground on which the storage racks stand after the drive crawlers have been rotated into a ground driving position by raising the vehicle frame from the ground.

* * * * *